United States Patent
Lynch et al.

(10) Patent No.: US 12,256,121 B2
(45) Date of Patent: *Mar. 18, 2025

(54) SYSTEMS, APPARATUS, AND METHODS TO IMPROVE WATERMARK DETECTION IN ACOUSTIC ENVIRONMENTS

(71) Applicant: The Nielsen Company (US), LLC, New York, NY (US)

(72) Inventors: Wendell D. Lynch, East Lansing, MI (US); Christen V. Nielsen, Dunedin, FL (US); Alexander Topchy, New Port Richey, FL (US); Khaldun Karazoun, Tampa, FL (US); Jeremey M. Davis, New Port Richey, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,618

(22) Filed: Oct. 31, 2023

(65) Prior Publication Data

US 2024/0146998 A1 May 2, 2024

Related U.S. Application Data

(63) Continuation of application No. 18/158,315, filed on Jan. 23, 2023, now Pat. No. 11,843,825, which is a continuation of application No. 17/479,918, filed on Sep. 20, 2021, now Pat. No. 11,564,003.

(51) Int. Cl.
*H04N 21/439* (2011.01)
*G10L 19/018* (2013.01)
*H04N 21/238* (2011.01)
*H04N 21/262* (2011.01)

(52) U.S. Cl.
CPC ....... *H04N 21/4394* (2013.01); *G10L 19/018* (2013.01); *H04N 21/238* (2013.01); *H04N 21/262* (2013.01); *H04N 21/4398* (2013.01)

(58) Field of Classification Search
CPC ............. H04N 21/4394; H04N 21/238; H04N 21/262; H04N 21/4398; G10L 19/018
See application file for complete search history.

(56) References Cited

U.S. PATENT DOCUMENTS

| | | | |
|---|---|---|---|
| 10,448,123 B1* | 10/2019 | Topchy | H04N 21/23892 |
| 2013/0170695 A1* | 7/2013 | Anan | H04N 19/467 382/100 |
| 2014/0105448 A1* | 4/2014 | Srinivasan | G10L 19/018 382/100 |

(Continued)

*Primary Examiner* — Mulugeta Mengesha

(57) ABSTRACT

An example apparatus includes at least one processor circuitry to execute or instantiate instructions to identify a media file is scheduled to be accessed by a media device within a first time period after a publishing of the media file was published by a media provider; select a first symbol to be inserted at a first symbol position and a second symbol to be inserted at a second symbol position to identify an access of the media file is to be accessed by the media device within the first time period, the first symbol position in a first bit sequence, the second symbol position in a second bit sequence; encode the first bit sequence in the media file on a first encoding layer of a multilayered watermark, and encode the second bit sequence in the media file on a second encoding layer of the multilayered watermark.

20 Claims, 19 Drawing Sheets

(56) References Cited

U.S. PATENT DOCUMENTS

2016/0203297 A1\* 7/2016 Lynch ................ H04N 21/8358
 713/189
2017/0316189 A1\* 11/2017 Winograd ............. G06F 21/125

\* cited by examiner

SYSTEMS, APPARATUS, AND METHODS TO IMPROVE WATERMARK DETECTION IN ACOUSTIC ENVIRONMENTS

CROSS-REFERENCE TO RELATED APPLICATIONS

This patent arises from a continuation of U.S. patent application Ser. No. 18/158,315 (now U.S. Pat. No. 11,843, 825), which was filed on Jan. 23, 2023, which is a continuation of U.S. patent application Ser. No. 17/479,918 (now U.S. Pat. No. 11,564,003), which was filed on Sep. 20, 2021. U.S. patent application Ser. Nos. 17/479,918, 18/158,315 are hereby incorporated herein by reference in its entirety. Priority to U.S. patent application Ser. Nos. 17/479,918, 18/158,315 are hereby claimed.

FIELD OF THE DISCLOSURE

This disclosure relates generally to media watermarking and, more particularly, to systems, apparatus, and methods to improve watermark detection in acoustic environments.

BACKGROUND

Watermarks can be embedded or otherwise included in media to enable additional information to be conveyed with the media. For example, audio watermarks can be embedded and/or included in the audio data/signal portion of a media stream, file, and/or signal to convey data, such as media identification information, copyright protection information, etc., associated with the media. These watermarks enable monitoring of the distribution and/or use of media, such as by detecting watermarks present in television broadcasts, radio broadcasts, streamed multimedia, etc., to identify the particular media being presented to viewers, listeners, users, etc. The information can be valuable to advertisers, content providers, and the like.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
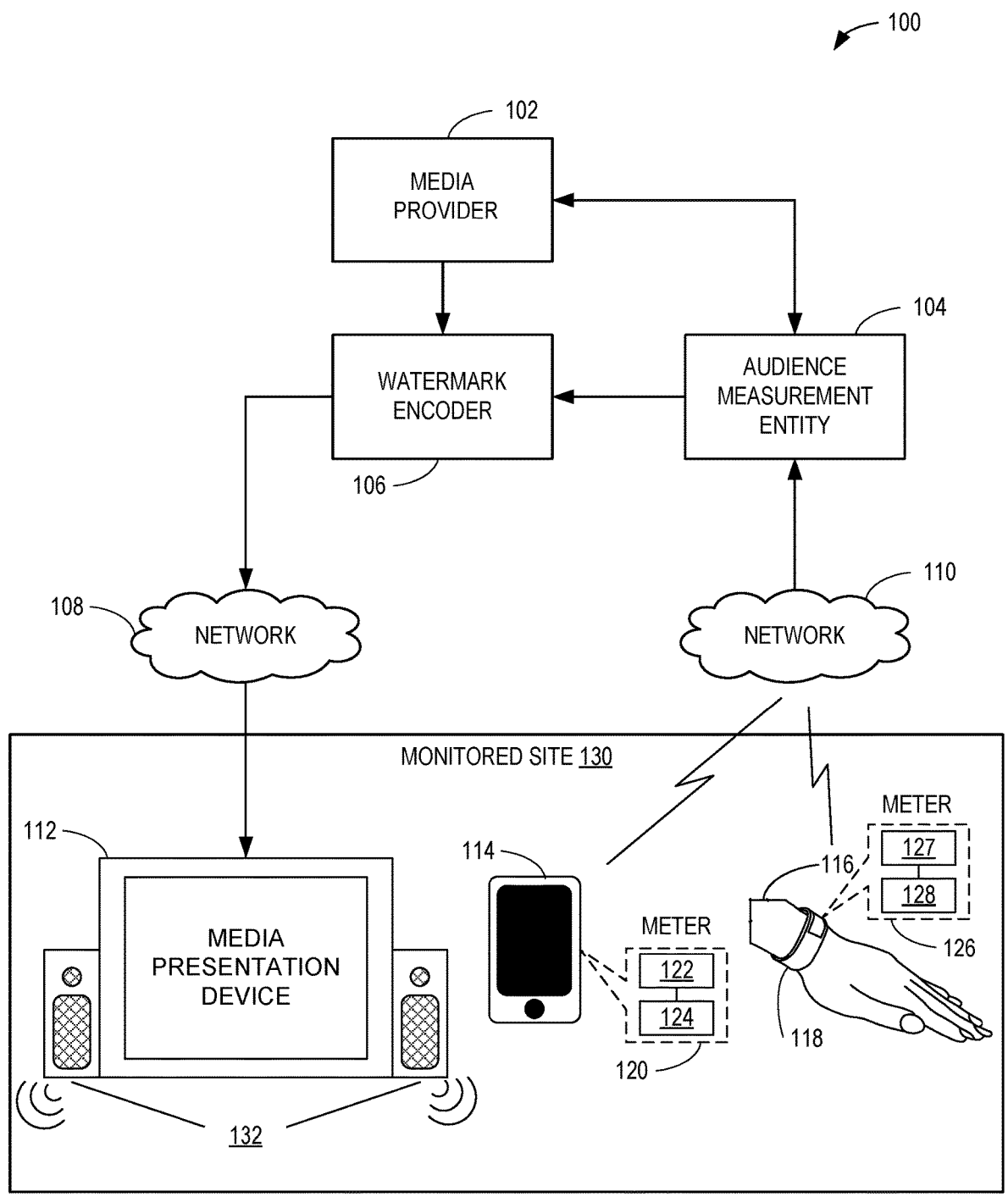
FIG. 1 is a block diagram of an example media monitoring system including an example watermark encoder to embed watermarks in media, an example watermark decoder to decode the watermarks, and an example audience measurement entity to associate access(es) of the media and demographics of users associated with the access(es).

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" and "substantially simultaneously" refer to occurrences in a near instantaneous manner recognizing there may be real world delays for computing time, transmission, etc. Thus, unless otherwise specified, "substantially real time" and "substantially simultaneously" refer to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Systems, apparatus, and methods to improve watermark detection in acoustic environments are disclosed. Watermarks can be embedded or otherwise included in media to enable additional information to be conveyed with the media. The watermarks enable monitoring of the distribution and/or use of media by identifying the particular media being presented to viewers, listeners, users, etc. The information can be valuable to advertisers, content providers, and the like. Some known media monitoring systems employing watermarks typically include watermark encoders that encode watermarks that are unique for individual media content files. However, depending on the encoding methodology employed, the ability to detect such watermarks in acoustic environments, such as noisy, loud volume, etc., type environments, may be substantially or entirely diminished.

Some watermark encoding techniques are described in U.S. patent application Ser. No. 13/955,245 (U.S. Pat. No. 9,711,152), entitled SYSTEMS, APPARATUS AND METHODS FOR ENCODING/DECODING PERSISTENT UNIVERSAL MEDIA CODES TO ENCODED AUDIO, U.S. patent application Ser. No. 13/955,438 (U.S. Publication No. 2015/0039321), entitled APPARATUS, SYSTEM AND METHOD FOR READING CODES FROM DIGITAL AUDIO ON A PROCESSING DEVICE, U.S. patent application Ser. No. 14/023,221 (U.S. Publication No. 2015/0039322), entitled APPARATUS, SYSTEM AND METHOD FOR MERGING CODE LAYERS FOR AUDIO ENCODING AND DECODING, U.S. patent application Ser. No. 14/587,995 (U.S. Pat. No. 9,418,395), entitled POWER EFFICIENT DETECTION OF WATERMARKS IN MEDIA SIGNALS, and U.S. patent application Ser. No. 15/994,383 (U.S. Pat. No. 10,694,243), entitled METHODS AND APPARATUS TO IDENTIFY MEDIA BASED ON WATERMARKS ACROSS DIFFERENT AUDIO STREAMS AND/OR DIFFERENT WATERMARKING TECHNIQUES.

Examples disclosed herein can improve watermark detection in media published on on-demand platforms. Unlike a linear program that airs on a set schedule (e.g., a program published over-the-air, or via cable, satellite, network, etc., on a broadcast or distribution schedule), some on-demand platforms have no set airing schedule. Instead, viewers may select media from a menu of media and watch and/or otherwise access the media when convenient for the viewers. Some on-demand platforms publish media for access by viewers within a specific time period after an initial publishing of the media and/or after an availability of the media on a media platform (e.g., a streaming media platform). In some examples, such on-demand platforms may implement recently telecast video-on demand (RTVOD) platforms or media providers. In some examples, RTVOD platforms may publish media on a first day and may make the media available for on-demand media presentation within a first time period (e.g., within three days after initial publishing), a second time period (e.g., within seven days of initial publishing), etc., after the initial publishing on the first day. In some such examples, the RTVOD platforms may be media platforms (e.g., on-demand media platforms, streaming media platforms, etc.) maintained by streaming media providers such as Netflix™, Hulu™, Prime Video™, HBO MAX™, Showtime™, etc.

An audience measurement entity (AME), such as the Nielsen Company (US), LLC, may facilitate the encoding of watermarks in RTVOD media in an effort to understand the demographic compositions of viewing audiences of such media within the first time period, the second time period, etc., after the initial publishing on the first day. For example, a media presentation device may access RTVOD media that is embedded with watermarks, and a meter may detect the watermarks embedded in audio of the RTVOD media in response to the media presentation device accessing and/or presenting the RTVOD media. In some such examples, in response to the meter detecting the watermarks, the meter may provide an indication to the AME that the media presentation device accessed and/or presented the RTVOD media. However, the detection of watermarks embedded in RTVOD media may be substantially or completely diminished when the RTVOD media is accessed in acoustic environments, such as noisy, loud volume, etc., type environments, which may include bars, restaurants, outdoor environments, etc.

Some on-demand platforms publish media that did not air within the past seven days on linear programming distribution in the same exact form, or did not air on linear programming distribution at all. In some examples, such on-demand platforms may implement library video-on demand (VOD) platforms or media providers. Examples of some such library VOD platforms may include libraries of programs that are made for on-demand presentation, movies that are no longer showing in theatres, prior seasons of network or cable programs, current-season telecasts with changed commercial content, etc. AMEs desire to understand the demographic compositions of viewing audiences of such media.

An AME may facilitate the encoding of watermarks in library VOD media in an effort to understand the demographic compositions of viewing audiences of such media. For example, a media presentation device may access/present library VOD media embedded with watermarks, and a meter may identify the watermarks embedded in audio of the library VOD media in response to the media presentation device accessing/presenting the library VOD media. In some such examples, the meter may provide an indication to the audience measurement entity that the media presentation device accessed/presented the library VOD media, with the meter providing the indication in response to the meter identifying the watermarks. However, the detection of watermarks embedded in library VOD media may be substantially or completely diminished when the library VOD media is accessed in acoustic environments, such as noisy, loud volume, etc., type environments.

Examples disclosed herein can improve watermark detection in media accessed in acoustic environments by utilizing multilayer watermarks. In some disclosed examples, a watermark encoder may generate sparse multilayer watermarks by (i) inserting watermark symbol(s) at one or more first symbol positions of a first watermark layer while leaving one or more second symbol positions of the first watermark layer empty and/or otherwise not filled with watermark symbol(s), and (ii) inserting watermark symbol(s) at one or more second symbol positions of a second watermark layer while leaving one or more second symbol positions of the second watermark layer empty and/or otherwise not filled with watermark symbol(s). For example, a symbol position may be empty when the symbol position does not contain a symbol. In some such examples, a symbol may not be encoded, embedded, etc., at the empty symbol position. In some disclosed examples, the watermark encoder may select one(s) of the watermark symbols to convey a state (e.g., a media state) of accessed media. For example, the state may be a first state (e.g., a first media state) that corresponds to media being accessed and/or presented within a first time period after an initial publishing of the media. In some such examples, the first state may implement a C3 media state that indicates that RTVOD media is being accessed/presented within three days of the initial publishing. In some examples, the state may be a second state (e.g., a second media state) that corresponds to the media being accessed and/or presented within a second time period after the initial publishing. In some such examples, the first state may implement a C7 media state that indicates that RTVOD media is being accessed/presented within seven days of the initial publishing. In some examples, the watermark encoder may embed RTVOD media with sparse multilayer watermarks to increase a likelihood of detection of the state of the media. For example, the watermark encoder may utilize watermark layers associated with frequencies that have improved detection capability to increase a likelihood of detecting the sparse multilayer watermarks.

In some disclosed examples, a watermark encoder may generate a multilayer watermark that conveys timestamps (e.g., timestamp or other time data associated with media presentation) using frequencies that have improved detection capability to increase a likelihood of detecting such a watermark. In some disclosed examples, the watermark encoder may convert (i) a first timestamp in a first format based on a number of seconds at which a watermark is to be inserted into media into (ii) a second timestamp in a second format based on a number of minutes at which the watermark is to be inserted into the media. In some disclosed examples, the watermark encoder may determine a first bit sequence that may be inserted into a first watermark layer of the multilayer watermark and a second bit sequence that may be inserted into a second watermark layer of the multilayer watermark. In some disclosed examples, the watermark encoder may insert one or more error checking or parity bits into at least one of the first bit sequence or the second bit sequence for improved watermark detection. Advantageously, the example watermark encoder may distribute the timestamp data amongst different layers of a multilayer watermark to increase a likelihood of detecting the multilayer watermark in acoustic environments. For example, a watermark decoder may extract the first bit sequence from the first watermark layer and the second bit sequence from the second watermark layer and assemble the timestamp using the first bit sequence and the second bit sequence.

FIG. 1 is a block diagram of an example media monitoring system 100 including an example media provider 102, an example audience measurement entity (AME) 104, an example watermark encoder 106, a first example network 108, a second example network 110, an example media presentation device 112, a first example panelist device 114, an example panelist 116, and a second example panelist device 118. In the illustrated example, the first panelist device 114 is an Internet-enabled smartphone. The first panelist device 114 of the illustrated example includes a first example meter 120, which may include and/or otherwise implement at least one of first example input device circuitry 122 or a first example watermark decoder 124. In the illustrated example, the panelist 116 is wearing the second panelist device 118, which includes a second example meter 126. For example, the second panelist device 118 may be a wrist-watch type device, a smartwatch, a fitness tracker, etc. The second meter 126 may include and/or otherwise implement at least one of a second example watermark decoder 127 or second example input device circuitry 128. In some examples, the first input device circuitry 122 and/or the second input device circuitry 128 may be implemented by, for example, an audio sensor, a microphone, etc., or any other type of sensor and/or circuitry that may detect audio (e.g., audio data, audio signals, audio waveforms, etc.).

The media monitoring system 100 of the illustrated example supports monitoring of media presented at one or more monitored sites, such as an example monitored site 130. The monitored site 130 includes the media presentation device 112. Although the example of FIG. 1 illustrates one monitored site 130 and one media presentation device 112, improved watermark detection in acoustic environments as disclosed herein can be implemented in media monitoring systems 100 supporting any number of monitored sites 130 having any number of media presentation devices 112.

The media provider 102 of the illustrated example corresponds to any one or more media providers capable of providing media for presentation via the media presentation device 112. The media provided by the media provider 102 can include any type(s) of media, such as audio, video, multimedia, etc. Additionally, the media can correspond to live media, streaming media, broadcast media, stored media, on-demand content, etc.

In some examples, the media provider 102 of the illustrated example may be implemented by one or more servers providing streaming media (e.g., web pages, audio, videos, images, etc.). For example, the media provider 102 may be implemented by any provider(s) of media such as a digital broadcast provider (cable television service, fiber-optic television service, etc.) and/or an on-demand digital media provider (e.g., Internet streaming video and/or audio services such as Netflix®, YouTube®, Hulu®, Pandora®, Last.fm®, HBO MAX™, etc.) and/or any other provider of streaming media services. In some other examples, the media provider 102 is a host for web site(s). Additionally or alternatively, the media provider 102 may not be on the Internet. For example, the media provider 102 may be on a private and/or semi-private network (e.g., a LAN, a virtual private network, etc.) to which the media presentation device 112 connects.

The AME 104 of the illustrated example may be implemented by one or more servers that collect and process media monitoring information from the first meter 120 and/or the second meter 126 to generate exposure metrics, identify demographic trends, etc., related to presented media. The media monitoring information may also be correlated or processed with factors such as geodemographic data (e.g., a geographic location of the media exposure measurement location, age(s) of the panelist(s) 116 associated with the monitored site 130, an income level of a panelist 116, etc.). Media monitoring information may be useful to advertisers to determine which media is popular or trending among users, identify geodemographic trends with respect to presentation of media, identify market opportunities, and/or otherwise evaluate their own and/or their competitors' media.

In the illustrated example, the media provider 102 may provide media to be embedded with watermarks to at least one of the AME 104 or the watermark encoder 106. In some examples, the AME 104 may generate a source identifier (SID) that uniquely identifies the media provider 102. The AME 104 may provide the SID to the media provider 102. The AME 104 may generate timestamps of the media, which may be referred to as time-in content (TIC) indicators, markers, data, etc. In some examples, the media provider 102 may generate the media timestamps and provide the media timestamps to at least one of the AME 104 or the watermark encoder 106. In some examples, the watermark encoder 106 may generate the media timestamps.

In the illustrated example, the watermark encoder 106 embeds watermarks in media generated by the media provider 102 that can be decoded by the watermark decoder 124, 127 when the media is presented by the media presentation device 112. For example, the media provider 102 and/or the AME 104 may provide at least one of the media to be encoded (e.g., embedded with watermarks), a media identifier that identifies the media, the SID corresponding to the media provider 102, and/or timestamps (e.g., TIC markers) to the watermark encoder 106. In some examples, the watermark encoder 106 may generate the timestamps while sequentially embedding watermarks in the media obtained from the media provider 102 and/or the AME 104. The watermark encoder 106 may generate watermarks that include at least one of the media identifier, the SID, and/or the timestamps. The watermark encoder 106 may encode the media by embedding the watermarks into the media. For example, the watermark encoder 106 may embed the at least one of the media identifier, the SID, and/or the timestamps, or portion(s) thereof, across one or more layers of multilayered watermarks associated with one or more frequencies (e.g., acoustic frequencies) that may be detected by the watermark decoder 124, 127. Advantageously, the watermark encoder 106 may generate the multilayered watermarks by inserting portion(s) of data to be embedded, such as the media identifier, the SID, and/or the timestamps, at one or more symbol positions of one or more layers of the multilayered watermark. The watermark encoder 106 may provide, deliver, and/or otherwise transmit the encoded media to the media presentation device 112 via the first network 108. Alternatively, the watermark encoder 106 may provide the encoded media to the media provider 102. In such examples, the media provider 102 may provide the encoded media to the media presentation device 112 via the first network 108.

The first network 108 and/or the second network 110 of the illustrated example is/are the Internet. However, the first network 108 and/or the second network 110 may be implemented using any suitable wired and/or wireless network(s) including, for example, one or more data buses, one or more Local Area Networks (LANs), one or more wireless LANs, one or more cellular networks, one or more private networks, one or more public networks, etc. The first network 108 enables the media provider 102 and/or the watermark encoder 106 to be in communication with the media presentation device 112. The second network 110 enables the AME 104 to be in communication with at least one of the first meter 120 or the second meter 126.

The media monitoring system 100 of the illustrated example includes the first meter 120 and/or the second meter 126 to monitor media presented by the media presentation device 112. In some examples, the first meter 120 and/or the second meter 126 may be referred to as a media device meter, a site meter, a site unit, a home unit, a portable device, a people meter, a wearable meter, etc. In the illustrated example, the media monitored by the first meter 120 and/or the second meter 126 can correspond to any type of media presentable by the media presentation device 112. For example, monitored media can correspond to media content, such a television programs, radio programs, movies, Internet video, recently telecast video on demand (RTVOD), library video-on-demand (VOD), etc., as well as commercials, advertisements, etc.

In the illustrated example, the first meter 120 and/or the second meter 126 determine metering data that may identify and/or be used to identify media presented by the media presentation device 112 (and, thus, infer media exposure) at the monitored site 130. In some examples, the first meter 120 and/or the second meter 126 may store and report such metering data via the second network 110 to the AME 104. The AME 104 performs any appropriate post-processing of the metering data to, for example, determine audience ratings information, identify demographics of users that accessed the media, identify targeted advertising to be provided to the monitored site 130, etc.

In the illustrated example, the media presentation device 112 monitored by the first meter 120 and/or the second meter 126 can correspond to any type of audio, video and/or multimedia presentation device capable of presenting media audibly and/or visually. In this example, the media presentation device 112 is a television (e.g., a smart television, an Internet-enabled television, etc.). For example, the media presentation device 112 can correspond to a television and/or display device that supports the National Television Standards Committee (NTSC) standard, the Phase Alternating Line (PAL) standard, the Systeme Electronique pour Couleur avec Memoire (SECAM) standard, a standard developed by the Advanced Television Systems Committee (ATSC), such as high definition television (HDTV), a standard developed by the Digital Video Broadcasting (DVB) Project, etc. As other examples, the media presentation device 112 can correspond to a multimedia computer system, a personal digital assistant, a cellular/mobile smartphone, a radio, a tablet computer, etc.

In the media monitoring system 100 of the illustrated example, the first meter 120, the second meter 126, and the AME 104 cooperate to perform media monitoring based on detecting media watermarks. Moreover, the first meter 120 and/or the second meter 126 detect media multilayer watermarks as disclosed herein for improved detection in acoustic environments. Examples of watermarks include identification codes, ancillary codes, etc., that may be transmitted within media signals. For example, identification codes can be transmitted as watermarked data embedded or otherwise included with media (e.g., inserted into the audio, video, or metadata stream of media) to uniquely identify broadcasters and/or media (e.g., content or advertisements). Watermarks can additionally or alternatively be used to carry other types of data, such as copyright protection information, secondary data (e.g., such as one or more hyperlinks pointing to secondary media retrievable via the Internet and associated with the primary media carrying the watermark), commands to control one or more devices, etc. Watermarks are typically extracted using a decoding operation, which may be implemented by the watermark decoder 124, 127 in this example.

In contrast, signatures are a representation of some characteristic of the media signal (e.g., a characteristic of the frequency spectrum of the signal). Signatures can be thought of as fingerprints. They are typically not dependent upon insertion of data in the media, but instead preferably reflect an inherent characteristic of the media and/or the signal transporting the media. Systems to utilize codes and/or signatures for audience measurement are long known. See, for example, U.S. Pat. No. 5,481,294 to Thomas et al., which is hereby incorporated by reference in its entirety.

In the illustrated example, the first meter 120 and the second meter 126 are implemented by portable devices (e.g., an Internet-enabled handset, a handheld device, a wearable device, a smartwatch, etc.) including the first input device circuitry 122, the first watermark decoder 124, the second watermark decoder 127, and/or the second input device circuitry 128. For example, the first meter 120 of the illustrated example may be implemented by an Internet-enabled handset, smartphone, etc. The second meter 126 of the illustrated example may be implemented by a wearable device (e.g., wrist-watch type device, a smartwatch, a fitness tracker, etc.).

In the illustrated example, the first input device circuitry 122 and/or the second input device circuitry 128 may capture audio generated by example audio devices 132 (e.g., speaker(s) of the media presentation device 112). The first input device circuitry 122 and/or the second input device circuitry 128 may provide the audio to a respective one of the watermark decoders 124, 127. The watermark decoders 124, 127 are configured to detect watermark(s) in media signal(s) (e.g., audio) output from a monitored media device, such as the media presentation device 112.

In some examples, the first meter 120 and/or the second meter 126 correspond to special purpose portable device(s) constructed to implement a respective one of the watermark decoders 124, 127. For example, the first meter 120 may be an application (e.g., a software and/or firmware application) that can be executed by the first panelist device 114 to extract watermarks from audio generated in response to an access of media by the media presentation device 112. In some such examples, the first meter 120 may utilize the first watermark decoder 124 to extract the watermarks. In some examples, the second meter 126 may be an application (e.g., a software and/or firmware application) that can be executed by the second panelist device 118 to extract watermarks from audio output from the audio devices 132. In some such examples, the second meter 126 may utilize the second watermark decoder 127 to extract the watermarks.

In some examples, the first meter 120 and/or the second meter 126 can be implemented by any portable device capable of being adapted (via hardware changes, software changes, firmware changes, etc., or any combination thereof) to implement a respective one of the watermark decoders 124, 127. As such, the first meter 120 and/or the second meter 126 can be implemented by a smartphone, a tablet computer, a handheld device, a wrist-watch type device, other wearable devices, a special purpose device, etc. In some examples, the first meter 120 and/or the second meter 126 can be implemented by a portable device that, although portable, is intended to be relatively stationary. Furthermore, in some examples, the first meter 120 and/or the second meter 126 can be implemented by or otherwise included in the media presentation device 112, such as when the media presentation device 112 corresponds to a portable device (e.g., a smartphone, a tablet computer, a handheld device, etc.) capable of presenting media. (This latter implementation can be especially useful in example scenarios in which a media monitoring application is executed on the media presentation device 112 itself, but the media presentation device 112 prevents, e.g., via digital rights management or other techniques, third-party applications, such as the media monitoring application, from accessing protected media data stored on the media presentation device 112.).

The terms "media data" and "media" as used herein mean data which is widely accessible, whether over-the-air, or via cable, satellite, network, internetwork (including the Internet), print, displayed, distributed on storage media, or by any other means or technique that is humanly perceptible, without regard to the form or content of such data, and including but not limited to audio, video, audio/video, text, images, animations, databases, broadcasts, displays (including but not limited to video displays, posters and billboards), signs, signals, web pages, print media and streaming media data.

Figure 2:
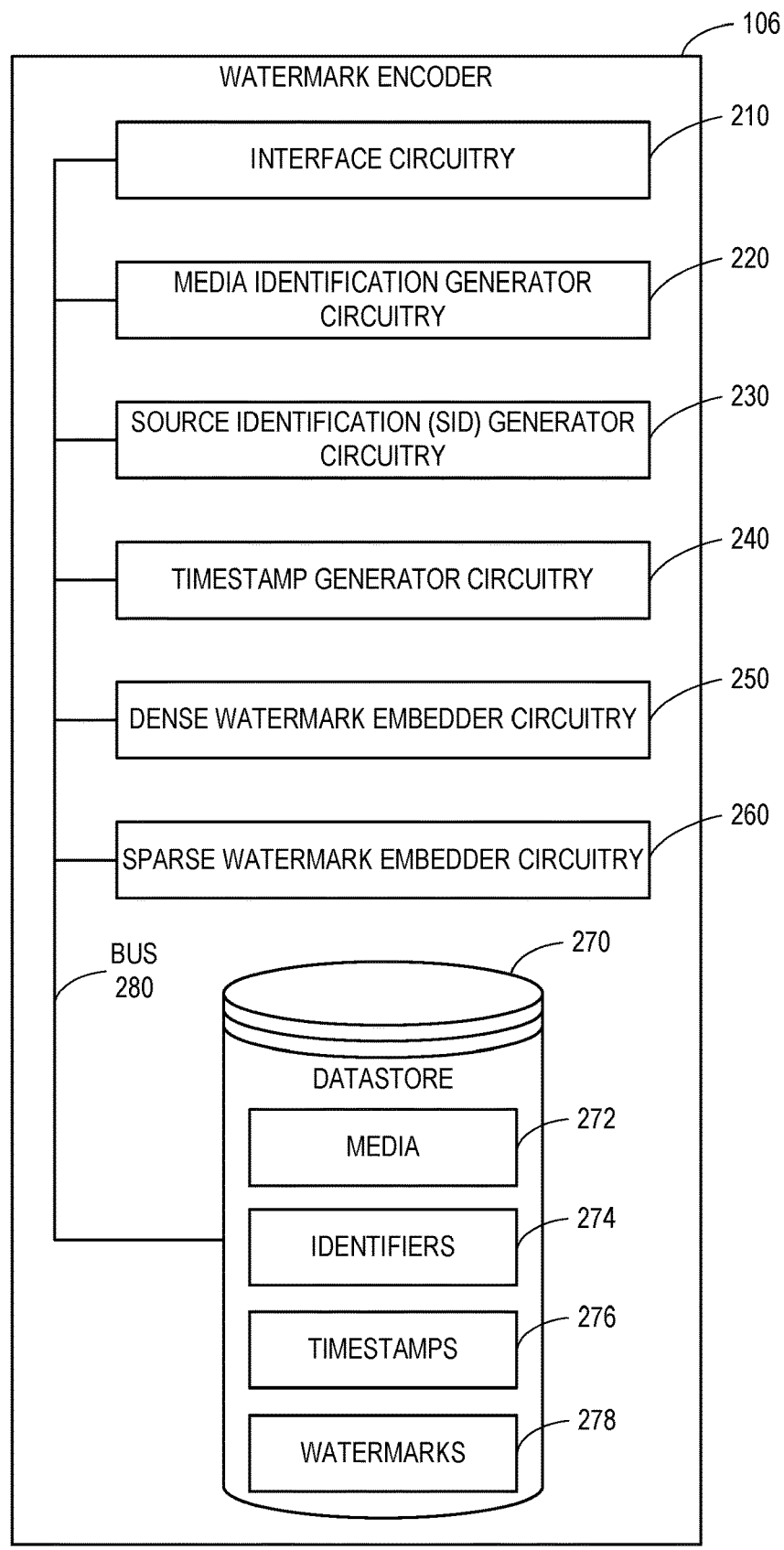
FIG. 2 is a block diagram of an example implementation of the example watermark encoder of FIG. 1.

FIG. 2 is a block diagram of an example implementation of the example watermark encoder 106 of FIG. 1 to encode media with multilayered watermarks to improve watermark detection in acoustic environments. The watermark encoder 106 of FIG. 2 may be instantiated by processor circuitry such as a central processing unit executing instructions. Additionally or alternatively, the watermark encoder 106 of FIG. 2 may be instantiated by an ASIC or an FPGA structured to perform operations corresponding to the instructions.

The watermark encoder 106 of the illustrated example of FIG. 2 includes example interface circuitry 210, example media identification generator circuitry 220, example source identification (SID) generator circuitry 230, example timestamp generator circuitry 240, example dense watermark embedder circuitry 250, example sparse watermark embedder circuitry 260, an example datastore 270, and an example bus 280. In this example, the datastore 270 includes example media 272, example identifiers 274, example timestamps 276, and example watermarks 278. The interface circuitry 210, the media identification generator circuitry 220, the SID generator circuitry 230, the timestamp generator circuitry 240, the dense watermark embedder circuitry 250, the sparse watermark embedder circuitry 260, and/or the datastore 270 is/are in communication with one(s) of each other by the bus 280. For example, the bus 280 may be implemented by at least one of an Inter-Integrated Circuit (I2C) bus, a Serial Peripheral Interface (SPI) bus, or a Peripheral Component Interconnect (PCI) bus. Additionally or alternatively, the bus 280 may implement any other type of computing or electrical bus.

The watermark encoder 106 includes the interface circuitry 210 to receive and/or transmit data. In some examples, the interface circuitry 210 receives and/or otherwise obtains at least one of the media 272, the identifiers 274, or the timestamps 276 from at least one of the media provider 102 or the AME 104 of FIG. 1. For example, the interface circuitry 210 may obtain the media 272 for encoding. In some examples, the interface circuitry 210 may implement a web server that receives data from the media provider 102 and/or the AME 104. In some examples, the interface circuitry 210 may implement a web server that transmits data to the media provider 102, the AME 104, and/or the media presentation device 112. In some examples, the interface circuitry 210 may receive and/or transmit data formatted as an HTTP message. However, any other message format and/or protocol may additionally or alternatively be used such as, for example, a file transfer protocol (FTP), a simple message transfer protocol (SMTP), an HTTP secure (HTTPS) protocol, etc. In some examples, the interface circuitry 210 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

The watermark encoder 106 includes the media identification generator circuitry 220 to generate a media identifier that identifies the media 272. In some such examples, the media identification generator circuitry 220 may generate the media identifier to be inserted into a watermark, such as a multilayered watermark as disclosed herein. In some examples, the media identification generator circuitry 220 generates the media identifier based on the media 272 (e.g., a title, a duration, etc., or any other data associated with the media 272). In some examples, the media identification generator circuitry 220 determines whether the media 272 is scheduled and/or otherwise intended to be accessed by device(s) (e.g., the media presentation device 112 of FIG. 1) after publishing of the media 272 by the media provider 102 of FIG. 1. For example, the media identification generator circuitry 220 may determine when the media 272 is to be accessed by device(s) based on data included with a request to encode the media 272 from at least one of the media provider 102 or the AME 104. In some such examples, the request may include metadata, a command or instruction, or any other data to indicate whether the media 272 is scheduled to be accessed as a linear program, as an RTVOD program, a library VOD program, etc. In some examples, the media identification generator circuitry 220 may identify the media 272 as a linear program in response to a determination that the media 272 is not to be accessed by the media presentation device 112 after an initial publishing of the media 272 (e.g., the media 272 is to be accessed by the media presentation device 112 concurrently with the publishing of the media 272).

In some examples, the media identification generator circuitry 220 determines whether the media 272 is scheduled and/or otherwise intended to be accessed by device(s) after a premiere or initial publishing of the media 272. For example, the media identification generator circuitry 220 can determine whether the media 272 is scheduled, slated, planned, programmed, tagged, identified, etc., to be accessed by device(s) within a first time period (e.g., within three days, within four days, etc.) after the publishing of the media 272. In some examples, the media identification generator circuitry 220 determines whether the media 272 is scheduled to be accessed by device(s) within a second time period (e.g., within seven days, within eighth days, etc.) after the publishing of the media 272. In some examples, the media identification generator circuitry 220 determines whether a media file (e.g., the media 272) has completed an encoding process.

The watermark encoder 106 includes the SID generator circuitry 230 to generate a SID that identifies a provider (e.g., a media provider), a generator, a distributor, and/or otherwise publisher of the media 272. For example, the SID generator circuitry 230 may generate a SID that identifies the media provider 102. In some such examples, the SID generator circuitry 230 may generate the SID to be inserted into a watermark, such as a multilayered watermark as disclosed herein.

The watermark encoder 106 includes the timestamp generator circuitry 240 to generate timestamps. In some examples, the timestamp generator circuitry 240 may generate a timestamp to be inserted into a watermark, such as a multilayered watermark as disclosed herein. In some examples, the timestamp generator circuitry 240 generates the timestamp to be distributed across one or more layers of a multilayered watermark. In some examples, the timestamp generator circuitry 240 may generate one or more error check or parity bits to be associated with the timestamp. For example, at least one of the dense watermark embedder circuitry 250 or the sparse watermark embedder circuitry 260 may encode the timestamp and one or more parity bits into one or more layers of a multilayer watermark.

The watermark encoder 106 includes the dense watermark embedder circuitry 250 to generate a watermark in which an entirety or substantial quantity of symbol positions of the watermark are filled with symbols (e.g., watermark symbols, data symbols, audio encoding symbols, etc.). For example, the dense watermark embedder circuitry 250 may generate a dense watermark that has eight symbol positions by inserting a symbol at every one of the eight symbol positions. In some examples, the dense watermark embedder circuitry 250 may encode the media 272 with dense watermarks to indicate that the media 272 is accessed during a premiere or initial publishing of the media 272.

In some examples, the dense watermark embedder circuitry 250 may encode the media 272 with single layer watermarks to convey at least one of media identifiers or timestamps. In some examples, the dense watermark embedder circuitry 250 may encode the media 272 with multilayer watermarks to convey at least one of media identifiers or timestamps.

The watermark encoder 106 includes the sparse watermark embedder circuitry 260 to generate a watermark in which a substantial portion of symbol positions of a watermark is empty and/or otherwise not filled with a symbol. For example, the sparse watermark embedder circuitry 260 may generate a sparse watermark that has eight symbol positions by inserting a symbol at one or two of the eight symbol positions. In some examples, the sparse watermark embedder circuitry 260 may encode the media 272 with sparse watermarks to indicate that the media 272 is accessed after a premiere or initial publishing of the media 272. For example, the sparse watermark embedder circuitry 260 may encode the media 272 with sparse watermarks to indicate that the media 272 is accessed within three days, within seven days, etc., after the premiere of the media 272 on a platform (e.g., a media platform, a media provider platform, etc.).

In some examples, the sparse watermark embedder circuitry 260 may encode the media 272 with sparse single layer watermarks to convey at least one of media identifiers or timestamps. In some examples, the sparse watermark embedder circuitry 260 may encode the media 272 with sparse multilayer watermarks to convey at least one of media identifiers or timestamps. For example, the sparse watermark embedder circuitry 260 may select a first symbol to be inserted at a first symbol position on a first encoding layer of a multilayered watermark. In some such examples, the sparse watermark embedder circuitry 260 may select that one or more of the remaining symbol positions on the first encoding layer is/are to remain empty and/or otherwise not include a symbol. In some examples, the sparse watermark embedder circuitry 260 may select a second symbol to be inserted at a second symbol position on a second encoding layer of the multilayered watermark. In some such examples, the sparse watermark embedder circuitry 260 may select that one or more of the remaining symbol positions on the second encoding layer is/are to remain empty and/or otherwise not include a symbol (e.g., a symbol is not encoded, embedded, etc., at the empty symbol positions). The sparse watermark embedder circuitry 260 may encode the first symbol in a media file (e.g., the media 272) at the first symbol position on the first encoding layer. The sparse watermark embedder circuitry 260 may encode the second symbol in the media file at the second symbol position on the second encoding layer. In some examples, the sparse watermark embedder circuitry 260 may select the first symbol, the second symbol, and the placement(s) of the first and second symbols to indicate that the media 272 is to be accessed within a first time period, a second time period, etc., after the premiere of the media 272.

The watermark encoder 106 of the illustrated example includes the datastore 270 to record data (e.g., the media 272, the identifiers 274, the timestamps 276, the watermarks 278, etc.). For example, the datastore 270 may store the media 272, which may include unencoded and/or encoded media. In some such examples, the datastore 270 may record the media 272 obtained from at least one of the media provider 102 or the AME 104 of FIG. 1. The datastore 270 may store the identifiers 274, which may include media identifiers generated by the media identification generator circuitry 220, SIDs generated by the SID generator circuitry 230, etc. The datastore 270 may store the timestamps 276 generated by the timestamp generator circuitry 240. The datastore 270 may store the watermarks 278 generated by at least one of the dense watermark embedder circuitry 250 or the sparse watermark embedder circuitry 260.

The datastore 270 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The datastore 270 may additionally or alternatively be implemented by one or more double data rate (DDR) memories, such as DDR, DDR2, DDR3, DDR4, mobile DDR (mDDR), etc. The datastore 270 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. While in the illustrated example the datastore 270 is illustrated as a single datastore, the datastore 270 may be implemented by any number and/or type(s) of datastores. Furthermore, the data stored in the datastore 270 may be in any data format such as, for example, binary data, comma delimited data, tab delimited data, structured query language (SQL) structures, etc. In some examples, the datastore 270 implements one or more databases. The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list or in any other form.

In some examples, the watermark encoder 106 includes means for encoding a symbol in a media file. For example, the means for encoding may be implemented by at least one of the interface circuitry 210, the media identification generator circuitry 220, the SID generator circuitry 230, the timestamp generator circuitry 240, the dense watermark embedder circuitry 250, the sparse watermark embedder circuitry 260, or the datastore 270. In some examples, the at least one of the interface circuitry 210, the media identification generator circuitry 220, the SID generator circuitry 230, the timestamp generator circuitry 240, the dense watermark embedder circuitry 250, the sparse watermark embedder circuitry 260, or the datastore 270 may be instantiated by processor circuitry such as the example processor circuitry 1412 of FIG. 14. For instance, the at least one of the interface circuitry 210, the media identification generator circuitry 220, the SID generator circuitry 230, the timestamp generator circuitry 240, the dense watermark embedder circuitry 250, the sparse watermark embedder circuitry 260, or the datastore 270 may be instantiated by the example general purpose processor circuitry 1700 of FIG. 17 executing machine executable instructions such as that implemented by at least blocks 1002, 1004, 1006, 1008 of FIG. 10, blocks 1102, 1104, 1106, 1108, 1110, 1112, 1114, 1116, 1118, 1120, 1122 of FIG. 11, blocks 1202, 1204, 1206, 1208 of FIG. 12, and/or blocks 1302, 1304, 1306, 1308, 1310, 1312, 1314, 1316, 1318 of FIG. 13. In some examples, the at least one of the interface circuitry 210, the media identification generator circuitry 220, the SID generator circuitry 230, the timestamp generator circuitry 240, the dense watermark embedder circuitry 250, the sparse watermark embedder circuitry 260, or the datastore 270 may be instantiated by hardware logic circuitry, which may be implemented by an ASIC or the FPGA circuitry 1800 of FIG. 18 structured to perform operations corresponding to the machine readable instructions. Additionally or alternatively, the at least one of the interface circuitry 210, the media identification generator circuitry 220, the SID generator circuitry 230, the timestamp generator circuitry 240, the dense watermark embedder circuitry 250, the sparse watermark embedder circuitry 260, or the datastore 270 may be instantiated by any other combination of hardware, software, and/or firmware. For example, the at least one of the interface circuitry 210, the media identification generator circuitry 220, the SID generator circuitry 230, the timestamp generator circuitry 240, the dense watermark embedder circuitry 250, the sparse watermark embedder circuitry 260, or the datastore 270 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for encoding is to encode a first symbol in a media file at a first symbol position on a first encoding layer of a multilayered watermark, and encode a second symbol in the media file at a second symbol position on a second encoding layer of the multilayered watermark, the first encoding layer and the second encoding layer including a plurality of symbol positions, one or more of the plurality of the symbol positions on at least one of the first encoding layer or the second encoding layer to be empty.

In some examples, the means for encoding includes means for identifying a media file as scheduled to be accessed by a media device after a publishing of the media file by a media provider. In some examples, the means for identifying may be implemented by the media identification generator circuitry 220.

In some examples, in response to identifying the media file as scheduled to be accessed by the media device within a first time period after the publishing of the media file, the means for encoding is to select the first symbol to be inserted at the first symbol position and the second symbol to be inserted at the second symbol position to identify an access of the media filed by the media device within the first time period. For example, the means for encoding may include means for selecting the first symbol and the second symbol. In some such examples, the means for selecting may be implemented by at least one of the dense watermark embedder circuitry 250 or the sparse watermark embedder circuitry 260.

In some examples, in response to identifying the media file as scheduled to be accessed by the media device within a second time period after the publishing of the media file, the means for encoding is to select the first symbol to be inserted at a third symbol position on the first encoding layer and the second symbol to be inserted at a fourth symbol position on the second encoding layer, encode the first symbol in the media file at the third symbol position on the first encoding layer, and encode the second symbol in the media file at the fourth symbol position on the second encoding layer, one or more of the plurality of the symbol positions on at least one of the first encoding layer or the second encoding layer to be empty.

In some examples, the means for encoding is to encode a first bit sequence in a media file on a first encoding layer of a multilayered watermark, the first bit sequence to include one or more first bits associated with a timestamp of the multilayered watermark, and encode a second bit sequence in the media file on a second encoding layer of the multilayered watermark, the second bit sequence to include (i) one or more second bits associated with the timestamp and (ii) one or more third bits.

In some examples, the means for encoding includes means for converting to convert the timestamp in a first format to a second format, the first format based on a number of seconds at which the multilayered watermark is to be encoded in the media file, the second format based on a number of minutes at which the multilayered watermark is to be encoded in the media file, and convert the timestamp in the second format to a third bit sequence, the first bit sequence corresponding to one or more least significant bits of the third bit sequence, the second bit sequence corresponding to one or more most significant bits of the third bit sequence. In some such examples, the means for converting may be implemented by the timestamp generator circuitry 240.

In some examples, the means for encoding includes means for determining to determine a first value based on the timestamp and a range of timestamps, determine a second value based on the timestamp, the first value, and the range of timestamps, and convert the second value into the first bit sequence. In some such examples, the means for determining is to determine a third value based on a sum of the first value and the second value, convert the third value into a third bit sequence, and determine the one or more third bits by shifting the third bit sequence by an offset value. In some such examples, the means for determining may be implemented by the timestamp generator circuitry 240.

In some examples, the means for encoding includes means for determining to determine a third value based on a multiplication of the first value and a fourth value, determine a fifth value based on a sum of the third value and a parity value, the parity value to be converted into the one or more third bits, and convert the fifth value into the one or more second bits. In some such examples, the means for determining may be implemented by the timestamp generator circuitry 240.

In some examples in which the media file is to be encoded with a plurality of multilayered watermarks with associated timestamps, successive ones of the timestamps to be incremented at a minute level, the plurality of the multilayered watermarks including the multilayer watermark, the timestamps including the timestamp, the means for encoding includes means for incrementing to increment successive ones of the plurality of the timestamps at the minute level, and in response to the incrementing of the successive ones of the plurality of the timestamps, increment the first bit sequence and the second bit sequence of respective ones of the successive ones of the plurality of the timestamps. In some such examples, the means for incrementing may be implemented by the timestamp generator circuitry 240.

While an example manner of implementing the watermark encoder 106 of FIG. 1 is illustrated in FIG. 2, one or more of the elements, processes, and/or devices illustrated in FIG. 2 may be combined, divided, re-arranged, omitted, eliminated, and/or implemented in any other way. Further, the interface circuitry 210, the media identification generator circuitry 220, the SID generator circuitry 230, the timestamp generator circuitry 240, the dense watermark embedder circuitry 250, the sparse watermark embedder circuitry 260, the datastore 270, the bus 280, and/or, more generally, the example watermark encoder 106 of FIG. 1, may be implemented by hardware, software, firmware, and/or any combination of hardware, software, and/or firmware. Thus, for example, any of the interface circuitry 210, the media identification generator circuitry 220, the SID generator circuitry 230, the timestamp generator circuitry 240, the dense watermark embedder circuitry 250, the sparse watermark embedder circuitry 260, the datastore 270, the bus 280, and/or, more generally, the example watermark encoder 106, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the interface circuitry 210, the media identification generator circuitry 220, the SID generator circuitry 230, the timestamp generator circuitry 240, the dense watermark embedder circuitry 250, the sparse watermark embedder circuitry 260, the datastore 270, and/or the bus 280 is/are hereby expressly defined to include a non-transitory computer readable storage device or storage disk such as a memory, a DVD, a CD, a Blu-ray disk, etc., including the software and/or firmware. Further still, the example watermark encoder 106 of FIG. 1 may include one or more elements, processes, and/or devices in addition to, or instead of, those illustrated in FIG. 2, and/or may include more than one of any or all of the illustrated elements, processes and devices.

Figure 3:
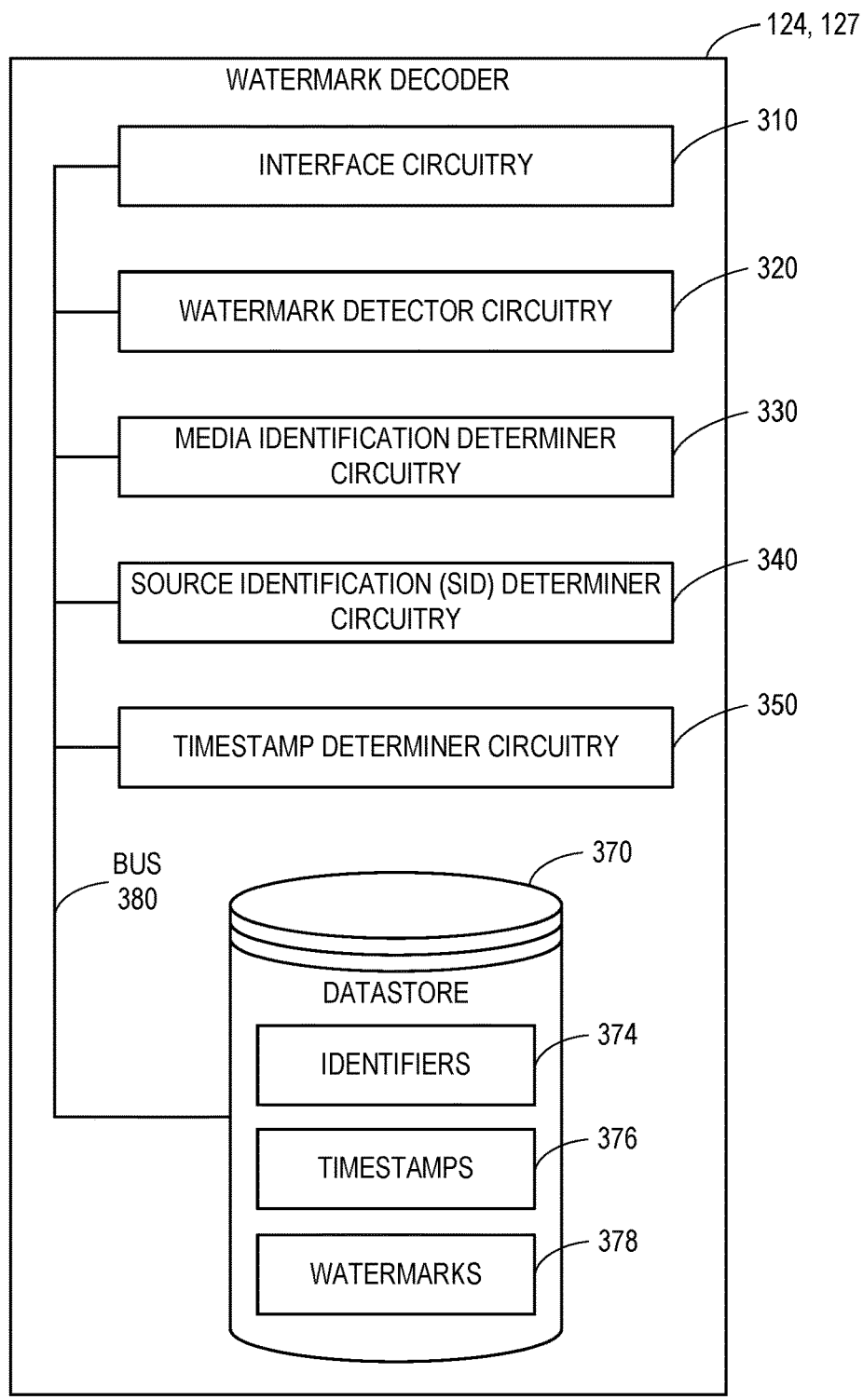
FIG. 3 is a block diagram of an example implementation of the example watermark decoder of FIG. 1.

FIG. 3 is a block diagram of an example implementation of the first example watermark decoder 124 of FIG. 1 and/or the second example watermark decoder 127 of FIG. 1 to decode media that is embedded with multilayered watermarks. The watermark decoder 124, 127 of FIG. 3 may be instantiated by processor circuitry such as a central processing unit executing instructions. Additionally or alternatively, the watermark decoder 124, 127 of FIG. 3 may be instantiated by an ASIC or an FPGA structured to perform operations corresponding to the instructions.

The watermark decoder 124, 127 of FIG. 3 includes example interface circuitry 310, example watermark detector circuitry 320, example media identification determiner circuitry 330, example source identification (SID) determiner circuitry 340, example timestamp determiner circuitry 350, an example datastore 370, and an example bus 380. In this example, the datastore 370 includes example identifiers 374, example timestamps 376, and example watermarks 378. In the illustrated example, the interface circuitry 310, the watermark detector circuitry 320, the media identification determiner circuitry 330, the SID determiner circuitry 340, the timestamp determiner circuitry 350, and the datastore 370 is/are in communication with one(s) of each other by the bus 380. For example, the bus 380 may be implemented by at least one of an I2C bus, a SPI bus, a PCI, and/or a PCIe bus. Additionally or alternatively, the bus 380 may implement any other type of computing or electrical bus.

The watermark decoder 124, 127 of the illustrated example includes the interface circuitry 310 to receive and/or transmit data. In some examples, the interface circuitry 310 receives and/or otherwise obtains data from the AME 104, which may include firmware and/or software updates to one or more components of the watermark decoder 124, 127. In some examples, the interface circuitry 310 may transmit the identifiers 374, the timestamps 376, or the watermarks 378 to the AME 104 of FIG. 1 via the second network 110. In some examples, the interface circuitry 310 may implement a web server that receives data from the AME 104. In some examples, the interface circuitry 310 may implement a web server that transmits data to the AME 104. In some examples, the interface circuitry 310 may receive and/or transmit data formatted as an HTTP message. However, any other message format and/or protocol may additionally or alternatively be used such as, for example, FTP, SMTP, HTTPS protocol, etc. In some examples, the interface circuitry 310 may be implemented by hardware in accordance with any type of interface standard, such as an Ethernet interface, a USB interface, a Bluetooth® interface, an NFC interface, a PCI interface, and/or a PCIe interface.

The watermark decoder 124, 127 of the illustrated example includes the watermark detector circuitry 320 to detect a watermark associated with media (e.g., the media 272) accessed and/or presented by the media presentation device 112 of FIG. 1. In some examples, the watermark detector circuitry 320 determines that encoded media is accessed/presented by the media presentation device 112 in response to a detection of a watermark embedded in audio generated by the audio devices 132 of FIG. 1. In some examples, the watermark detector circuitry 320 extracts watermarks from the audio. For example, the watermark detector circuitry 320 may extract a dense single or multilayer watermark, a sparse single or multilayer watermark, etc., from the audio.

In some examples, the watermark detector circuitry 320 identifies symbol(s) at symbol position(s). For example, the watermark detector circuitry 320 may identify a first symbol at a first symbol position of a first encoding layer of a multilayer watermark, a second symbol at a second symbol position of a second encoding layer of the multilayer watermark, etc. In some examples, the watermark detector circuitry 320 determines whether to continue monitoring for access of encoded media by device(s) based on whether additional watermarks have been detected from the audio.

The watermark decoder 124, 127 of the illustrated example includes the media identification determiner circuitry 330 to determine whether a media identifier is identified based on a watermark. For example, the media identification determiner circuitry 330 may determine that a watermark includes a media identifier that identifies media based on detected symbol(s), symbol position(s) of the detected symbol(s), etc. In some such examples, the media identification determiner circuitry 330 may identify the media based on the media identifier.

The watermark decoder 124, 127 of the illustrated example includes the SID determiner circuitry 340 to determine whether a SID is identified based on a watermark. For example, the SID determiner circuitry 340 may determine that a watermark includes a SID that identifies a provider of the accessed media based on detected symbol(s), symbol position(s) of the detected symbol(s), etc. In some such examples, the SID determiner circuitry 340 may identify the provider of the accessed media based on the SID.

The watermark decoder 124, 127 of the illustrated example includes the timestamp determiner circuitry 350 to determine whether a timestamp is identified based on a watermark. For example, the timestamp determiner circuitry 350 may determine that a watermark includes timestamp data that identifies a portion of the media that the media presentation device 112 is presenting based on detected symbol(s), symbol position(s) of the detected symbol(s), etc. In some examples, the timestamp determiner circuitry 350 may determine a timestamp based on timestamp data that is encoded on multiple layers of a multilayer watermark. For example, the timestamp determiner circuitry 350 may identify a first bit sequence on a first encoding layer of a multilayer watermark and a second bit sequence on a second encoding layer of the multilayer watermark. In some such examples, the timestamp determiner circuitry 350 may assemble, compile, and/or otherwise determine the timestamp encoded in the media based on the first bit sequence, the second bit sequence, etc., and/or combination(s) thereof.

In some examples, the timestamp determiner circuitry 350 may check, verify, and/or otherwise validate that the decoded timestamp is correct based on one or more error check or parity bits included in at least one of the first bit sequence or the second bit sequence. For example, the first bit sequence and/or the second bit sequence may include one or more parity bits that, when decoded, may be used by the timestamp determiner circuitry 350 to determine whether the timestamp is a valid timestamp.

In some examples, the timestamp determiner circuitry 350 may determine that one(s) of the watermark symbols convey a state (e.g., a media state) of accessed media. For example, the timestamp determiner circuitry 350, based on a symbol position and/or encoding layer of one or more watermark symbols, may determine that the one or more watermark symbols convey and/or identify a first state (e.g., a first media state). In some such examples, the first state may correspond to media being accessed and/or presented within a first time period after an initial publishing of the media. In some such examples, the timestamp determiner circuitry 350 may determine that the one or more watermark symbols (e.g., encoding layer(s) and/or symbol position(s) associated with the one or more watermark symbols) indicate that the accessed/presented media has the first state. In some such examples, the timestamp determiner circuitry 350 may determine that the first state implements a C3 media state, which may indicate that the accessed/presented RTVOD media is being accessed/presented within three days of the initial publishing.

In some examples, the timestamp determiner circuitry 350, based on a symbol position and/or encoding layer of one or more watermark symbols, may determine that the one or more watermark symbols convey and/or identify a second state (e.g., a second media state). In some such examples, the second state may correspond to media being accessed and/or presented within a second time period after an initial publishing of the media. In some such examples, the timestamp determiner circuitry 350 may determine that the one or more watermark symbols (e.g., encoding layer(s) and/or symbol position(s) associated with the one or more watermark symbols) indicate that the accessed/presented media has the second state. In some such examples, the timestamp determiner circuitry 350 may determine that the second state implements a C7 media state, which may indicate that the accessed/presented RTVOD media is being accessed/presented within seven days of the initial publishing. In some examples, at least one of the watermark detector circuitry 320, the media identification determiner circuitry 330, and/or the SID determiner circuitry 340 may determine that the one or more watermark symbols indicate the first media state, the second media state, etc.

The watermark decoder 124, 127 of the illustrated example includes the datastore 370 to record data (e.g., the identifiers 374, the timestamps 376, the watermarks 378, the media state(s), etc.). For example, the datastore 370 may store the identifiers 374, which may include identifiers (e.g., media identifiers, SIDs, etc.) extracted from a watermark by the watermark detector circuitry 320 and/or identified by the media identification determiner circuitry 330. The datastore 370 may store the timestamps 376 determined by the timestamp determiner circuitry 350. The datastore 370 may store the watermarks 378 extracted by the watermark detector circuitry 320.

The datastore 370 may be implemented by a volatile memory (e.g., an SDRAM, a DRAM, an RDRAM, etc.) and/or a non-volatile memory (e.g., flash memory). The datastore 370 may additionally or alternatively be implemented by one or more DDR memories, such as DDR, DDR2, DDR3, DDR4, mDDR, etc. The datastore 370 may additionally or alternatively be implemented by one or more mass storage devices such as HDD(s), CD drive(s), DVD drive(s), SSD drive(s), etc. While in the illustrated example the datastore 370 is illustrated as a single datastore, the datastore 370 may be implemented by any number and/or type(s) of datastores. Furthermore, the data stored in the datastore 370 may be in any data format such as, for example, binary data, comma delimited data, tab delimited data, SQL structures, etc. In some examples, the datastore 370 implements one or more databases.

In some examples, the watermark decoder 124, 127 includes means for decoding media. For example, the means for decoding may be implemented by at least one of the interface circuitry 310, the watermark detector circuitry 320, the media identification determiner circuitry 330, the SID determiner circuitry 340, the timestamp generator circuitry 350, or the datastore 370. In some examples, the at least one of the interface circuitry 310, the watermark detector circuitry 320, the media identification determiner circuitry 330, the SID determiner circuitry 340, the timestamp generator circuitry 350, or the datastore 370 may be instantiated by processor circuitry such as the example processor circuitry 1412 of FIG. 14. For instance, the at least one of the interface circuitry 310, the watermark detector circuitry 320, the media identification determiner circuitry 330, the SID determiner circuitry 340, the timestamp generator circuitry 350, or the datastore 370 may be instantiated by the example general purpose processor circuitry 1700 of FIG. 17 executing machine executable instructions such as that implemented by at least blocks 1010, 1012, 1014, 1016, 1018, 1022 of FIG. 10 and/or blocks 1210, 1212, 1214, 1216, 1220 of FIG. 12. In some examples, the at least one of the interface circuitry 310, the watermark detector circuitry 320, the media identification determiner circuitry 330, the SID determiner circuitry 340, the timestamp generator circuitry 350, or the datastore 370 may be instantiated by hardware logic circuitry, which may be implemented by an ASIC or the FPGA circuitry 1800 of FIG. 18 structured to perform operations corresponding to the machine readable instructions. Additionally or alternatively, the at least one of the interface circuitry 310, the watermark detector circuitry 320, the media identification determiner circuitry 330, the SID determiner circuitry 340, the timestamp generator circuitry 350, or the datastore 370 may be instantiated by any other combination of hardware, software, and/or firmware. For example, the at least one of the interface circuitry 310, the watermark detector circuitry 320, the media identification determiner circuitry 330, the SID determiner circuitry 340, the timestamp generator circuitry 350, or the datastore 370 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for decoding is to, in response to an access of the media file by a media device, extract the multilayered watermark from audio of the media file, identify the first symbol at the first symbol position and the second symbol at the second symbol position, determine that the media file is accessed within a first time period or a second time period after a publishing of the media file by a media provider based on the first symbol at the first symbol position and the second symbol at the second symbol position, and provide an indication to a server that the media file is accessed within the first time period or the second time period.

While an example manner of implementing the first watermark decoder 124 of FIG. 1 and/or the second watermark decoder 127 of FIG. 1 is illustrated in FIG. 3, one or more of the elements, processes, and/or devices illustrated in FIG. 3 may be combined, divided, re-arranged, omitted, eliminated, and/or implemented in any other way. Further, the interface circuitry 310, the watermark detector circuitry 320, the media identification determiner circuitry 330, the SID determiner circuitry 340, the timestamp determiner circuitry 350, the datastore 370, the bus 380, and/or, more generally, the first watermark decoder 124 of FIG. 1 and/or the second watermark decoder 127 of FIG. 1, may be implemented by hardware, software, firmware, and/or any combination of hardware, software, and/or firmware. Thus, for example, any of the interface circuitry 310, the watermark detector circuitry 320, the media identification determiner circuitry 330, the SID determiner circuitry 340, the timestamp determiner circuitry 350, the datastore 370, the bus 380, and/or, more generally, the first watermark decoder 124 of FIG. 1 and/or the second watermark decoder 127 of FIG. 1, could be implemented by processor circuitry, analog circuit(s), digital circuit(s), logic circuit(s), programmable processor(s), programmable microcontroller(s), GPU(s), DSP(s), ASIC(s), PLD(s), and/or FPLD(s) such as FPGAs. When reading any of the apparatus or system claims of this patent to cover a purely software and/or firmware implementation, at least one of the interface circuitry 310, the watermark detector circuitry 320, the media identification determiner circuitry 330, the SID determiner circuitry 340, the timestamp determiner circuitry 350, the datastore 370, and/or the bus 380 is/are hereby expressly defined to include a non-transitory computer readable storage device or storage disk such as a memory, a DVD, a CD, a Blu-ray disk, etc., including the software and/or firmware. Further still, the first watermark decoder 124 of FIG. 1 and/or the second watermark decoder 127 of FIG. 1 may include one or more elements, processes, and/or devices in addition to, or instead of, those illustrated in FIG. 3, and/or may include more than one of any or all of the illustrated elements, processes and devices.

Figure 4:
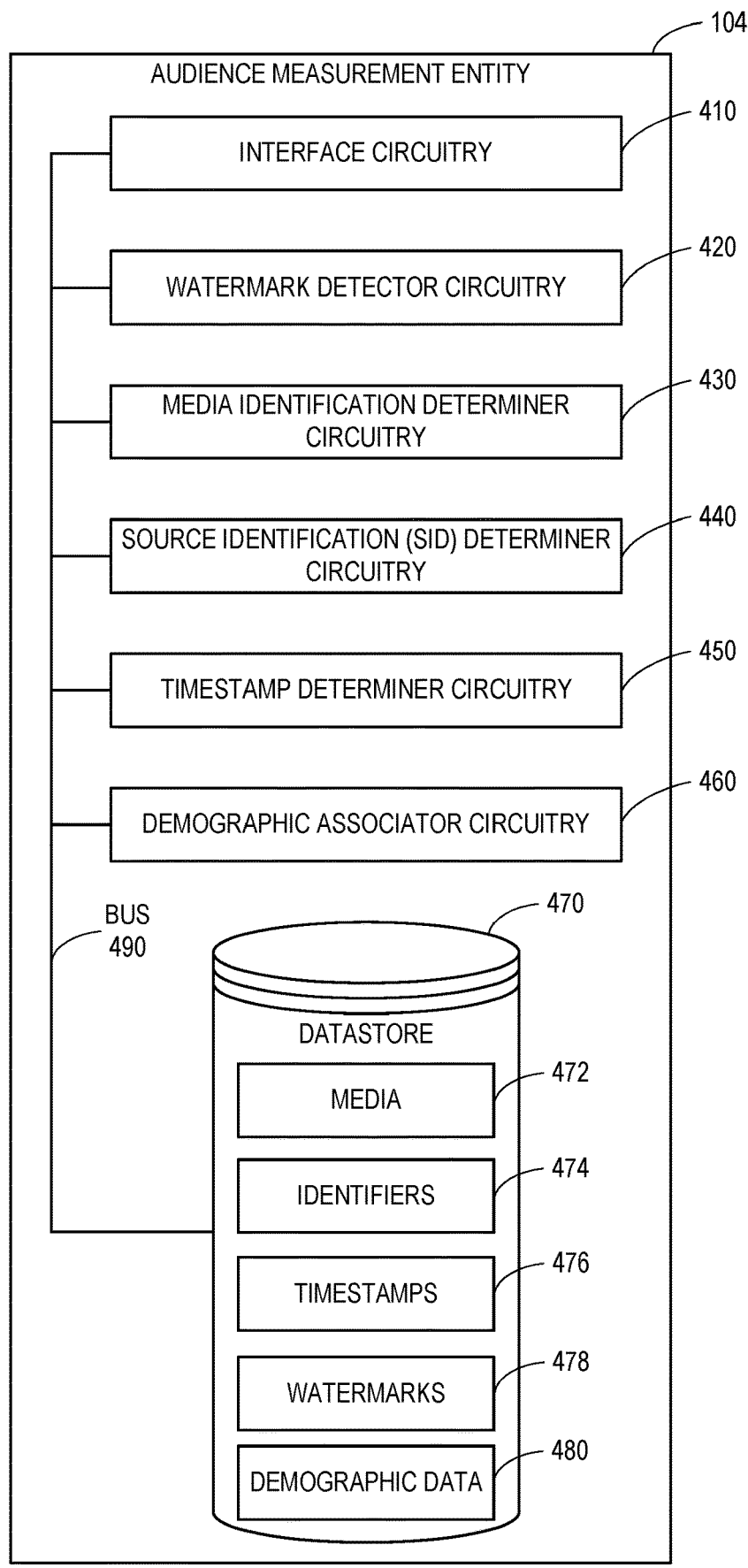
FIG. 4 is a block diagram of an example implementation of the example audience measurement entity of FIG. 1.

FIG. 4 is a block diagram of an example implementation of the example AME 104 of FIG. 1 to associate accessed media with demographics (e.g., demographic data) of users based on multilayered watermarks embedded in the accessed media. The AME 104 of FIG. 4 may be instantiated by processor circuitry such as a central processing unit executing instructions. Additionally or alternatively, the AME 104 of FIG. 4 may be instantiated by an ASIC or an FPGA structured to perform operations corresponding to the instructions.

The AME 104 of the illustrated example includes example interface circuitry 410, example watermark detector circuitry 420, example media identification determiner circuitry 430, example source identification (SID) determiner circuitry 440, example timestamp determiner circuitry 450, example demographic associator circuitry 460, an example datastore 470, and an example bus 490. In this example, the datastore 470 includes example media 472, example identifiers 474, example timestamps 476, example watermarks 478, and example demographic data 480. The interface circuitry 410, the watermark detector circuitry 420, the media identification determiner circuitry 430, the SID determiner circuitry 440, the timestamp determiner circuitry 450, the demographic associator circuitry 460, and the datastore 470 is/are in communication with one(s) of each other by the bus 490. For example, the bus 490 may be implemented by at least one of an I2C bus, a SPI bus, a PCI, and/or a PCIe bus. Additionally or alternatively, the bus 490 may implement any other type of computing or electrical bus.

The AME 104 of the illustrated example includes the interface circuitry 410 to receive and/or transmit data. In some examples, the interface circuitry 410 receives and/or otherwise obtains data from the media provider 102 and/or the watermark encoder 106, which may include the media 472. In some examples, the interface circuitry 410 may transmit the identifiers 474 and/or the timestamps 476 to the media provider 102 and/or the watermark encoder 106. In some examples, the interface circuitry 410 may receive the identifiers 474, the timestamps 476, and/or the watermarks 478 from the first meter 120 and/or the second meter 126 via the second network 110. In some examples, the AME 104 may transmit the demographic data 480 to the media provider 102.

In some examples, the interface circuitry 410 may implement a web server that receives and/or transmits data. In some examples, the interface circuitry 410 may receive and/or transmit data formatted as an HTTP message. However, any other message format and/or protocol may additionally or alternatively be used such as, for example, FTP, SMTP, HTTPS protocol, etc. In some examples, the interface circuitry 410 may be implemented by hardware in accordance with any type of interface standard, such as an Ethernet interface, a USB interface, a Bluetooth® interface, an NFC interface, a PCI interface, and/or a PCIe interface.

The AME 104 of the illustrated example includes the watermark detector circuitry 420 to detect a watermark associated with media (e.g., the media 472) accessed by the media presentation device 112 of FIG. 1. In some examples, the watermark detector circuitry 420 determines that encoded media is accessed by the media presentation device 112 in response to a detection of a watermark embedded in audio generated by the audio devices 132 of FIG. 1. In some examples, the watermark detector circuitry 420 extracts watermarks from the audio. For example, the watermark detector circuitry 420 may extract a dense single or multilayer watermark, a sparse single or multilayer watermark, etc., from the audio. In some such examples, the first meter 120 and/or the second meter 126 may provide an audio sample or portion to the AME 104, and the watermark detector circuitry 420 may extract a watermark from the audio sample or portion.

In some examples, the watermark detector circuitry 420 identifies symbol(s) at symbol position(s). For example, the watermark detector circuitry 420 may identify a first symbol at a first symbol position of a first encoding layer of a multilayer watermark, a second symbol at a second symbol position of a second encoding layer of the multilayer watermark, etc. In some examples, the watermark detector circuitry 420 determines whether to continue monitoring for access of encoded media by device(s) based on whether additional watermarks have been received by the interface circuitry 410.

The AME 104 of the illustrated example includes the media identification determiner circuitry 430 to determine whether a media identifier is included in a watermark. For example, the media identification determiner circuitry 430 may determine that a watermark includes a media identifier that identifies the media 472 based on detected symbol(s), symbol position(s) of the detected symbol(s), etc. In some such examples, the media identification determiner circuitry 430 may identify the media 472 based on the media identifier.

The AME 104 of the illustrated example includes the SID determiner circuitry 440 to determine whether a SID is identified based on a watermark. For example, the SID determiner circuitry 440 may determine that a watermark includes a SID that identifies a provider of the accessed media based on detected symbol(s), symbol position(s) of the detected symbol(s), etc. In some such examples, the SID determiner circuitry 440 may identify the provider of the accessed media based on the SID.

The AME 104 of the illustrated example includes the timestamp determiner circuitry 450 to determine whether a timestamp is identified based on a watermark. For example, the timestamp determiner circuitry 450 may determine that a watermark includes timestamp data that identifies a portion of the media that the media presentation device 112 is presenting based on detected symbol(s), symbol position(s) of the detected symbol(s), etc. In some examples, the timestamp determiner circuitry 450 may determine a timestamp based on timestamp data that is encoded on multiple layers of a multilayer watermark. For example, the timestamp determiner circuitry 450 may identify a first bit sequence on a first encoding layer of a multilayer watermark and a second bit sequence on a second encoding layer of the multilayer watermark. In some such examples, the timestamp determiner circuitry 450 may assemble, compile, and/or otherwise determine the timestamp encoded in the media based on the first bit sequence, the second bit sequence, etc., and/or combination(s) thereof.

In some examples, the timestamp determiner circuitry 450 may check, verify, and/or otherwise validate that the decoded timestamp is correct based on one or more error check or parity bits included in at least one of the first bit sequence or the second bit sequence. For example, the first bit sequence and/or the second bit sequence may include one or more parity bits that, when decoded, may be used by the timestamp determiner circuitry 450 to determine whether the timestamp is a valid timestamp.

In some examples, the timestamp determiner circuitry 450 may determine that one(s) of the watermark symbols convey a state (e.g., a media state) of accessed media. For example, the timestamp determiner circuitry 450, based on a symbol position and/or encoding layer of one or more watermark symbols, may determine that the one or more watermark symbols convey and/or identify a first state (e.g., a first media state). In some such examples, the first state may correspond to media being accessed and/or presented within a first time period after an initial publishing of the media. In some such examples, the timestamp determiner circuitry 450 may determine that the one or more watermark symbols (e.g., encoding layer(s) and/or symbol position(s) associated with the one or more watermark symbols) indicate that the accessed/presented media has the first state. In some such examples, the timestamp determiner circuitry 450 may determine that the first state implements a C3 media state, which may indicate that the accessed/presented RTVOD media is being accessed/presented within three days of the initial publishing.

In some examples, the timestamp determiner circuitry 450, based on a symbol position and/or encoding layer of one or more watermark symbols, may determine that the one or more watermark symbols convey and/or identify a second state (e.g., a second media state). In some such examples, the second state may correspond to media being accessed and/or presented within a second time period after an initial publishing of the media. In some such examples, the timestamp determiner circuitry 450 may determine that the one or more watermark symbols (e.g., encoding layer(s) and/or symbol position(s) associated with the one or more watermark symbols) indicate that the accessed/presented media has the second state. In some such examples, the timestamp determiner circuitry 450 may determine that the second state implements a C7 media state, which may indicate that the accessed/presented RTVOD media is being accessed/presented within seven days of the initial publishing. In some examples, at least one of the watermark detector circuitry 420, the media identification determiner circuitry 430, and/or the SID determiner circuitry 440 may determine that the one or more watermark symbols indicate the first media state, the second media state, etc.

The AME 104 of the illustrated example includes the demographic associator circuitry 460 to associate demographics and accessed one(s) of the media 472. For example, a plurality of panelists including the panelist 116 at the monitored site 130 may have provided their respective demographics to the AME 104. In some such examples, the demographic associator circuitry 460 may receive the demographic data 480 via a personal interview (by telephone or in person), a telephone interface, direct mailing, purchased lists, etc. Additionally or alternatively, the demographic data 480 may be obtained manually by a person or group of people collecting and entering the registration data into the datastore 470.

In some examples, the demographic data 480 includes information identifying the model of the first panelist device 114 and/or the second panelist device 118 associated with the panelist 116, a mailing address associated with the panelist 116, an email address associated with the panelist 116, a phone number associated with a mobile device of the panelist 116, a unique identifier of the panelist 116, the first panelist device 114, and/or the second panelist device 118 (e.g., a social security number of the panelist 116, a phone number of a mobile device associated with the panelist 116, a zip code of the panelist 116, and/or any combination or derivation of any information related to the panelist 116 and/or the mobile device), the age of the panelist 116, the gender of the panelist 116, the race of the panelist 116, the marital status of the panelist 116, the income of the panelist 116 and/or the household of the panelist 116, the employment status of the panelist 116, where the panelist 116 typically intend to access the media 472, how long the panelist 116 typically accesses the media 472, the education level of the panelist 116, and/or any other information related to the panelist 116.

In some examples, the demographic associator circuitry 460 may prepare and/or otherwise generate a report associating the demographic data and the accessed one(s) of the media 472. In some examples, the demographic associator circuitry 460 may generate a report identifying demographics associated with the panelist 116 via received monitoring information (e.g., the identifiers 474, the timestamps 476, the watermarks 478, etc.) from the first meter 120 and/or the second meter 126. For example, the demographic associator circuitry 460 may generate a report associating the demographic data 480 of the panelist 116 with accessed one(s) of the media 472. For example, the demographic associator circuitry 460 may credit the media 472 as having been accessed by the panelist 116 by way of the media presentation device 112 of FIG. 1.

The AME 104 of the illustrated example includes the datastore 470 to record data (e.g., the media 472, the identifiers 474, the timestamps 476, the watermarks 478, the demographic data 480, the media state(s), etc.). For example, the datastore 470 may store the media 472 obtained from the media provider 102, the first meter 120, and/or the second meter 126. The datastore 470 may store the identifiers 474, which may include identifiers (e.g., media identifiers, SIDs, etc.) obtained from the first meter 120 and/or the second meter 126. In some examples, the datastore 470 may store the identifiers 474 extracted from a watermark by the watermark detector circuitry 420 and/or identified by the media identification determiner circuitry 430. The datastore 470 may store the timestamps 476 obtained from the first meter 120 and/or the second meter 126. In some examples, the datastore 470 may store the timestamps 476 determined by the timestamp determiner circuitry 450. The datastore 470 may store the watermarks 478 obtained from the first meter 120 and/or the second meter 126. In some examples, the datastore 470 stores the watermarks 478 extracted by the watermark detector circuitry 420.

The datastore 470 may be implemented by a volatile memory (e.g., an SDRAM, a DRAM, an RDRAM, etc.) and/or a non-volatile memory (e.g., flash memory). The datastore 470 may additionally or alternatively be implemented by one or more DDR memories, such as DDR, DDR2, DDR3, DDR4, mDDR, etc. The datastore 470 may additionally or alternatively be implemented by one or more mass storage devices such as HDD(s), CD drive(s), DVD drive(s), SSD drive(s), etc. While in the illustrated example the datastore 470 is illustrated as a single datastore, the datastore 470 may be implemented by any number and/or type(s) of datastores. Furthermore, the data stored in the datastore 470 may be in any data format such as, for example, binary data, comma delimited data, tab delimited data, SQL structures, etc. In some examples, the datastore 470 implements one or more databases.

While an example manner of implementing the AME 104 of FIG. 1 is illustrated in FIG. 4, one or more of the elements, processes, and/or devices illustrated in FIG. 4 may be combined, divided, re-arranged, omitted, eliminated, and/or implemented in any other way. Further, the interface circuitry 410, the watermark detector circuitry 420, the media identification determiner circuitry 430, the SID determiner circuitry 440, the timestamp determiner circuitry 450, the demographic associator circuitry 460, the datastore 470, the bus 490, and/or, more generally, the example AME 104 of FIG. 1, may be implemented by hardware, software, firmware, and/or any combination of hardware, software, and/or firmware. Thus, for example, any of the interface circuitry 410, the watermark detector circuitry 420, the media identification determiner circuitry 430, the SID determiner circuitry 440, the timestamp determiner circuitry 450, the demographic associator circuitry 460, the datastore 470, the bus 490, and/or, more generally, the example AME 104, could be implemented by processor circuitry, analog circuit(s), digital circuit(s), logic circuit(s), programmable processor(s), programmable microcontroller(s), GPU(s), DSP(s), ASIC(s), PLD(s), and/or FPLD(s) such as FPGAs. When reading any of the apparatus or system claims of this patent to cover a purely software and/or firmware implementation, at least one of the interface circuitry 410, the watermark detector circuitry 420, the media identification determiner circuitry 430, the SID determiner circuitry 440, the timestamp determiner circuitry 450, the demographic associator circuitry 460, the datastore 470, and/or the bus 490 is/are hereby expressly defined to include a non-transitory computer readable storage device or storage disk such as a memory, a DVD, a CD, a Blu-ray disk, etc., including the software and/or firmware. Further still, the example AME 104 of FIG. 1 may include one or more elements, processes, and/or devices in addition to, or instead of, those illustrated in FIG. 4, and/or may include more than one of any or all of the illustrated elements, processes and devices.

Figure 5:
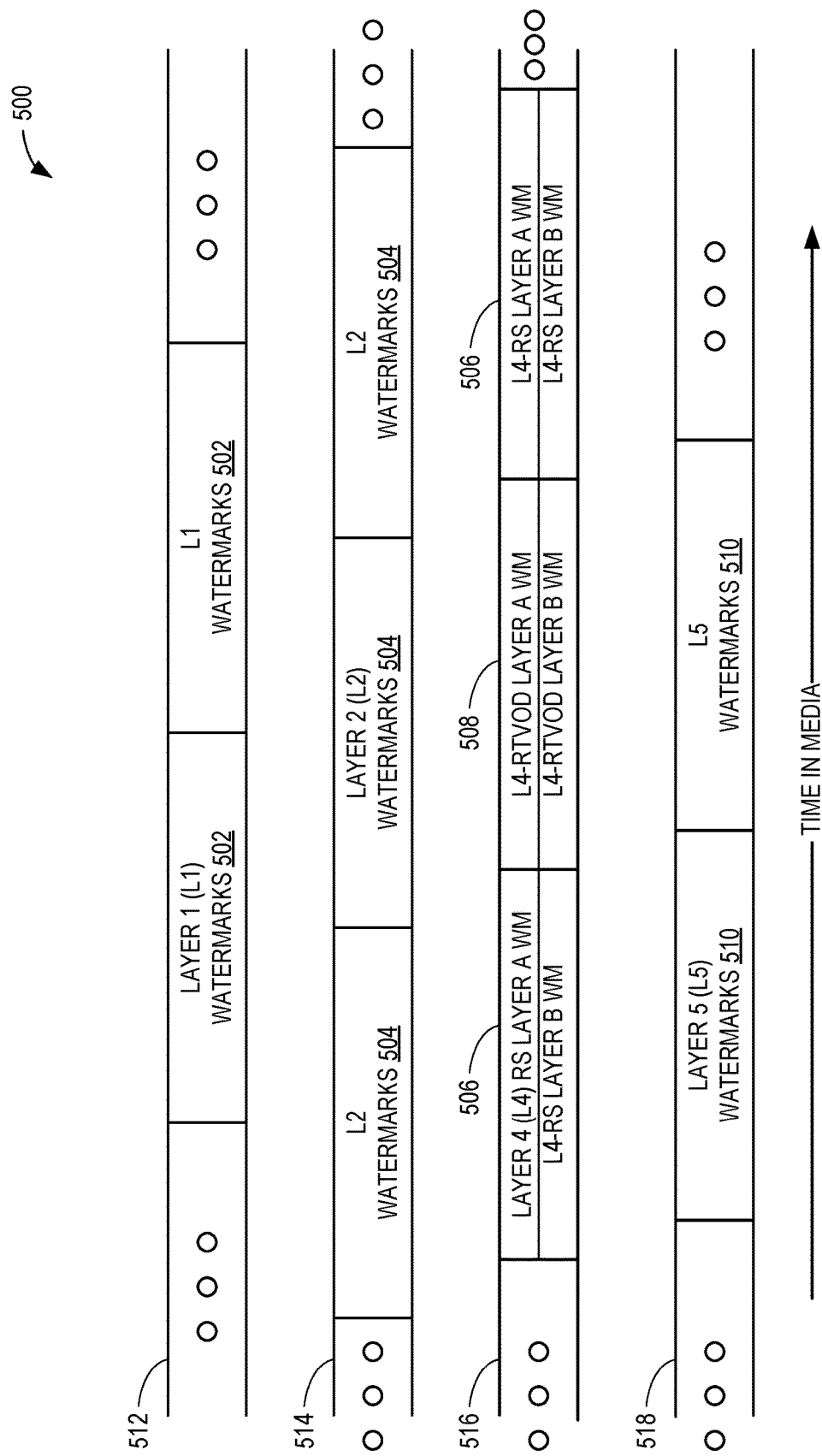
FIG. 5 depicts example watermarks in media at different example frequency layers.

FIG. 5 depicts example watermarks 502, 504, 506, 508, 510 in encoded media 500 at different example frequency layers 512, 514, 516, 518. In some examples, one(s) of the watermarks 502, 504, 506, 508, 510 may be implemented by the watermarks 278 of FIG. 2, the watermarks 378 of FIG. 3, and/or the watermarks 478 of FIG. 4. The frequency layers 512, 514, 516, 518 may correspond to respective ranges of frequencies at which the watermarks 502, 504, 506, 508, 510 are to be encoded. For example, the first frequency layer 512 (identified by LAYER 1) may be implemented by a first range of frequencies, the second frequency layer 512 (identified by LAYER 2) may be implemented by a second range of frequencies, etc., so that the first range of frequencies and the second range of frequencies do not overlap. In some examples, the watermarks 502, 504, 506, 508, 510 may be encoded based on Reed-Solomon (RS) codes. For example, the frequency layers 512, 514, 516, 518 may be implemented by RS frequency layers. In some such examples, the first watermarks 502 may correspond to RS Layer 1 (L1) watermarks, the second watermarks 504 may correspond to RS Layer 2 (L2) watermarks, etc. Advantageously, the watermarks 502, 504, 506, 508, 510 may be encoded using frequency division multiplexing because of the different frequency layers 512, 514, 516, 518.

In some examples, the encoded media 500 may be a media file encoded by the watermark encoder 106 of FIG. 1. For example, the watermark encoder 106 may encode the first frequency layer 512 with the first watermarks 502, the second frequency layer 514 with the second watermarks 504, etc. In the illustrated example, the watermark encoder 106 may generate dense watermarks. For example, the watermark encoder 106 may generate the first watermarks 502 as dense single layer watermarks by generating the first watermarks 502 as having a single encoding layer in which all or a substantial portion of symbol positions of the first watermarks 502 are filled with symbols. In some examples, the watermark encoder 106 may generate the second watermarks 504 and the fifth watermarks 510 as dense single layer watermarks. In some examples, the watermark encoder 106 may generate the third watermarks 506 as dense multilayered watermarks by generating the third watermarks 506 as having at least a first layer (LAYER A) and a second layer (LAYER B) in which all or a substantial portion of symbol positions of the first layer and the second layer are filled with symbols.

In some examples, the watermark encoder 106 may generate watermarks at the fourth frequency layer 516 that indicate different states of media presentation. For example, the watermark encoder 106 may generate the third watermarks 506 to indicate whether presented media is a television program, a commercial, etc., by encoding identifiers that identify media (e.g., a first identifier that identifies presented media as a television program, a second identifier that identifies presented media as a commercial, etc.). In some examples, the watermark encoder 106 may generate the fourth watermarks 508 to convey on-demand media access states, such as RTVOD media access states. For example, the watermark encoder 106 may generate the fourth watermarks 508 to indicate on-demand media access states by encoding a pattern of symbols across the multiple layers of the fourth watermarks 508. In some such examples, the watermark encoder 106 may encode the pattern to indicate a first on-demand media access state that the encoded media 500 is to be accessed within a first time period (e.g., within three days after a premiere of the encoded media 500 for access by viewers on-demand). In some examples, the watermark encoder 106 may encode the pattern to indicate a second on-demand media access state that the encoded media 500 is to be accessed within a second time period (e.g., within seven days after a premiere of the encoded media 500 for access by viewers on-demand), etc.

In the illustrated example, the watermark encoder 106 may generate sparse watermarks. For example, the watermark encoder 106 may generate the fourth watermarks 508 as sparse multilayer watermarks by generating the fourth watermarks 508 as having at least a first layer (LAYER A) and a second layer (LAYER B) in which a substantial portion of symbol positions of the fourth watermarks 508 are not filled with a symbol. In some such examples, the watermark encoder 106 may generate the fourth watermarks 508 by inserting a first symbol at a first symbol position of a plurality of first symbol positions on the first encoding layer of a first one of the fourth watermarks 508 (identified by L4-RTVOD LAYER A) and a second symbol at a second symbol position of a plurality of second symbol positions on the second encoding layer on the first one of the fourth watermarks 508 (identified by L4-RTVOD LAYER B). In some such examples, the watermark encoder 106 may not insert a symbol at one or more symbol positions of the remaining first symbol positions and/or the remaining second symbol positions.

Figure 6:
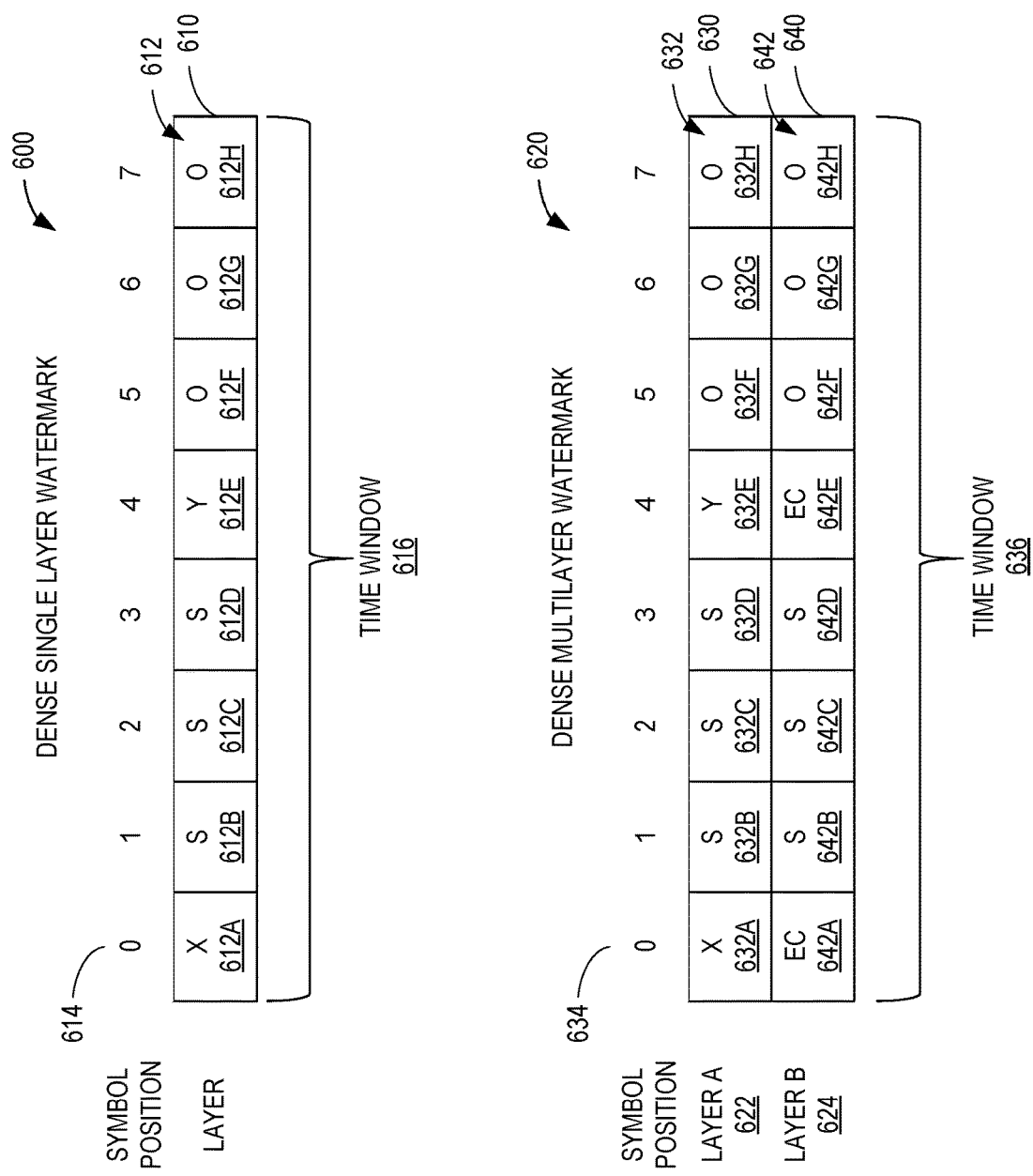
FIG. 6 depicts an example dense single-layer watermark and an example dense multilayer watermark.

FIG. 6 depicts an example dense single-layer watermark 600 and an example dense multilayer watermark 620. In some examples, the dense single-layer watermark 600 and/or the dense multilayer watermark 620 may implement one(s) of the watermarks 278 of FIG. 2, the watermarks 378 of FIG. 3, and/or the watermarks 478 of FIG. 4. In some examples, the dense single-layer watermark 600 may implement one(s) of the first watermarks 502, the second watermarks 504, and/or the fifth watermarks 510 of FIG. 5. In the illustrated example, the dense single-layer watermark 600 is placed on a single watermark encoding layer (e.g., an audio watermarking layer, an audio encoding layer, etc.).

In the illustrated example, the dense single-layer watermark 600 includes a first example bit sequence 610, which includes first example symbols 612 (hereinafter 612A, 612B, 612C, 612D, 612E, 612F, 612G, 612H) at example symbol positions 614 (hereinafter symbol positions 0, 1, 2, 3, 4, 5, 6, 7) during an example time window 616. For example, the first symbols 612 are positioned in the dense single-layer watermark 600 to be substantially simultaneously read and/or parsed out from media. In other words, the first bit sequence 610 is to be simultaneously read and/or parsed in parallel by the first meter 120 and/or the second meter 126 of FIG. 1.

In this example, the first bit sequence 610 includes eight symbols. However, any appropriate number of bits and/or symbols can be implemented instead. Further, the first bit sequence 610 may be implemented on (e.g., embedded in) any appropriate file type including, but not limited to, audio files, video files, encoded transmissions, file downloads, etc. In the illustrated example, the dense single-layer watermark 600 is dense because there is a watermark symbol at each of the symbol positions. Alternatively, in some examples, the dense single-layer watermark 600 may be dense if there is a watermark symbol at a substantial number of the symbol positions.

In some examples, the dense multilayer watermark 620 may implement one(s) of the third watermarks 506 and/or the fourth watermarks 508 of FIG. 5. In the illustrated example, the dense multilayer watermark 620 is placed on multiple separate watermark encoding layers (e.g., separate audio watermarking layers, separate audio encoding layers, etc.). In some examples, a multilayer audio watermark, such as the dense multilayer watermark 620 of FIG. 6, can include multiple audio watermarking layers (also called audio encoding layers) in which different layers use frequency components from different frequency ranges or groups of frequency ranges (e.g., frequency components from different groups of frequency bins) of the audio signal/file to encode watermark symbols in their respective layers. For example, a first audio watermarking layer may use frequency components selected from a first group of frequency bins to encode a first set of watermark symbols in the audio signal/file, and a second audio watermarking layer may use frequency components selected from a second group of frequency bins to encode a second set of watermark symbols in the audio signal/file, with at least some of the frequency bins in the first and second groups being different. Advantageously, frequency components that have improved detection capability in acoustic environments may be selected to convey information (e.g., a media identifier, a timestamp, etc.) to increase a likelihood of detecting such a watermark. In the illustrated example, the dense multilayer watermark 620 includes a first example layer 622 (e.g., a first audio watermarking layer identified by LAYER A) and a second example layer 624 (e.g., a second audio watermarking layer identified by LAYER B).

In the illustrated example, the dense multilayer watermark 620 includes a second example bit sequence 630, which includes second example symbols 632 (hereinafter 632A, 632B, 632C, 632D, 632E, 632F, 632G, 632H) at example symbol positions 634 (hereinafter symbol positions 0, 1, 2, 3, 4, 5, 6, 7) during an example time window 636. In the illustrated example, the dense multilayer watermark 620 includes a third example bit sequence 640, which includes third example symbols 642 (hereinafter 642A, 642B, 642C, 642D, 642E, 642F, 642G, 642H) at example symbol positions 644 (hereinafter symbol positions 0, 1, 2, 3, 4, 5, 6, 7) during the time window 636. For example, the second symbols 632 and the third symbols 642 are positioned in the dense multilayer watermark 620 to be substantially simultaneously read and/or parsed out from media. In other words, the second bit sequence 630 and the third bit sequence 640 are to be simultaneously read and/or parsed in parallel by the first meter 120 and/or the second meter 126.

In this example, the second bit sequence 630 and the third bit sequence 640 each include eight symbols. However, any appropriate number of bits and/or symbols can be implemented instead for the second bit sequence 630 and/or the third bit sequence 640. Further, the second bit sequence 630 and/or the third bit sequence 640 may be implemented on (e.g., embedded in) any appropriate file type including, but not limited to, audio files, video files, encoded transmissions, file downloads, etc. In the illustrated example, the dense multilayer watermark 620 is dense because there is a watermark symbol at each of the symbol positions. Alternatively, in some examples, the dense multilayer watermark 620 may be dense if there is a watermark symbol at a substantial number of the symbol positions of the first layer 622 and/or the second layer 624.

Figure 7:
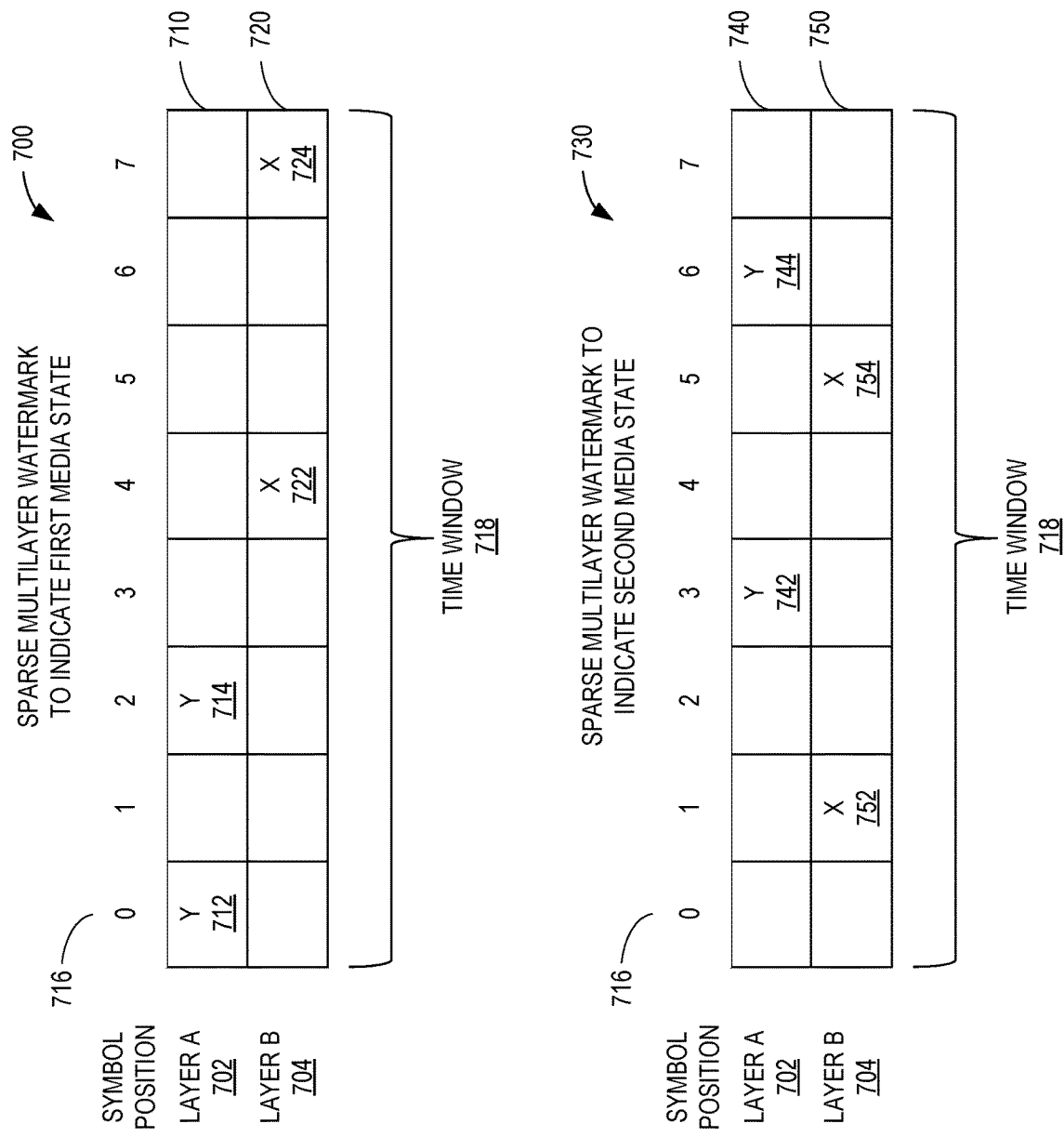
FIG. 7 depicts a first example sparse multilayer watermark and a second example sparse multilayer watermark.

FIG. 7 depicts a first example sparse multilayer watermark 700 and a second example sparse multilayer watermark 730. In some examples, the first sparse multilayer watermark 700 and/or the second sparse multilayer watermark 730 may implement one(s) of the watermarks 278 of FIG. 2, the watermarks 378 of FIG. 3, and/or the watermarks 478 of FIG. 4. In some examples, the first sparse multilayer watermark 700 and/or the second sparse multilayer watermark 730 may implement one(s) of the third watermarks 506 and/or the fourth watermarks 508 of FIG. 5. In the illustrated example, the first sparse multilayer watermark 700 and the second sparse multilayer watermark 730 are placed on multiple separate watermark encoding layers (e.g., separate audio watermarking layers, separate audio encoding layers, etc.) including a first example layer 702 (e.g., a first audio watermarking layer identified by LAYER A) and a second example layer 704 (e.g., a second audio watermarking layer identified by LAYER B).

In the illustrated example, the first sparse multilayer watermark 700 includes a first example bit sequence 710, which includes a first example symbol 712 and a second example symbol 714 at respective ones of example symbol positions 716 (hereinafter symbol positions 0, 1, 2, 3, 4, 5, 6, 7) during an example time window 718. In the illustrated example, the first sparse multilayer watermark 700 includes a second example bit sequence 720, which includes a third example symbol 722 and a fourth example symbol 724 at respective ones of the symbol positions 716 during the time window 718.

In the illustrated example, the first symbol 712 and the second symbol 714 are the same. Alternatively, the first symbol 712 and the second symbol 714 may be different from each other. In the illustrated example, the first symbol 712 is at and/or otherwise caused to be inserted at symbol position 0 of the first layer 702 and the second symbol 714 is at and/or otherwise caused to be inserted at symbol position 2 of the first layer 702. In the illustrated example, the third symbol 722 and the fourth symbol 724 are the same. Alternatively, the third symbol 722 and the fourth symbol 724 may be different from each other. In the illustrated example, the third symbol 722 is at and/or otherwise caused to be inserted at symbol position 4 of the second layer 704 and the fourth symbol 724 is at and/or otherwise caused to be inserted at symbol position 7 of the second layer 704.

In the illustrated example, the first bit sequence 710 and the second bit sequence 720 each include two symbols. However, any appropriate number of bits and/or symbols can be implemented instead for the first bit sequence 710 and/or the second bit sequence 720. Further, the first bit sequence 710 and/or the second bit sequence 720 may be implemented on (e.g., embedded in) any appropriate file type including, but not limited to, audio files, video files, encoded transmissions, file downloads, etc. In the illustrated example, the first sparse multilayer watermark 700 is sparse because there is a watermark symbol missing at one or more of the symbol positions 716. In this example, the first layer 702 is missing a watermark symbol at symbol positions 1, 3, 4, 5, 6, and 7 while the second layer 704 is missing a watermark symbol at symbol positions 0, 1, 2, 3, 5, and 6. For example, symbol positions 1, 3, 4, 5, 6, and 7 on the first layer 702 are empty because a watermark symbol is not encoded, embedded, etc., at those symbol positions. In the illustrated example, symbol positions 0, 1, 2, 3, 5, and 6 on the second layer 704 are empty because a watermark symbol is not encoded, embedded, etc., at those symbol positions. Alternatively, the first layer 702 and/or the second layer 704 may have fewer or more empty symbol positions than depicted in the illustrated example.

In the illustrated example, the first symbol 712, the second symbol 714, the third symbol 722, and the fourth symbol 724 are positioned amongst the symbol positions 716 of the first layer 702 and/or the second layer 704 to indicate a first media state. For example, the first meter 120 and/or the second meter 126 of FIG. 1 may determine that media presented by the media presentation device 112 of FIG. 1 is being accessed within a first time period of the media being made available on an on-demand platform. In some examples, the first sparse multilayer watermark 700 may implement a C3 watermark, which may indicate that media embedded with the first sparse multilayer watermark 700 is associated with media in the first media state of being accessed within three days (or a different number of days) after the media premiered on an on-demand platform.

In the illustrated example, the second sparse multilayer watermark 730 includes a third example bit sequence 740, which includes a fifth example symbol 742 and a sixth example symbol 744 at a respective one of the symbol positions 716 during the time window 718. In the illustrated example, the second sparse multilayer watermark 730 includes a third example bit sequence 750, which includes a seventh example symbol 752 and an eighth example symbol 754 at a respective one of the symbol positions 716 during the time window 718.

In the illustrated example, the fifth symbol 742 and the sixth symbol 744 are the same. Alternatively, the fifth symbol 742 and the sixth symbol 744 may be different from each other. In the illustrated example, the fifth symbol 742 is at and/or otherwise caused to be inserted at symbol position 3 of the first layer 702 and the sixth symbol 744 is at and/or otherwise caused to be inserted at symbol position 6 of the first layer 702. In the illustrated example, the seventh symbol 752 and the eighth symbol 754 are the same. Alternatively, the seventh symbol 752 and the eighth symbol 754 may be different from each other. In the illustrated example, the seventh symbol 752 is at and/or otherwise caused to be inserted at symbol position 1 of the second layer 704 and the eighth symbol 754 is at and/or otherwise caused to be inserted at symbol position 5 of the second layer 704.

In the illustrated example, the third bit sequence 740 and the fourth bit sequence 750 each include two symbols. However, any appropriate number of bits and/or symbols can be implemented instead for the third bit sequence 740 and/or the fourth bit sequence 750. Further, the third bit sequence 740 and/or the fourth bit sequence 750 may be implemented on (e.g., embedded in) any appropriate file type including, but not limited to, audio files, video files, encoded transmissions, file downloads, etc. In the illustrated example, the second sparse multilayer watermark 730 is sparse because there is a watermark symbol missing at one or more of the symbol positions 716. In this example, the first layer 702 is missing a watermark symbol at symbol positions 0, 1, 2, 4, 5, and 7 the second layer 704 is missing a watermark symbol at symbol positions 0, 2, 3, 4, 6, and 7. For example, symbol positions 0, 1, 2, 4, 5, and 7 on the first layer 702 are empty because a watermark symbol is not encoded, embedded, etc., at those symbol positions. In the illustrated example, symbol positions 0, 2, 3, 4, 6, and 7 on the second layer 704 are empty because a watermark symbol is not encoded, embedded, etc., at those symbol positions. Alternatively, the first layer 702 and/or the second layer 704 may have fewer or more empty symbol positions than depicted in the illustrated example.

In the illustrated example, the fifth symbol 742, the sixth symbol 744, the seventh symbol 752, and the eighth symbol 754 are positioned amongst the symbol positions 716 of the first layer 702 and/or the second layer 704 to indicate a second media state. For example, the first meter 120 and/or the second meter 126 of FIG. 1 may determine that media presented by the media presentation device 112 of FIG. 1 is being accessed within a second time period of the media being made available on an on-demand platform. In some examples, the second sparse multilayer watermark 730 may implement a C7 watermark, which may indicate that media embedded with the second sparse multilayer watermark 730 is associated with media in the first media state of being accessed within seven days (or a different number of days) after the media premiered on an on-demand platform.

Figure 8:
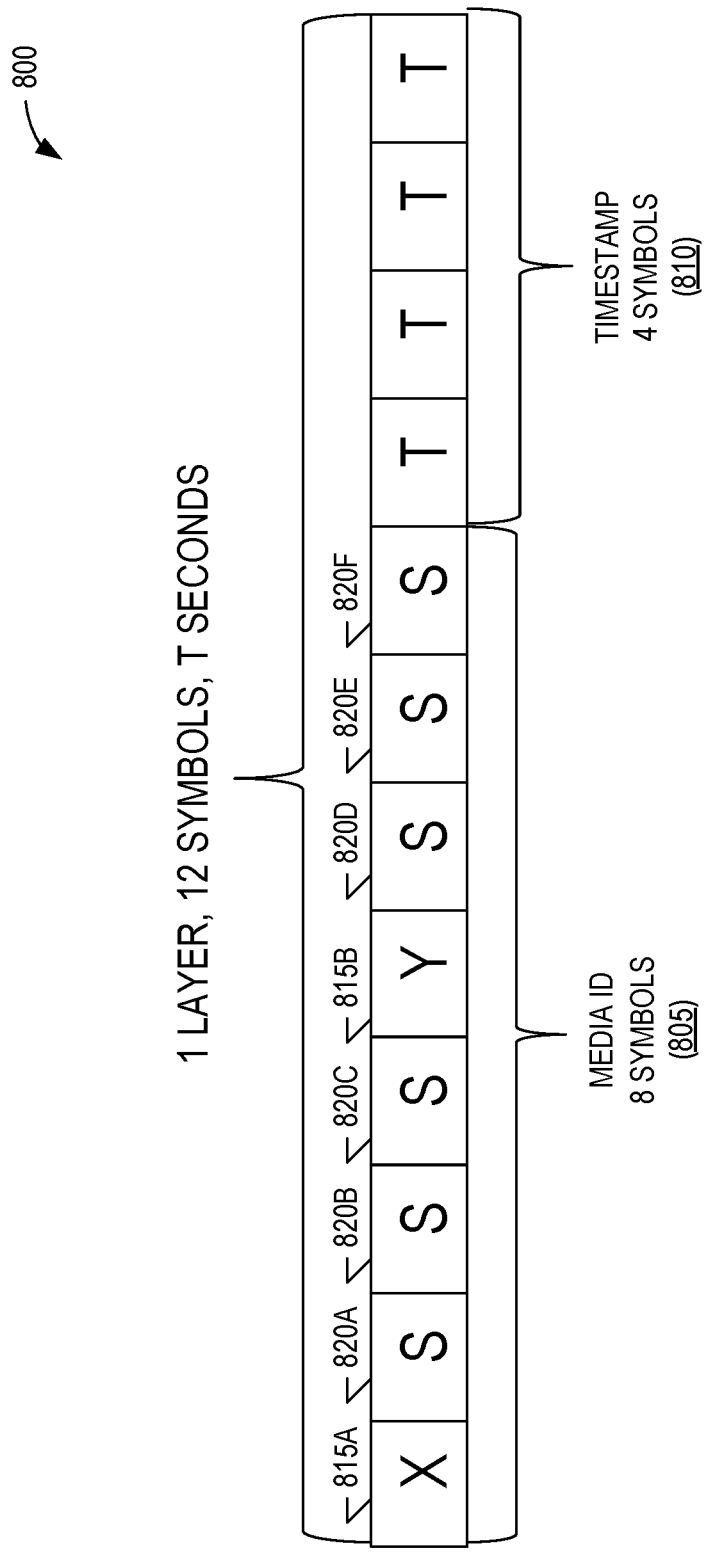
FIG. 8 depicts an example single-layer watermark including example symbols corresponding to an example media identifier and an example timestamp.

FIG. 8 depicts an example single-layer watermark 800 that the first meter 120 and/or the second meter 126 may be configured to detect. In some examples, the single-layer watermark 800 may implement one(s) of the watermarks 278 of FIG. 2, the watermarks 378 of FIG. 3, and/or the watermarks 478 of FIG. 4. The single-layer watermark 800 of the illustrated is embedded or otherwise included in media to be presented by media device(s), such as the media presentation device 112 of FIG. 1. For example, the single-layer watermark 800 may be embedded in an audio portion (e.g., an audio data portion, an audio signal portion, etc.) of the media, a video portion (e.g., a video data portion, a video signal portion, etc.) of the media, or a combination thereof. The single-layer watermark 800 includes a first example group of symbols 805 and a second example group of symbols 810. In some examples, the first group of symbols 805 may be repeated in successive watermarks 800 embedded/included in the media, whereas the second group of symbols 810 differs between successive watermarks 800 embedded/included in the media.

In the single-layer watermark 800 of the illustrated example, the first group of symbols 805 conveys media identification data (e.g., a media identifier identified by MEDIA ID) identifying the media watermarked by the single-layer watermark 800. For example, the media identification data conveyed by the first group of symbols 805 may include data identifying a provider (e.g., a broadcast station, an on-demand media provider, a streaming media provider, etc.) providing the media, a name (e.g., program name) of the media, a source (e.g., a media platform, a website, etc.) of the media, etc. Thus, in the illustrated example, the first group of symbols 805 is also referred to as a first group of media identification symbols 805 (or simply the media identification symbols 805). Furthermore, in some examples, the media identification data conveyed by the first group of symbols 805 (e.g., the media identification symbols 805) may be repeated in successive single-layer watermarks 800 embedded/included in the media.

In some examples, the first group of symbols 805 of the single-layer watermark 800 includes example marker symbols 815A, 815B to assist the watermark decoders 124, 127 of FIGS. 1 and/or 3 in detecting the start of the single-layer watermark 800 in the watermarked media, and example data symbols 820A-F to convey the media identification data. Also, in some examples, corresponding symbols pairs in similar respective locations after the first marker symbol 815A and the second marker symbol 815B are related by an offset. For example, the value of data symbol 820D may correspond to the value of data symbol 820A incremented by an offset, the value of data symbol 820E may correspond to the value of data symbol 820B incremented by the same offset, and the value of data symbol 820F may correspond to the value of data symbol 820C incremented by the same offset, as well.

In the illustrated example, the second group of symbols 810 conveys timestamp data (e.g., a timestamp, a time-in content (TIC) value, etc.) identifying, for example, a particular elapsed time within the watermarked media. Thus, in the illustrated example, the second group of symbols 810 is also referred to as the second group of timestamp symbols 810 (or simply the timestamp symbols 810). Furthermore, in some examples, the timestamp data conveyed by the second group of symbols 810 (e.g., the timestamp symbols 810) differs in successive single-layer watermarks 800 embedded/included in the media (e.g., as the elapsed time of the watermarked media increases with each successive single-layer watermark 800). In some examples, the timestamp based on the timestamp symbols 810 may implement one(s) of the timestamps 276 of FIG. 2, the timestamps 376 of FIG. 3, and/or the timestamps 476 of FIG. 4.

In some examples, the single-layer watermark 800 is embedded/included in the desired media at a repetition interval of T seconds (or, in other words, at a repetition rate of 1/T seconds), with the first group of symbols 805 remaining the same in successive single-layer watermarks 800, and the second group of symbols 810 varying in successive single-layer watermarks 800. For example, the repetition interval T may correspond to T=4.8 seconds. As there are 12 symbols in the depicted single-layer watermark 800 (e.g., 8 symbols in the first group of symbols 805 and 4 symbols in the second group of symbols 810) each watermark symbol in the illustrated example has a duration of 4.8/12=0.4 seconds. However, other values for the repetition interval T may be used in other examples.

In some examples, a watermark symbol included in the single-layer watermark 800 is able to take on one of several possible symbol values. For example, if a symbol in the single-layer watermark 800 represents 4 bits of data, then the symbol is able to take on one of 16 different possible values. For example, each possible symbol value may correspond to a different signal amplitude, a different set of code frequencies, etc. In some such examples, to detect a watermark symbol embedded/included in watermarked media, the watermark decoders 124, 127 process monitored media data/signals output from the media presentation device 112 to determine measured values (e.g., signal-to-noise ratio (SNR) values) corresponding to each possible symbol value the symbol may have. The watermark decoders 124, 127 may then select the symbol value corresponding to the best (e.g., strongest, largest, etc.) measured value (possibly after averaging across multiple samples of the media data/signal) as the detected symbol value for that particular watermark symbol.

Figure 9:
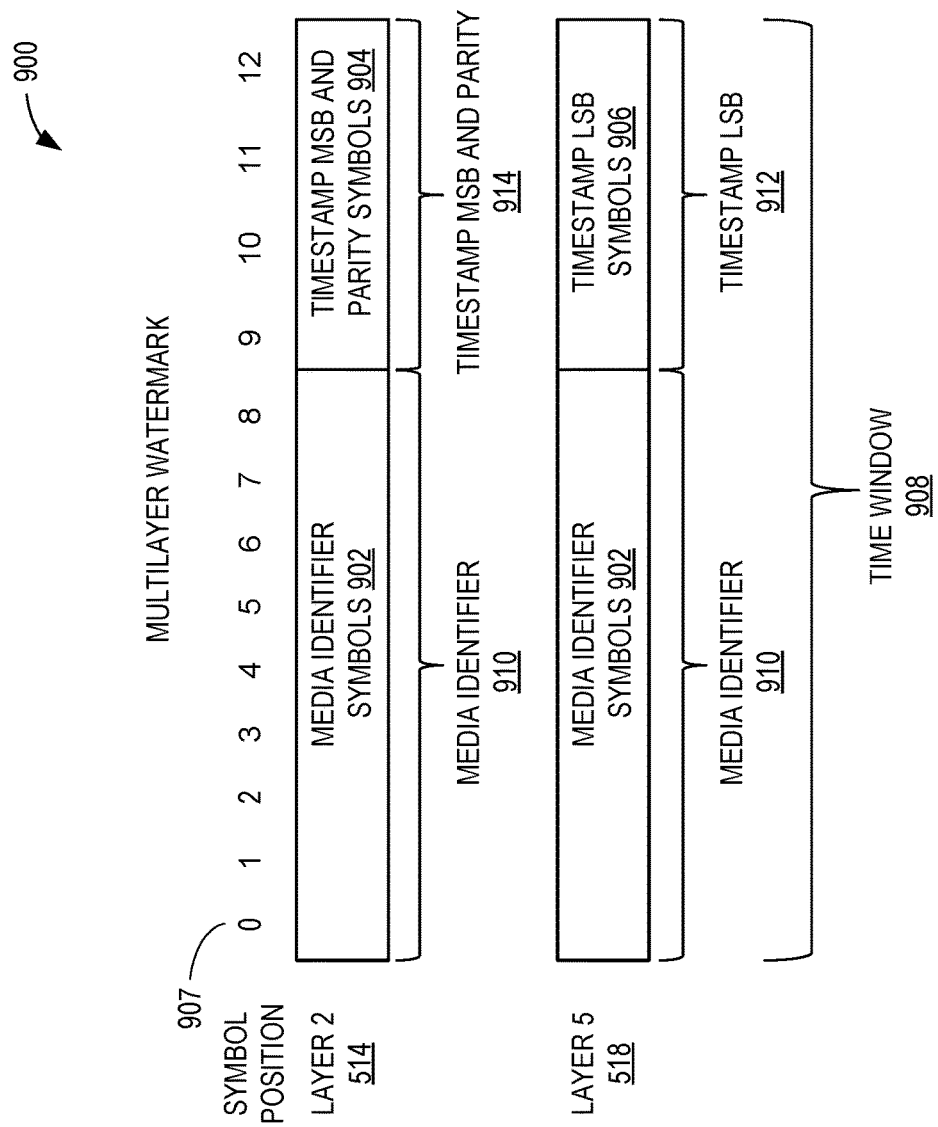
FIG. 9 depicts an example multilayer watermark including example symbols corresponding to an example media identifier, an example timestamp, and example error-checking data.

FIG. 9 depicts an example multilayer watermark 900 including first example symbols 902, second example symbols 904, and third example symbols 906 at example symbol positions 907 during an example time window 908. In some examples, the multilayer watermark 900 may implement one(s) of the watermarks 278 of FIG. 2, the watermarks 378 of FIG. 3, and/or the watermarks 478 of FIG. 4. In this example, there are twelve of the symbol positions 907. Alternatively, the multilayer watermark 900 may include fewer or more symbol positions. In this example, the first symbols 902 and the second symbols 904 are on the second frequency layer 514 of FIG. 5. Alternatively, the first symbols 902 and/or the second symbols 904 may be on a different frequency layer. In this example, the first symbols 902 and the third symbols 906 are on the fifth frequency layer 518 of FIG. 5. Alternatively, the first symbols 902 and/or the third symbols 906 may be on a different frequency layer.

In the illustrated example, the first symbols 902 implement an example media identifier 910 that identifies media that may be accessed and/or otherwise presented by the media presentation device 112 of FIG. 1. In the illustrated example, the first symbols 902 are inserted at symbol positions 0-7 of the symbol positions 907. Alternatively, the first symbols 902 may be inserted, encoded, etc., at different one(s) of the symbol positions 907. In the illustrated example, the first symbols 902 are the same in the second frequency layer 514 and the fifth frequency layer 518 so that the watermark decoders 124, 127 may identify that the second symbols 904 and the third symbols 906 are associated with each other and/or otherwise are to be processed in connection with each other.

In the illustrated example, the second symbols 904 and the third symbols 906 implement at least one of timestamp data or parity data. For example, the multilayer watermark 900 may implement a video-on demand (VOD) watermark that may be embedded in media accessible on a library VOD platform. In some such examples, the multilayer watermark 900 may include data to convey at least one of a media identifier that identifies media and timestamp data that identifies an elapsed time of the media. In the illustrated example, the second symbols 904 and the third symbols 906 are inserted, encoded, etc., at symbol positions 9-12 of the symbol positions 907. Alternatively, the second symbols 904 and/or the third symbols 906 may be inserted at different one(s) of the symbol positions 907. In some examples, the timestamp data may implement one(s) of the timestamps 276 of FIG. 2, the timestamps 376 of FIG. 3, and/or the timestamps 476 of FIG. 4.

In the illustrated example, the timestamp data may be encoded across multiple layers of the multilayer watermark 900, such as the second frequency layer 514 and the fifth frequency layer 518 of FIG. 5. In some examples, the timestamp data may be encoded across multiple layers because the timestamp data may require a number of bits that exceeds a bandwidth of a single layer. For example, the timestamp data may require 30 bits of data while each encoding layer may support 16 bits of data. In some such examples, the 30 bits of timestamp data can be supported by at least two encoding layers.

In some examples, the watermark encoder 106 of FIG. 1 may encode the timestamp data across multiple layers of the multilayer watermark 900. For example, the timestamp generator circuitry 240 of FIG. 2 may determine a timestamp of the media and partition the timestamp into timestamp portions. In some such examples, the timestamp generator circuitry 240 may convert the timestamp data into a timestamp bitstream, and partition the timestamp bitstream into first bits and second bits. In some such examples, the timestamp generator circuitry 240 may identify the first bits as the least significant bits of the timestamp bitstream and the second bits as the most significant bits of the timestamp bitstream. For example, the timestamp generator circuitry 240 may identify the first bits as example timestamp least significant bits 912 and the second bits as a portion of example timestamp most significant bits and parity bits 914. In some such examples, the timestamp generator circuitry 240 may generate the parity bits to facilitate error detection of decoding the multilayer watermark 900.

In some examples, the timestamp generator circuitry 240 may determine the timestamp bitstream by obtaining a first timestamp in a time second format. For example, the timestamp may have a value of "150" to represent 150 seconds. In some examples, the timestamp generator circuitry 240 may convert the first timestamp in time second format to a second timestamp in time minute format. In some such examples, the time second format may implement a second level, a per-second increment basis, etc., (e.g., successive timestamps being incremented at the second level including a first timestamp of 18 seconds, a second timestamp of 19 seconds, a third timestamp of 20 seconds, etc.). In some such examples, the time minute format may implement a minute level, a per-minute increment basis, etc., (e.g., successive timestamps being incremented at the minute level including a first timestamp of 10 minutes, a second timestamp of 11 minutes, a third timestamp of 12 minutes, etc.). For example, the timestamp generator circuitry 240 may convert the first timestamp (timestamp$_{minute}$) into the second timestamp (timestamp$_{second}$) based on the example of Equation (1) below:

$$\text{timestamp}_{Minute} = \text{floor}\left(\frac{\text{timestamp}_{second}}{60}\right), \quad \text{Equation (1)}$$

In some examples, the timestamp generator circuitry 240 may determine the timestamp bitstream by determining a first value based on the second timestamp and a range of timestamps (timestamp$_{range}$) based on the example of Equation (2) below:

$$L2_{BASE} = \text{floor}\left(\frac{\text{timestamp}_{minute}}{\text{timestamp}_{range}}\right), \quad \text{Equation (2)}$$

For example, the range of timestamps may represent a range of valid timestamps (e.g., a range of 0-40,320 to represent the number of minutes in a 28-day time period) before a rollover occurs. In some such examples, the range of timestamps may be implemented by a range of timestamps based on Unix time.

In some examples, the timestamp generator circuitry 240 may determine the timestamp bitstream by determining a second value based on the second timestamp, the first value, and the range of timestamps based on the example of Equation (3) below:

$$L5_{VAL} = \text{timestamp}_{minute} - (\text{timestamp}_{range} * L2_{base}), \quad \text{Equation (3)}$$

In some examples, the timestamp generator circuitry 240 may generate a first bit sequence to be inserted into a first encoding layer of a multilayer watermark based on the second value. For example, the timestamp generator circuitry 240 may determine L5$_{VAL}$ to correspond to the timestamp least significant bits 912 of FIG. 9. In some such examples, at least one of the dense watermark embedder circuitry 250 or the sparse watermark embedder circuitry 260 may generate the first bit sequence by converting L5$_{VAL}$ into a binary value. In some such examples, at least one of the dense watermark embedder circuitry 250 or the sparse watermark embedder circuitry 260 may encode the binary value into the fifth frequency layer 518 of the multilayer watermark 900. In some such examples, L5$_{VAL}$ may correspond to a layer 5 value (L5$_{VAL}$) to be used to determine the least significant bits of the timestamp bitstream.

In some examples, the timestamp generator circuitry 240 may determine the timestamp bitstream by determining a third value based on a sum of the first value and the second value based on the example of Equation (4) below:

$$\text{PARITY} = (L2_{BASE} + L5_{VAL}) \ \& \ 0\times07F, \quad \text{Equation (4)}$$

For example, the timestamp generator circuitry 240 may determine a parity value (PARITY), which may be converted to one or more parity bits, based on the sum of L2$_{BASE}$ and L5$_{VAL}$ shifted by an offset value (e.g., a hex value of 0×0F). Advantageously, in some such examples, the timestamp generator circuitry 240 may shift the sum by the hex value of 0×0F to ensure that an increment in the timestamp in minute format adjusts the least significant bits and the most significant bits of the timestamp bitstream, which may facilitate the error checking process.

In some examples, the timestamp generator circuitry 240 may determine the timestamp bitstream by generating a second bit sequence to be inserted into a second encoding layer of a multilayered watermark based on the first value and the parity bits based on the example of Equation (5) below:

$$L2_{VAL} = (L2_{BASE} * 128) + PARITY, \quad \text{Equation (5)}$$

For example, the timestamp generator circuitry 240 may determine $L2_{VAL}$ to correspond to the timestamp most significant bits and parity bits 914 of FIG. 9. In some such examples, at least one of the dense watermark embedder circuitry 250 or the sparse watermark embedder circuitry 260 may generate the second bit sequence by converting $L2_{VAL}$ into a binary value. In some such examples, at least one of the dense watermark embedder circuitry 250 or the sparse watermark embedder circuitry 260 may encode the binary value into the second frequency layer 514 of the multilayer watermark 900. In some such examples, $L2_{VAL}$ may correspond to a layer 2 value ($L2_{VAL}$) to be used to determine the most significant bits and the parity bits of the timestamp bitstream.

In some examples, at least one of the dense watermark embedder circuitry 250 or the sparse watermark embedder circuitry 260 may encode the first bit sequence into the fifth frequency layer 518 and the second bit sequence into the second frequency layer 514. In some examples, at least one of the dense watermark embedder circuitry 250 or the sparse watermark embedder circuitry 260, and/or, more generally, the watermark encoder 106, may provide the encoded media to the media provider 102, the AME 104, and/or the media presentation device 112. In some examples, the watermark decoders 124, 127 of FIG. 1, and/or, more generally, the first meter 120 and/or the second meter 126 of FIG. 1, may identify at least one of the first symbols 902, the second symbols 904, or the third symbols 906. For example, the media identification determiner circuitry 330 of FIG. 3 may identify the media identifier 910 in response to a detection of the first symbols 902 by the watermark detector circuitry 320 of FIG. 3. In some examples, the timestamp determiner circuitry 350 of FIG. 3 may identify the most significant bits of the timestamp and the parity bits in response to a detection of the second symbols 904 by the watermark detector circuitry 320. In some examples, the timestamp determiner circuitry 350 may identify the least significant bits of the timestamp in response to a detection of the third symbols 906 by the watermark detector circuitry 320. In some examples, the timestamp determiner circuitry 350 may determine the timestamp based on the decoded ones of the most significant bits and the least significant bits. Advantageously, the timestamp determiner circuitry 350 may verify, validate, etc., an accuracy of the timestamp based on the parity bits.

Flowcharts representative of example hardware logic circuitry, machine readable instructions, hardware implemented state machines, and/or any combination thereof for implementing the watermark encoder 106 of FIGS. 1 and/or 2, the first watermark decoder 124 of FIGS. 1 and/or 3, the second watermark decoder 127 of FIGS. 1 and/or 3, and/or the AME 104 of FIGS. 1 and/or 4 are shown in FIGS. 10-13. The machine readable instructions may be one or more executable programs or portion(s) of an executable program for execution by processor circuitry, such as the processor circuitry 1412 shown in the example processor platform 1400 discussed below in connection with FIG. 14, the processor circuitry 1512 shown in the example processor platform 1500 discussed below in connection with FIG. 15, the processor circuitry 1612 shown in the example processor platform 1600 discussed below in connection with FIG. 16, and/or the example processor circuitry discussed below in connection with FIGS. 17 and/or 18. The program may be embodied in software stored on one or more non-transitory computer readable storage media such as a CD, a floppy disk, an HDD, an SSD, a DVD, a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 10-13, many other methods of implementing the watermark encoder 106, the first watermark decoder 124, the second watermark decoder 127, and/or the AME 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 10-13 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 10:
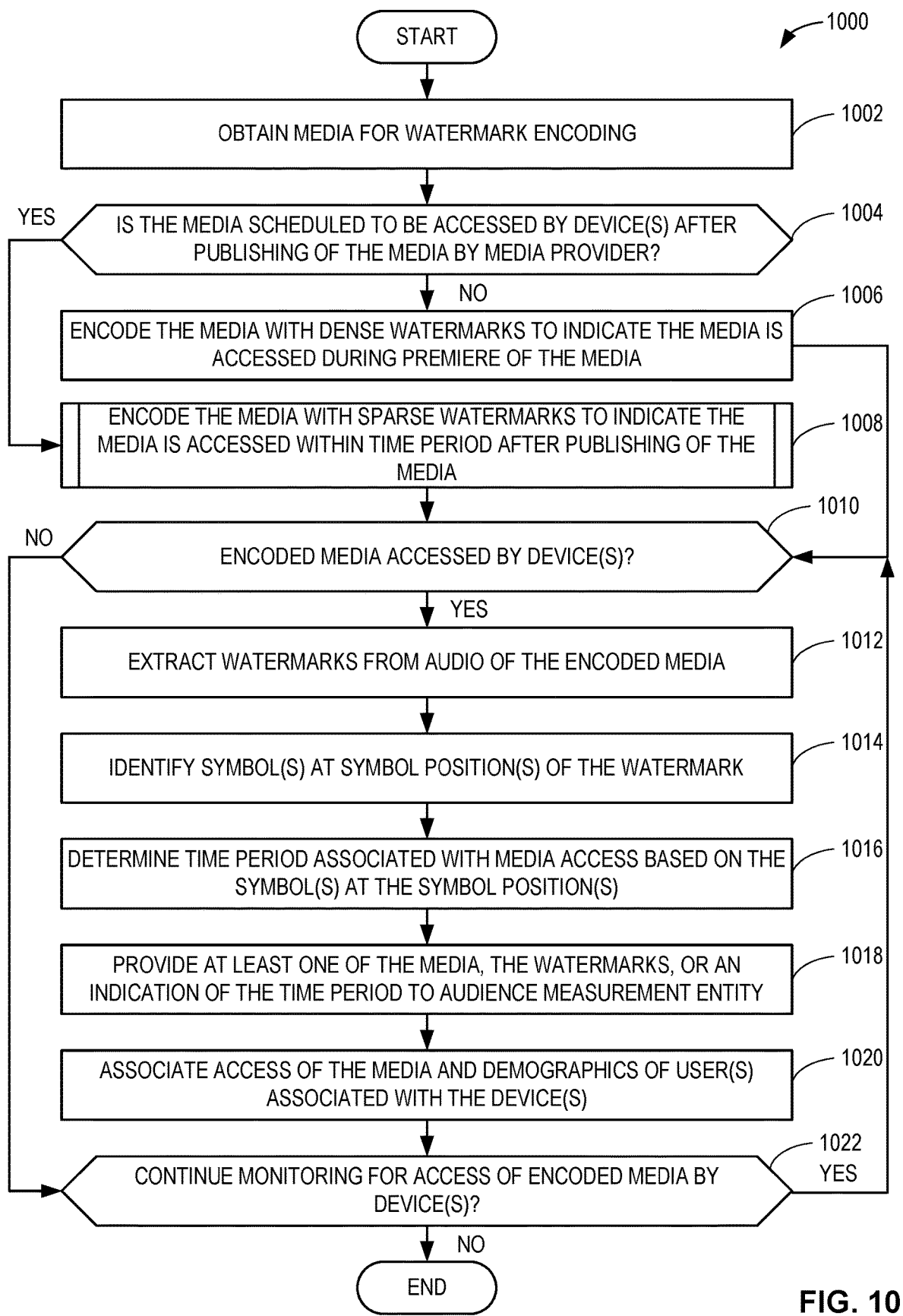
FIG. 10 is a flowchart representative of example machine readable instructions and/or example operations that may be executed by example processor circuitry to implement the example watermark encoder of FIGS. 1 and/or 2, the example watermark decoder of FIGS. 1 and/or 3, and/or the example audience measurement entity of FIGS. 1 and/or 4 to associate access of media and demographics of user(s) associated with device(s).

FIG. 10 is a flowchart representative of example machine readable instructions and/or example operations 1000 that may be executed and/or instantiated by processor circuitry to associate access of media and demographics of user(s) associated with device(s).

The machine readable instructions and/or the operations 1000 of FIG. 10 begin at block 1002, at which the watermark encoder 106 (FIG. 1) obtains media for watermark encoding. For example, the interface circuitry 210 (FIG. 2) may obtain media from at least one of the media provider 102 (FIG. 1) or the AME 104 (FIG. 1).

At block 1004, the watermark encoder 106 determines whether the media is scheduled to be accessed by device(s) after publishing of the media by a media provider. For example, the media identification generator circuitry 220 (FIG. 2) may determine that the media is a linear program, RTVOD media, VOD media, etc., based on the media, or data associated with the media.

If, at block 1004, the watermark encoder 106 determines that the media is not scheduled to be accessed by device(s) after publishing of the media by a media provider, then, at block 1006, the watermark encoder 106 encodes the media with dense watermarks to indicate the media is accessed during a premiere of the media. For example, the dense watermark embedder circuitry 250 (FIG. 2) may embed the media with the dense single layer watermark 600 of FIG. 6, the dense multilayer watermark 620 of FIG. 6, etc. In response to encoding the media with dense watermarks to indicate the media is accessed during a premier of the media at block 1006, control proceeds to block 1010 to determine whether the encoded media is accessed by device(s).

If, at block 1004, the watermark encoder 106 determines that the media is scheduled to be accessed by device(s) after publishing of the media by a media provider, control proceeds to block 1008 to encode the media with sparse watermarks to indicate the media is accessed within a time period after publishing of the media. For example, in response to a determination that the media is to be accessed within a first time period after the publishing of the media (e.g., within three days of the initial publishing of the media), the sparse watermark embedder circuitry 260 (FIG. 2) may encode the media with the first sparse multilayer watermark 700 of FIG. 7. In some examples, in response to a determination that the media is to be accessed within a second time period after the publishing of the media (e.g., within seven days of the initial publishing of the media), the sparse watermark embedder circuitry 260 may encode the media with the second sparse multilayer watermark 730 of FIG. 7. An example process that may implement block 1008 is described below in connection with FIG. 11.

In response to encoding the media with sparse watermarks to indicate the media is accessed within a time period after publishing of the media at block 1008, the watermark decoders 124, 127 (FIG. 1) determine whether the encoded media is accessed by device(s) at block 1010. For example, the watermark detector circuitry 320 (FIG. 3) and/or the watermark detector circuitry 420 (FIG. 4) may determine that the encoded media is accessed by the media presentation device 112 (FIG. 1) in response to a detection of a watermark.

If, at block 1010, the watermark decoders 124, 127 determine that the encoded media is not accessed by device(s), control proceeds to block 1022 to determine whether to continue monitoring for access of encoded media by device(s). If, at block 1010, the watermark decoders 124, 127 determine that the encoded media is accessed by device(s), then, at block 1012, the watermark decoders 124, 127 extract watermarks from audio of the encoded media. For example, the watermark detector circuitry 320 and/or the watermark detector circuitry 420 may extract the first sparse multilayer watermark 700 of FIG. 7, the second sparse multilayer watermark 730 of FIG. 7, etc., from audio output of the audio devices 132 (FIG. 1).

At block 1014, the watermark decoders 124, 127 identify symbol(s) at symbol position(s) of the watermark. For example, the watermark detector circuitry 320 and/or the watermark detector circuitry 420 may identify the first symbol 712 (FIG. 7) at the first symbol position of the symbol positions 716 (FIG. 7), the second symbol 714 (FIG. 7) at the third symbol position of the symbol positions 716, the third symbol 722 (FIG. 7) at the fifth symbol position of the symbol positions 716, and/or the fourth symbol 724 (FIG. 7) at the eighth symbol position of the symbol positions 716.

At block 1016, the watermark decoders 124, 127 determine a time period associated with media access based on the symbol(s) at the symbol position(s). For example, the timestamp determiner circuitry 350 (FIG. 3) and/or the timestamp determiner circuitry 450 (FIG. 4) may determine that the media is accessed by the media presentation device 112 during a first time period in response to a detection of the first symbol 712 at the first symbol position, the second symbol 714 at the third symbol position, etc. In some such examples, the timestamp determiner circuitry 350 and/or the timestamp determiner circuitry 450 may determine that the detection of the first symbol 712 at the first symbol position, the second symbol 714 at the third symbol position, etc., indicates a first media state of the media (e.g., the media is accessed within three days of an initial publishing of the media by the media provider 102).

At block 1018, the watermark decoders 124, 127 provide at least one of the media, the watermarks, or an indication of the time period to an audience measurement entity. For example, the interface circuitry 310 (FIG. 3) may transmit at least one of the media, the first sparse multilayer watermark 700, or the first media state to the AME 104 via the second network 110 (FIG. 1).

At block 1020, the AME 104 associates an access of the media and demographic(s) of user(s) associated with device(s). For example, the demographic associator circuitry 460 (FIG. 4) may generate an association (e.g., a data association) of the access of the media by the media presentation device 112 and the demographic data 480 (FIG. 4) that corresponds to a user (e.g., the panelist 116 (FIG. 1)) associated with the media presentation device 112. In some such examples, the demographic associator circuitry 460 may store the association in the datastore 470 (FIG. 4). In some examples, the demographic associator circuitry 460 may invoke the interface circuitry 410 to provide the association, the demographic data 480, etc., to the media provider 102. In some examples, the media provider 102 may improve a media platform (e.g., hardware, software, and/or firmware of the media platform) based on at least one of the association, the demographic data 480, etc., because the at least one of the association, the demographic data 480, etc., may indicate areas of improvement on how to access the media platform hosted by the media provider 102.

At block 1022, the watermark decoders 124, 127 determine whether to continue monitoring for access of encoded media by device(s). For example, the watermark detector circuitry 320 and/or the watermark detector circuitry 420 may determine whether another watermark is detected at the monitored site 130. If, at block 1022, the watermark decoders 124, 127 determine to continue monitoring for access of encoded media by device(s), control returns to block 1010 to determine whether encoded media is accessed by device(s), otherwise the example machine readable instructions and/or the operations 1000 of FIG. 10 conclude.

Figure 11:
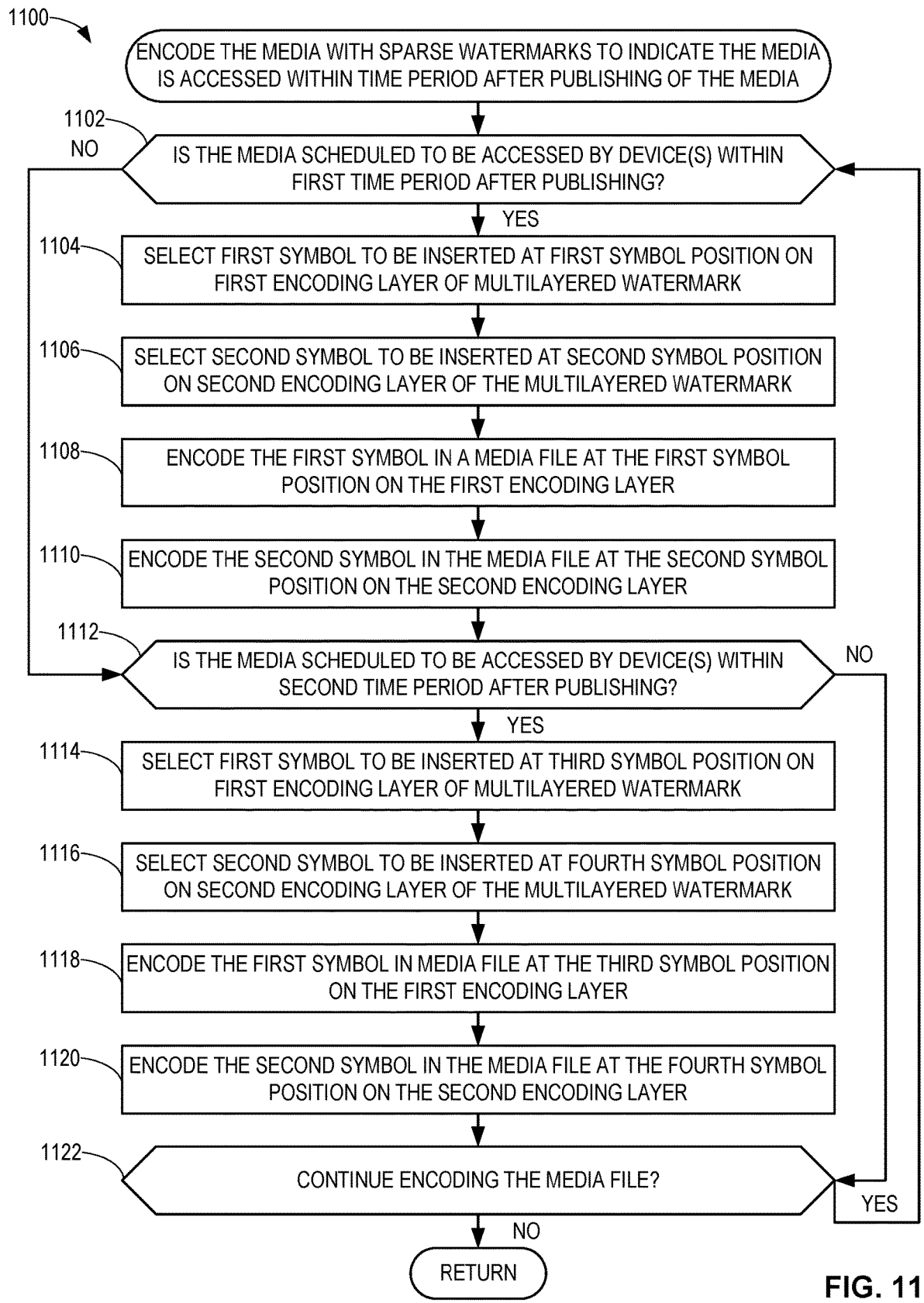
FIG. 11 is a flowchart representative of example machine readable instructions and/or example operations that may be executed by example processor circuitry to implement the example watermark encoder of FIGS. 1 and/or 2 to encode media with sparse watermarks to indicate the media is accessed within a time period after publishing of the media.

FIG. 11 is a flowchart representative of example machine readable instructions and/or example operations 1100 that may be executed and/or instantiated by processor circuitry to encode media with sparse watermarks to indicate the media is accessed within a time period after publishing of the media. In some examples, the machine readable instructions and/or the operations 1100 of FIG. 11 may be executed and/or instantiated by processor circuitry to implement block 1008 of FIG. 10. The machine readable instructions and/or the operations 1100 of FIG. 11 begin at block 1102, at which the watermark encoder 106 determines whether the media is scheduled to be accessed by device(s) within a first time period after publishing. For example, the media identification generator circuitry 220 (FIG. 2) may determine that the media is to be accessed within three days after an initial publishing of the media by the media provider 102 (FIG. 1).

If, at block 1102, the watermark encoder 106 determines that the media is not scheduled to be accessed by device(s) within a first time period after publishing, control proceeds to block 1112 to determine whether the media is to be accessed by device(s) within a second time period after publishing. If, at block 1102, the watermark encoder 106 determines that the media is scheduled to be accessed by device(s) within a first time period after publishing, then, at block 1104, the watermark encoder 106 selects a first symbol to be inserted at a first symbol position on a first encoding layer of a multilayered watermark. For example, the sparse watermark embedder circuitry 260 (FIG. 2) may select the first symbol 712 (FIG. 7) to be inserted at the first symbol position of the symbol positions 716 (FIG. 7) on the first layer 702 (FIG. 7) of the first sparse multilayer watermark 700 (FIG. 7). In some such examples, the sparse watermark embedder circuitry 260 may select the second symbol 714 (FIG. 7) to be inserted at the third symbol position of the symbol positions 716 on the first layer 702 of the first sparse multilayer watermark 700.

At block 1106, the watermark encoder 106 selects a second symbol to be inserted at a second symbol position on a second encoding layer of the multilayered watermark. For example, the sparse watermark embedder circuitry 260 may select the third symbol 722 (FIG. 7) to be inserted at the fifth symbol position of the symbol positions 716 on the second layer 704 of the first sparse multilayer watermark 700. In some such examples, the sparse watermark embedder circuitry 260 may select the fourth symbol 724 (FIG. 7) to be inserted at the eighth symbol position of the symbol positions 716 on the second layer 704 of the first sparse multilayer watermark 700.

At block 1108, the watermark encoder 106 encodes the first symbol in a media file at the first symbol position on the first encoding layer. For example, the sparse watermark embedder circuitry 260 may encode the first symbol 712 in the media at the first symbol position on the first layer 702. In some such examples, the sparse watermark embedder circuitry 260 may encode the second symbol 714 in the media at the third symbol position on the first layer 702. In some such examples, the sparse watermark embedder circuitry 260 may not include a symbol at the second, fourth, fifth, sixth, seventh, and/or eighth symbol position on the first layer 702.

At block 1110, the watermark encoder 106 encodes the second symbol in the media file at the second symbol position on the second encoding layer. For example, the sparse watermark embedder circuitry 260 may encode the third symbol 722 in the media at the fifth symbol position on the second layer 704. In some such examples, the sparse watermark embedder circuitry 260 may encode the fourth symbol 724 in the media at the eighth symbol position on the second layer 704. In some such examples, the sparse watermark embedder circuitry 260 may not include a symbol at the first, second, third, fourth, sixth, and/or seventh symbol position on the second layer 704.

At block 1112, the watermark encoder 106 determines whether the media is scheduled to be accessed by device(s) within a second time period after publishing. For example, the media identification generator circuitry 220 may determine that the media is to be accessed within seventh days after an initial publishing of the media by the media provider 102.

If, at block 1112, the watermark encoder 106 determines that the media is not scheduled to be accessed by device(s) within a second time period after publishing, control proceeds to block 1122 to determine whether to continue encoding the media file. If, at block 1112, the watermark encoder 106 determines that the media is scheduled to be accessed by device(s) within a second time period after publishing, then, at block 1114, the watermark encoder 106 selects a first symbol to be inserted at a third symbol position on a first encoding layer of a multilayered watermark. For example, the sparse watermark embedder circuitry 260 may select the fifth symbol 742 (FIG. 7) to be inserted at the fourth symbol position of the symbol positions 716 on the first layer 702 of the second sparse multilayer watermark 730 (FIG. 7). In some such examples, the sparse watermark embedder circuitry 260 may select the sixth symbol 744 (FIG. 7) to be inserted at the seventh symbol position of the symbol positions 716 on the first layer 702 of the second sparse multilayer watermark 730.

At block 1116, the watermark encoder 106 selects a second symbol to be inserted at a fourth symbol position on a second encoding layer of the multilayered watermark. For example, the sparse watermark embedder circuitry 260 may select the seventh symbol 752 (FIG. 7) to be inserted at the second symbol position of the symbol positions 716 on the second layer 704 of the second sparse multilayer watermark 730. In some such examples, the sparse watermark embedder circuitry 260 may select the eighth symbol 754 (FIG. 7) to be inserted at the sixth symbol position of the symbol positions 716 on the second layer 704 of the second sparse multilayer watermark 730.

At block 1118, the watermark encoder 106 encodes the first symbol in a media file at the third symbol position on the first encoding layer. For example, the sparse watermark embedder circuitry 260 may encode the fifth symbol 742 in the media at the fourth symbol position on the first layer 702. In some such examples, the sparse watermark embedder circuitry 260 may encode the sixth symbol 744 in the media at the seventh symbol position on the first layer 702. In some such examples, the sparse watermark embedder circuitry 260 may not include a symbol at the first, second, third, fifth, sixth, and/or seventh symbol position on the first layer 702.

At block 1120, the watermark encoder 106 encodes the second symbol in the media file at the fourth symbol position on the second encoding layer. For example, the sparse watermark embedder circuitry 260 may encode the seventh symbol 752 in the media at the second symbol position on the second layer 704. In some such examples, the sparse watermark embedder circuitry 260 may encode the eighth symbol 754 in the media at the sixth symbol position on the second layer 704. In some such examples, the sparse watermark embedder circuitry 260 may not include a symbol at the first, third, fourth, fifth, seventh, and/or eighth symbol position on the second layer 704

At block 1122, the watermark encoder 106 determines whether to continue encoding the media file. For example, the media identification generator circuitry 220 (FIG. 2) may determine that the encoding of the media file is complete, or portion(s) of the media file is/are yet to be encoded. If, at block 1122, the watermark encoder 106 determines to continue encoding the media file, control returns to block 1102 to determine whether the media is scheduled to be accessed by device(s) within a first time period after publishing. If, at block 1122, the watermark encoder 106 determines not to continue encoding the media file, the example machine readable instructions and/or the operations 1100 of FIG. 11 conclude. For example, the machine readable instructions and/or the operations 1100 of FIG. 11 may return to block 1010 of the machine readable instructions and/or the operations 1000 of FIG. 10 to determine whether the encoded media is accessed by device(s).

Figure 12:
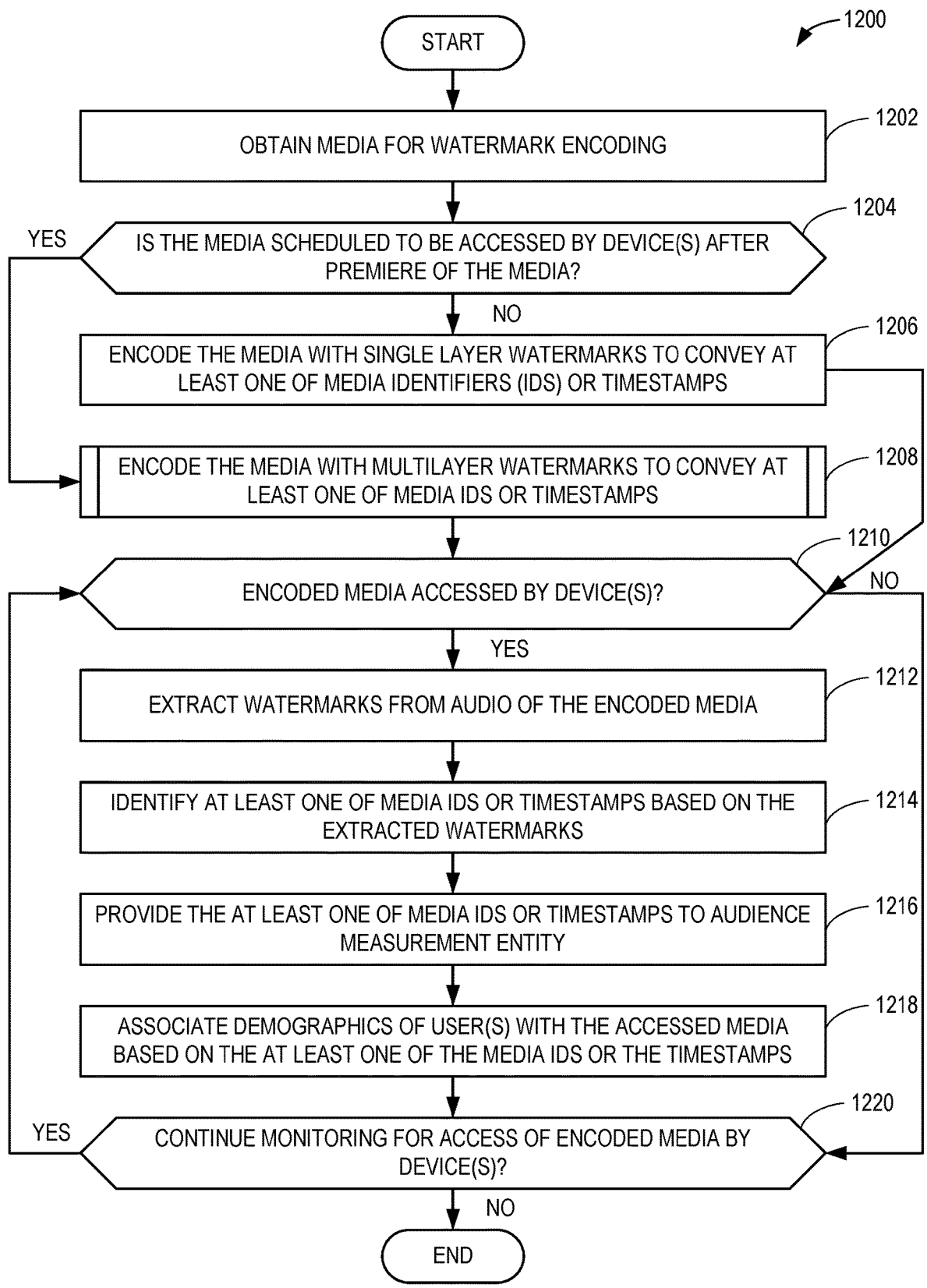
FIG. 12 is a flowchart representative of example machine readable instructions and/or example operations that may be executed by example processor circuitry to implement the example watermark encoder of FIGS. 1 and/or 2, the example watermark decoder of FIGS. 1 and/or 3, and/or the example audience measurement entity of FIGS. 1 and/or 4 to associate demographics of user(s) with accessed media based on at least one of media identifiers or timestamps.

FIG. 12 is a flowchart representative of example machine readable instructions and/or example operations 1200 that may be executed and/or instantiated by processor circuitry to associate demographics of user(s) with accessed media based on at least one of media identifiers or timestamps. The machine readable instructions and/or the operations 1200 of FIG. 12 begin at block 1202, at which the watermark encoder 106 (FIG. 1) obtains media for watermark encoding. For example, the interface circuitry 210 (FIG. 2) may obtain media from at least one of the media provider 102 (FIG. 1) or the AME 104 (FIG. 1).

At block 1204, the watermark encoder 106 determines whether the media is scheduled to be accessed by device(s) after a premiere of the media. For example, the media identification generator circuitry 220 (FIG. 2) may determine that the media is a linear program, RTVOD media, library VOD media, etc., based on the media, or data associated with the media. In some such examples, the media identification generator circuitry 220 may determine that the media is on-demand media, such as RTVOD or library VOD media, in response to a determination that the media is to be accessed after an initial publishing of the media on a media platform managed and/or otherwise hosted by the media provider 102.

If, at block 1204, the watermark encoder 106 determines that the media is not scheduled to be accessed by device(s) after a premiere of the media, then, at block 1206, the watermark encoder 106 encodes the media with single layer watermarks to convey at least one of media identifiers (IDs) or timestamps. For example, the dense watermark embedder circuitry 250 (FIG. 2) may embed the media with the single-layer watermark 800 (FIG. 8) to convey at least one of the media identifier 805 (FIG. 8) or the timestamp 810 (FIG. 8). In response to encoding the media with single layer watermarks to convey at least one of media IDs or timestamps at block 1206, control proceeds to block 1210 to determine whether the encoded media is accessed by device(s).

If, at block 1204, the watermark encoder 106 determines that the media is scheduled to be accessed by device(s) after a premiere of the media, control proceeds to block 1208 to encode the media with multilayer watermarks to convey at least one of media IDs or timestamps. An example process that may implement block 1208 is described below in connection with FIG. 13. In response to encoding the media with multilayer watermarks to convey at least one of media IDs or timestamps at block 1208, the watermark decoders 124, 127 (FIG. 1) determines whether the encoded media is accessed by device(s) at block 1210. For example, the watermark detector circuitry 320 (FIG. 3) and/or the watermark detector circuitry 420 (FIG. 4) may determine that the encoded media is accessed by the media presentation device 112 (FIG. 1) in response to a detection of a watermark.

If, at block 1210, the watermark decoders 124, 127 determine that the encoded media is not accessed by device(s), control proceeds to block 1220 to determine whether to continue monitoring for access of encoded media by device(s). If, at block 1210, the watermark decoders 124, 127 determine that the encoded media is accessed by device(s), then, at block 1212, the watermark decoders 124, 127 extract watermarks from audio of the encoded media. For example, the watermark detector circuitry 320 may extract the multilayer watermark 900 of FIG. 9 from audio output of the audio devices 132 (FIG. 1).

At block 1214, the watermark decoders 124, 127 identify at least one of media IDs or timestamps based on the extracted watermarks. For example, the watermark detector circuitry 320 and/or the watermark detector circuitry 420 may identify the first symbols 902 (FIG. 9) on at least one of the second frequency layer 514 (FIG. 5) or the fifth frequency layer 518 (FIG. 5). In some such examples, the media identification determiner circuitry 330 (FIG. 3) and/or the media identification determiner circuitry 430 (FIG. 4) may identify the media identifier 910 based on the first symbols 902. In some examples, the watermark detector circuitry 320 and/or the watermark detector circuitry 420 may identify the second symbols 904 on the second frequency layer 514 and/or the third symbols 906 on the fifth frequency layer 518. In some such examples, the timestamp determiner circuitry 350 (FIG. 3) and/or the timestamp determiner circuitry 450 (FIG. 4) may identify the timestamp most significant bits and the parity bits 914 based on the second symbols 904 and the timestamp least significant bits 912 based on the third symbols 906. In some such examples, the timestamp determiner circuitry 350 and/or the timestamp determiner circuitry 450 may identify the timestamp based on a combination, aggregation, etc., of the most significant bits and the least significant bits.

At block 1216, the watermark decoders 124, 127 provide at least one of media identifiers or timestamps to an audience measurement entity. For example, the interface circuitry 310 (FIG. 3) may transmit at least one of the media identifier 910 or the timestamp based on the timestamp least significant bits 912 and the timestamp most significant bits 914 to the AME 104 via the second network 110 (FIG. 1).

At block 1218, the AME 104 associates demographics of user(s) with the accessed media based on the at least one of the media IDs or the timestamps. For example, the demographic associator circuitry 460 (FIG. 4) may generate an association (e.g., a data association) of the access of the media by the media presentation device 112 and the demographic data 480 (FIG. 4) that corresponds to a user (e.g., the panelist 116 (FIG. 1)) associated with the media presentation device 112. In some such examples, the demographic associator circuitry 460 may store the association in the datastore 470 (FIG. 4). In some examples, the demographic associator circuitry 460 may invoke the interface circuitry 410 to provide the association, the demographic data 480, etc., to the media provider 102.

At block 1220, the watermark decoders 124, 127 determine whether to continue monitoring for access of encoded media by device(s). For example, the watermark detector circuitry 320 and/or the watermark detector circuitry 420 may determine whether another watermark is detected at the monitored site 130. If, at block 1220, the watermark decoders 124, 127 determine to continue monitoring for access of encoded media by device(s), control returns to block 1210 to determine whether encoded media is accessed by device(s), otherwise the example machine readable instructions and/or the operations 1200 of FIG. 12 conclude.

Figure 13:
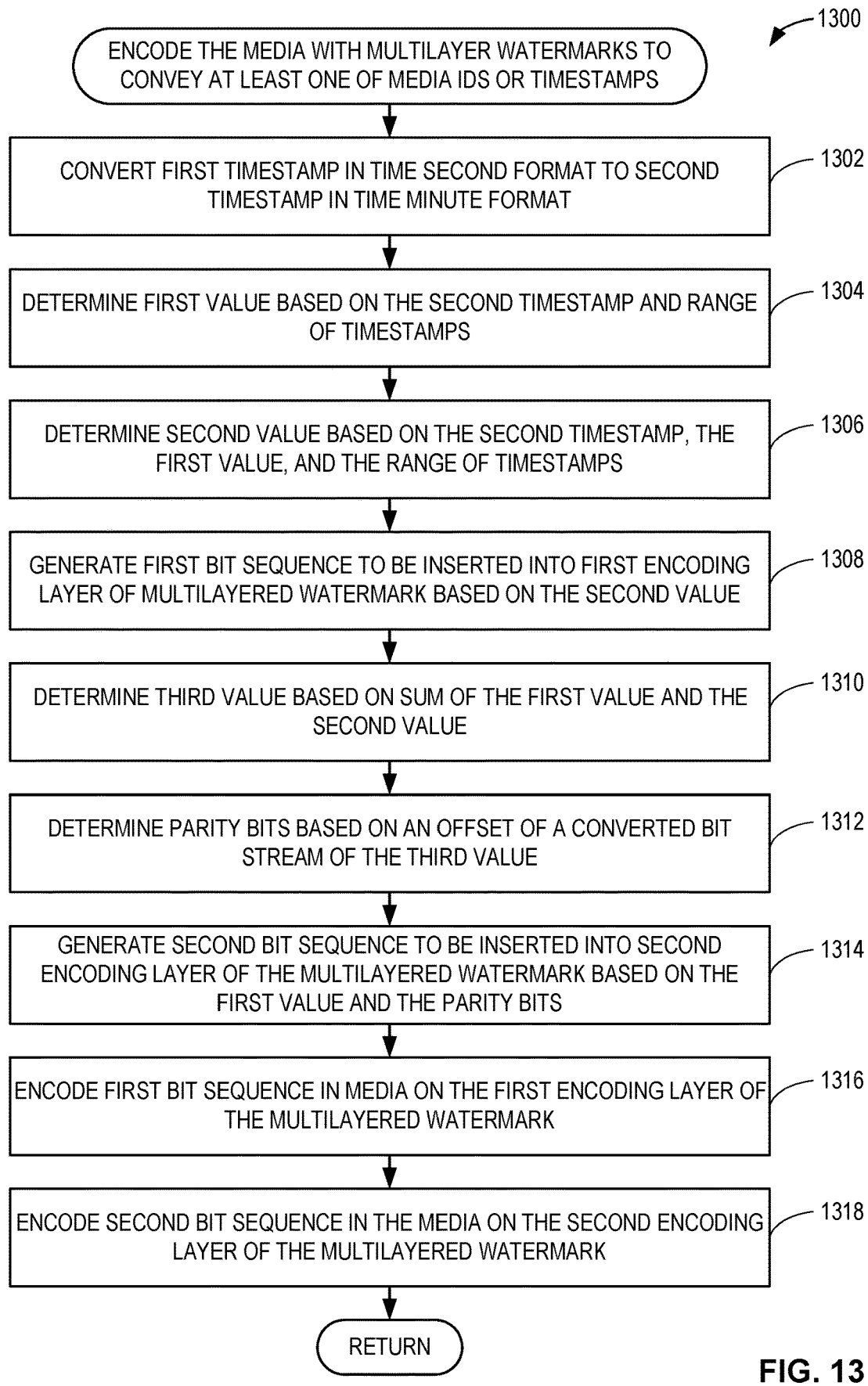
FIG. 13 is a flowchart representative of example machine readable instructions and/or example operations that may be executed by example processor circuitry to implement the example watermark encoder of FIGS. 1 and/or 2 to encode media with multilayer watermarks to convey at least one of media identifiers or timestamps.

FIG. 13 is a flowchart representative of example machine readable instructions and/or example operations 1300 that may be executed and/or instantiated by processor circuitry to encode media with multilayer watermarks to convey at least one of media identifiers or timestamps. The machine readable instructions and/or the operations 1300 of FIG. 13 begin at block 1302, at which the watermark encoder 106 converts a first timestamp in time second format to a second timestamp in time minute format. For example, the timestamp generator circuitry 240 (FIG. 2) may determine timestamp$_{minute}$ based on the example of Equation (1) above.

At block 1304, the watermark encoder 106 determines a first value based on the second timestamp and a range of timestamps. For example, the timestamp generator circuitry 240 may determine L2$_{BASE}$ based on the example of Equation (2) above.

At block 1306, the watermark encoder 106 may determine a second value based on the second timestamp, the first value, and the range of timestamps. For example, the timestamp generator circuitry 240 may determine L5$_{VAL}$ based on the example of Equation (3) above.

At block 1308, the watermark encoder 106 may generate a first bit sequence to be inserted into a first encoding layer of a multilayered watermark based on the second value. For example, the timestamp generator circuitry 240 may convert L5$_{VAL}$ into a first bit sequence that includes the timestamp least significant bits 912 (FIG. 9). In some such examples, at least one of the dense watermark embedder circuitry 250 (FIG. 2) or the sparse watermark embedder circuitry 260

(FIG. 2) may generate the third symbols 906 (FIG. 9) based on the timestamp least significant bits 912.

At block 1310, the watermark encoder 106 determines a third value based on a sum of the first value and the second value. For example, the timestamp generator circuitry 240 may determine the third value based on a sum of $L2_{BASE}$ and $L5_{VAL}$.

At block 1312, the watermark encoder 106 determines parity bits based on an offset of a converted bit stream of the third value. For example, the timestamp generator circuitry 240 may convert the third value into a bit stream. In some such examples, the timestamp generator circuitry 240 may determine the parity bits based on an offset of the bit stream by an offset value. For example, the timestamp generator circuitry 240 may determine the parity bits based on the example of Equation (4) above.

At block 1314, the watermark encoder 106 generates a second bit sequence to be inserted into a second encoding layer of the multilayered watermark based on the first value and the parity bits. For example, the timestamp generator circuitry 240 may generate $L2_{VAL}$ based on the example of Equation (5) above. In some such examples, the at least one of the dense watermark embedder circuitry 250 or the sparse watermark embedder circuitry 260 may generate the second symbols 904 (FIG. 9) based on the timestamp most significant bits and parity bits 914 (FIG. 9).

At block 1316, the watermark encoder 106 encodes the first bit sequence in media on the first encoding layer of the multilayered watermark. For example, at least one of the dense watermark embedder circuitry 250 or the sparse watermark embedder circuitry 260 may encode the third symbols 906 on the fifth frequency layer 518 of the multilayered watermark 900 (FIG. 9).

At block 1318, the watermark encoder 106 encodes the second bit sequence in the media on the second encoding layer of the multilayered watermark. For example, at least one of the dense watermark embedder circuitry 250 or the sparse watermark embedder circuitry 260 may encode the second symbols 904 on the second frequency layer 514 of the multilayered watermark 900.

In response to encoding the second bit sequence in the media on the second encoding layer of the multilayered watermark at block 1318, the example machine readable instructions and/or the operations 1300 of FIG. 13 conclude. For example, the machine readable instructions and/or the operations 1300 of FIG. 13 may return to block 1210 of the machine readable instructions and/or the operations 1200 of FIG. 12 to determine whether the encoded media is accessed by device(s).

Figure 14:
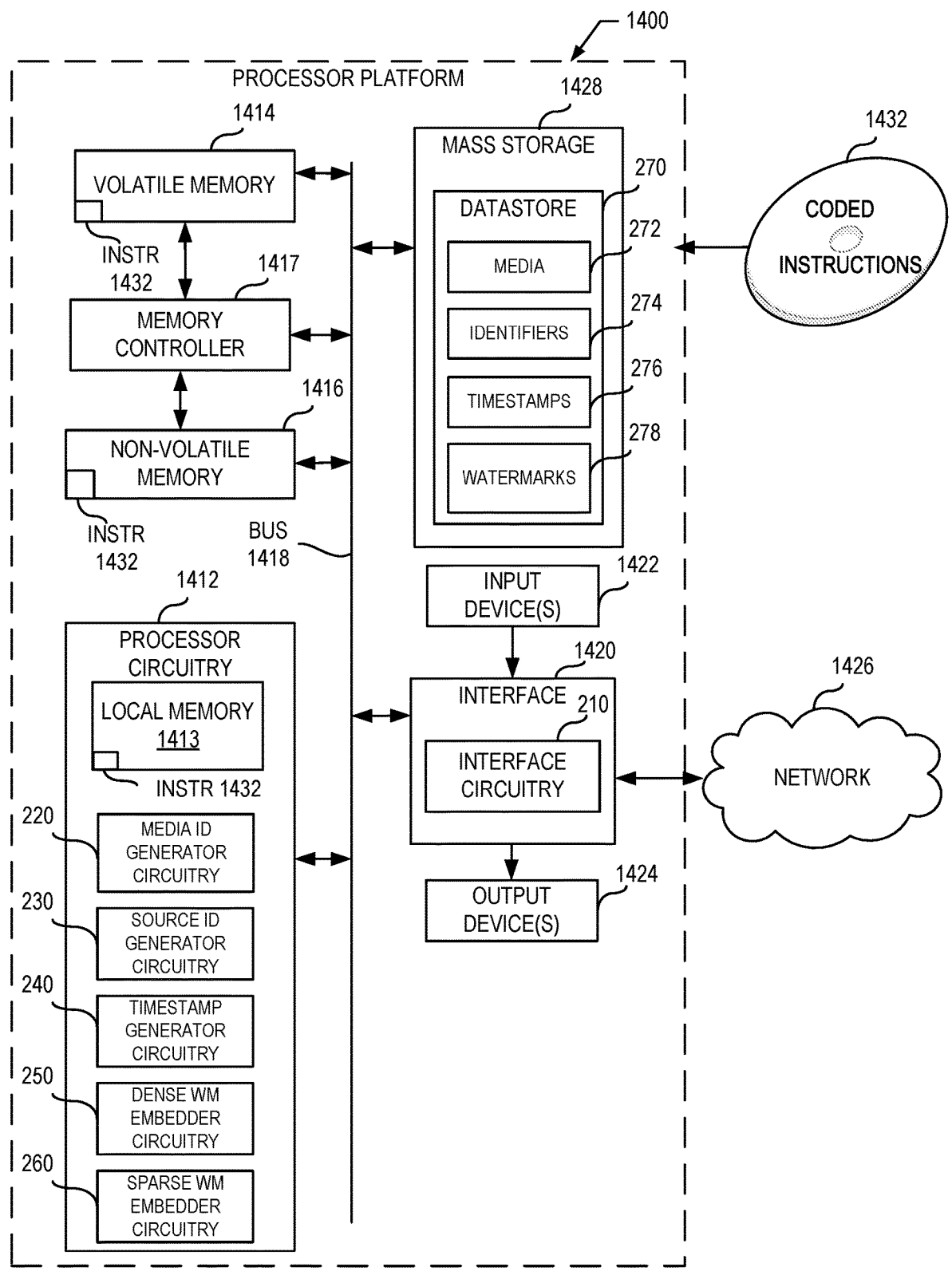
FIG. 14 is a block diagram of an example processing platform including processor circuitry structured to execute the example machine readable instructions and/or the example operations of FIGS. 10, 11, 12, and/or 13 to implement the example watermark encoder of FIGS. 1 and/or 2.

FIG. 14 is a block diagram of an example processor platform 1400 structured to execute and/or instantiate the machine readable instructions and/or the operations of FIGS. 10, 11, 12, and/or 13 to implement the watermark encoder 106 of FIGS. 1 and/or 2. The processor platform 1400 can be, for example, a server, a personal computer, a workstation, a self-learning machine (e.g., a neural network), a mobile device (e.g., a cell phone, a smart phone, a tablet such as an iPad™), or any other type of computing device.

The processor platform 1400 of the illustrated example includes processor circuitry 1412. The processor circuitry 1412 of the illustrated example is hardware. For example, the processor circuitry 1412 can be implemented by one or more integrated circuits, logic circuits, FPGAs microprocessors, CPUs, GPUs, DSPs, and/or microcontrollers from any desired family or manufacturer. The processor circuitry 1412 may be implemented by one or more semiconductor based (e.g., silicon based) devices. In this example, the processor circuitry 1412 implements the media identification generator circuitry 220 (identified by MEDIA ID GENERATOR CIRCUITRY), the source identification generator circuitry 230 (identified by SOURCE ID GENERATOR CIRCUITRY), the timestamp generator circuitry 240, the dense watermark embedder circuitry 250 (identified by DENSE WM EMBEDDER CIRCUITRY), and the sparse watermark embedder circuitry 260 (identified by SPARSE WM EMBEDDER CIRCUITRY) of FIG. 2.

The processor circuitry 1412 of the illustrated example includes a local memory 1413 (e.g., a cache, registers, etc.). The processor circuitry 1412 of the illustrated example is in communication with a main memory including a volatile memory 1414 and a non-volatile memory 1416 by a bus 1418. In some examples, the bus 1418 may implement the bus 280 of FIG. 2. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417.

The processor platform 1400 of the illustrated example also includes interface circuitry 1420. The interface circuitry 1420 may be implemented by hardware in accordance with any type of interface standard, such as an Ethernet interface, a USB interface, a Bluetooth® interface, an NFC interface, a PCI interface, and/or a PCIe interface. In this example, the interface circuitry 1420 implements the interface circuitry 210 of FIG. 2.

In the illustrated example, one or more input devices 1422 are connected to the interface circuitry 1420. The input device(s) 1422 permit(s) a user to enter data and/or commands into the processor circuitry 1412. The input device(s) 1422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuitry 1420 of the illustrated example. The output device(s) 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. In some examples, the network 1426 may implement the first network 108 of FIG. 1. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1400 of the illustrated example also includes one or more mass storage devices 1428 to store software and/or data. Examples of such mass storage devices 1428 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage devices 1428 implement the datastore 270 of FIG. 2, which includes the media 272, the identifiers 274, the timestamps 276, and the watermarks 278 of FIG. 2.

The machine executable instructions 1432, which may be implemented by the machine readable instructions of FIGS. 10, 11, 12, and/or 13, may be stored in the mass storage device 1428, in the volatile memory 1414, in the non-volatile memory 1416, and/or on a removable non-transitory computer readable storage medium such as a CD or DVD.

Figure 15:
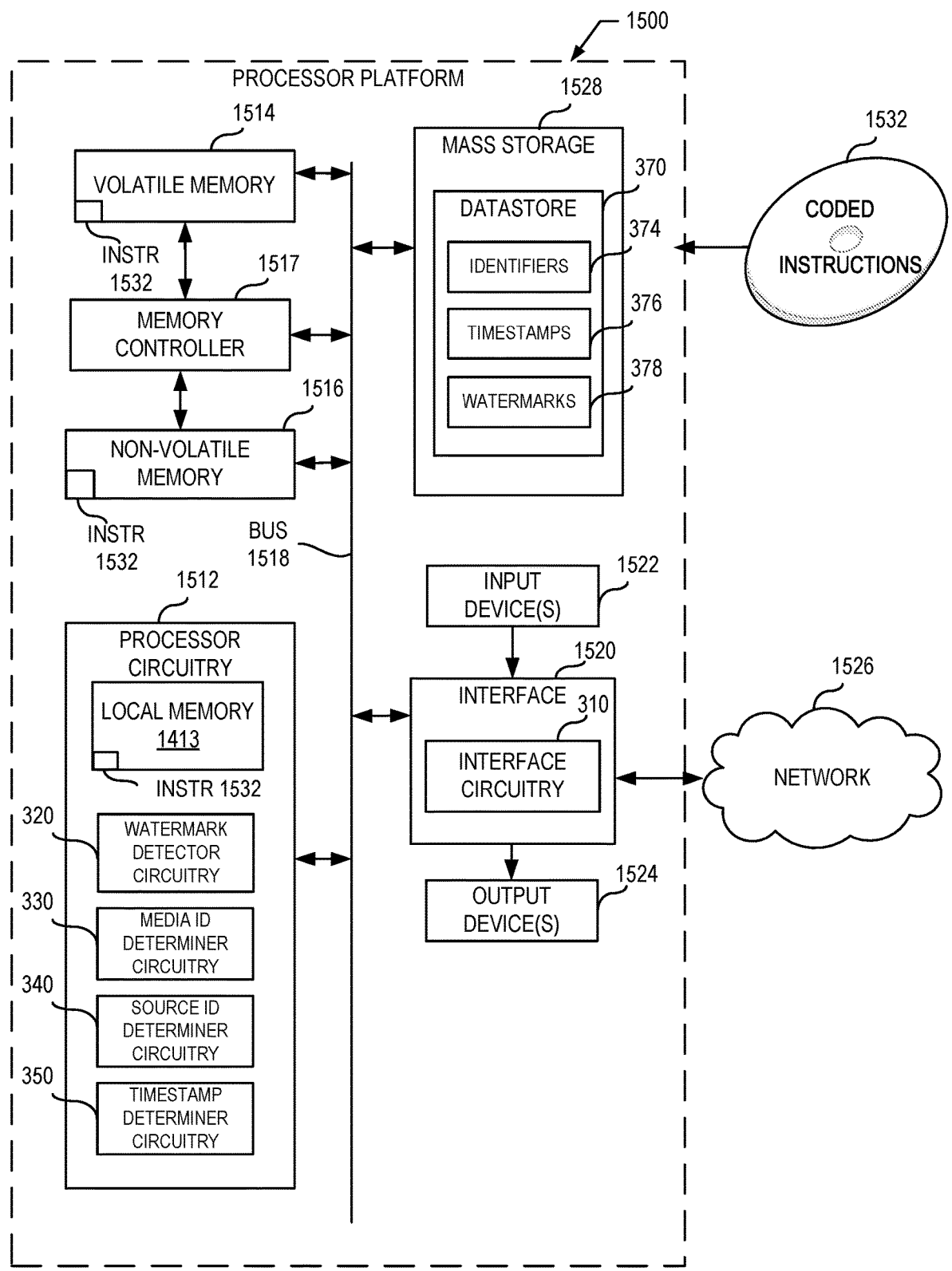
FIG. 15 is a block diagram of an example processing platform including processor circuitry structured to execute the example machine readable instructions and/or the example operations of FIGS. 10 and/or 12 to implement the example watermark decoder of FIGS. 1 and/or 3.

FIG. 15 is a block diagram of an example processor platform 1500 structured to execute and/or instantiate the machine readable instructions and/or the operations of FIGS. 10 and/or 12 to implement the first watermark decoder 124 of FIGS. 1 and/or 3 and/or the second watermark decoder 127 of FIGS. 1 and/or 3. The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1500 of the illustrated example includes processor circuitry 1512. The processor circuitry 1512 of the illustrated example is hardware. For example, the processor circuitry 1512 can be implemented by one or more integrated circuits, logic circuits, FPGAs microprocessors, CPUs, GPUs, DSPs, and/or microcontrollers from any desired family or manufacturer. The processor circuitry 1512 may be implemented by one or more semiconductor based (e.g., silicon based) devices. In this example, the processor circuitry 1512 implements the watermark detector circuitry 320, the media identification determiner circuitry 330 (identified by MEDIA ID DETERMINER CIRCUITRY), the source identification determiner circuitry 340 (identified by SOURCE ID DETERMINER CIRCUITRY), and the timestamp determiner circuitry 350 of FIG. 3.

The processor circuitry 1512 of the illustrated example includes a local memory 1513 (e.g., a cache, registers, etc.). The processor circuitry 1512 of the illustrated example is in communication with a main memory including a volatile memory 1514 and a non-volatile memory 1516 by a bus 1518. In some examples, the bus 1518 may implement the bus 380 of FIG. 3. The volatile memory 1514 may be implemented by SDRAM, DRAM, RDRAM®, and/or any other type of RAM device. The non-volatile memory 1516 may be implemented by flash memory and/or any other desired type of memory device. Access to the main memory 1514, 1516 of the illustrated example is controlled by a memory controller 1517.

The processor platform 1500 of the illustrated example also includes interface circuitry 1520. The interface circuitry 1520 may be implemented by hardware in accordance with any type of interface standard, such as an Ethernet interface, a USB interface, a Bluetooth® interface, an NFC interface, a PCI interface, and/or a PCIe interface. In this example, the interface circuitry 1520 implements the interface circuitry 310 of FIG. 3.

In the illustrated example, one or more input devices 1522 are connected to the interface circuitry 1520. The input device(s) 1522 permit(s) a user to enter data and/or commands into the processor circuitry 1512. The input device(s) 1522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1524 are also connected to the interface circuitry 1520 of the illustrated example. The output device(s) 1524 can be implemented, for example, by display devices (e.g., an LED, an OLED, an LCD, a CRT display, an IPS display, a touchscreen, etc.), a tactile output device, a printer, and/or speaker. The interface circuitry 1520 of the illustrated example, thus, typically includes a graphics driver card, a graphics driver chip, and/or graphics processor circuitry such as a GPU.

The interface circuitry 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1526. In some examples, the network 1526 may implement the second network 110 of FIG. 1. The communication can be by, for example, an Ethernet connection, a DSL connection, a telephone line connection, a coaxial cable system, a satellite system, a line-of-site wireless system, a cellular telephone system, an optical connection, etc.

The processor platform 1500 of the illustrated example also includes one or more mass storage devices 1528 to store software and/or data. Examples of such mass storage devices 1528 include magnetic storage devices, optical storage devices, floppy disk drives, HDDs, CDs, Blu-ray disk drives, RAID systems, solid state storage devices such as flash memory devices and/or SSDs, and DVD drives. In this example, the one or more mass storage devices 1528 implements the datastore 370 of FIG. 3, which includes the identifiers 374, the timestamps 376, and the watermarks 378 of FIG. 3.

The machine executable instructions 1532, which may be implemented by the machine readable instructions of FIGS. 10 and/or 12, may be stored in the mass storage device 1528, in the volatile memory 1514, in the non-volatile memory 1516, and/or on a removable non-transitory computer readable storage medium such as a CD or DVD.

Figure 16:
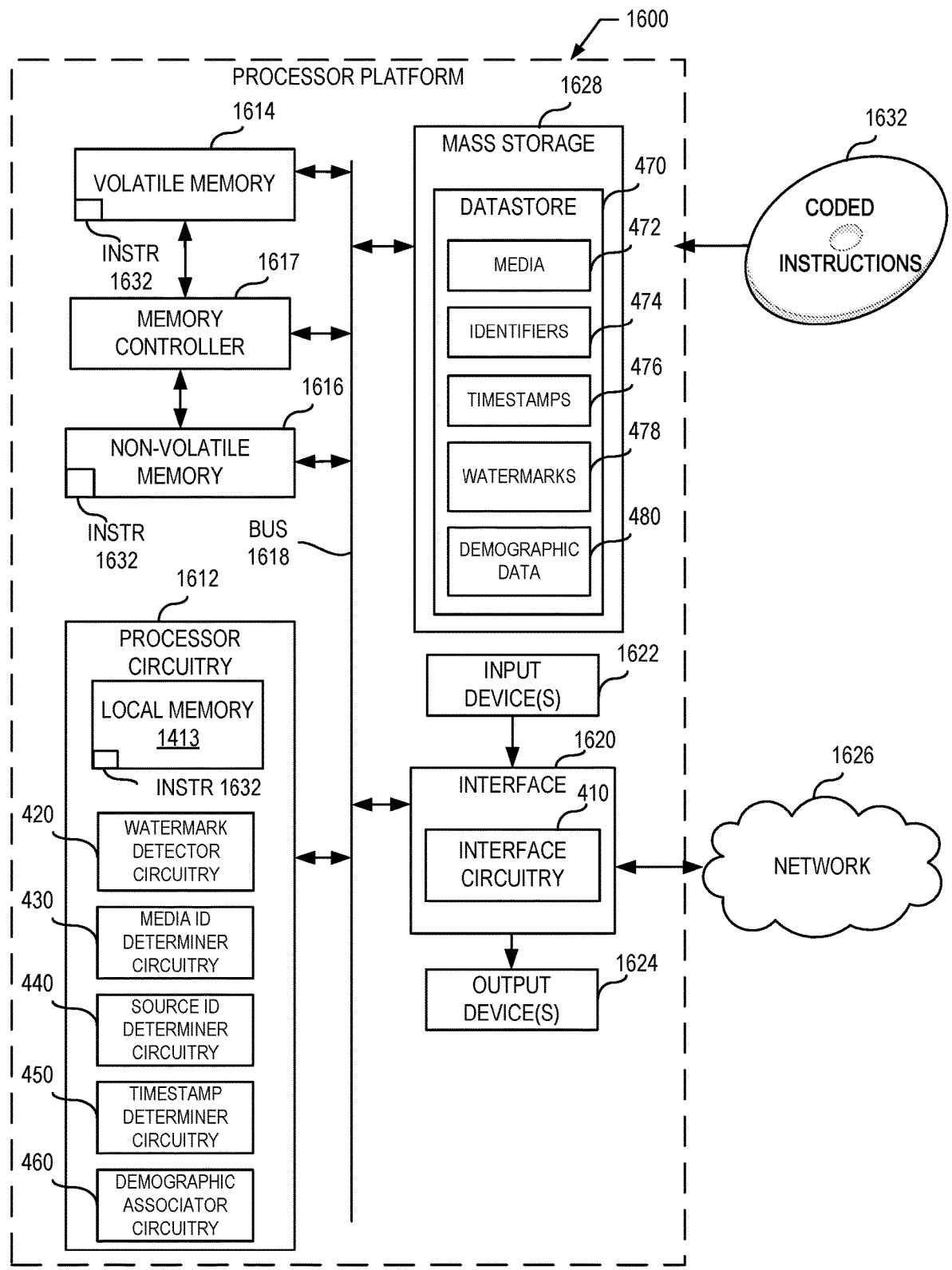
FIG. 16 is a block diagram of an example processing platform including processor circuitry structured to execute the example machine readable instructions and/or the example operations of FIGS. 10 and/or 12 to implement the example audience measurement entity of FIGS. 1 and/or 4.

FIG. 16 is a block diagram of an example processor platform 1600 structured to execute and/or instantiate the machine readable instructions and/or the operations of FIGS. 10 and/or 12 to implement the AME 104 of FIGS. 1 and/or 4. The processor platform 1600 can be, for example, a server, a personal computer, a workstation, a self-learning machine (e.g., a neural network), or any other type of computing device.

The processor platform 1600 of the illustrated example includes processor circuitry 1612. The processor circuitry 1612 of the illustrated example is hardware. For example, the processor circuitry 1612 can be implemented by one or more integrated circuits, logic circuits, FPGAs microprocessors, CPUs, GPUs, DSPs, and/or microcontrollers from any desired family or manufacturer. The processor circuitry 1612 may be implemented by one or more semiconductor based (e.g., silicon based) devices. In this example, the processor circuitry 1612 implements the watermark detector circuitry 420, the media identification determiner circuitry 430 (identified by MEDIA ID DETERMINER CIRCUITRY), the source identification determiner circuitry 440

(identified by SOURCE ID DETERMINER CIRCUITRY), the timestamp determiner circuitry 450, and the demographic associator circuitry 460 of FIG. 4.

The processor circuitry 1612 of the illustrated example includes a local memory 1613 (e.g., a cache, registers, etc.). The processor circuitry 1612 of the illustrated example is in communication with a main memory including a volatile memory 1614 and a non-volatile memory 1616 by a bus 1618. In some examples, the bus 1618 may implement the bus 490 of FIG. 4. The volatile memory 1614 may be implemented by SDRAM, DRAM, RDRAM®, and/or any other type of RAM device. The non-volatile memory 1616 may be implemented by flash memory and/or any other desired type of memory device. Access to the main memory 1614, 1616 of the illustrated example is controlled by a memory controller 1617.

The processor platform 1600 of the illustrated example also includes interface circuitry 1620. The interface circuitry 1620 may be implemented by hardware in accordance with any type of interface standard, such as an Ethernet interface, a USB interface, a Bluetooth® interface, an NFC interface, a PCI interface, and/or a PCIe interface. In this example, the interface circuitry 1620 implements the interface circuitry 410 of FIG. 4.

In the illustrated example, one or more input devices 1622 are connected to the interface circuitry 1620. The input device(s) 1622 permit(s) a user to enter data and/or commands into the processor circuitry 1612. The input device(s) 1622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1624 are also connected to the interface circuitry 1620 of the illustrated example. The output device(s) 1624 can be implemented, for example, by display devices (e.g., an LED, an OLED, an LCD, a CRT display, an IPS display, a touchscreen, etc.), a tactile output device, a printer, and/or speaker. The interface circuitry 1620 of the illustrated example, thus, typically includes a graphics driver card, a graphics driver chip, and/or graphics processor circuitry such as a GPU.

The interface circuitry 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1626. In some examples, the network 1626 may implement the first network 108 and/or the second network 110 of FIG. 1. The communication can be by, for example, an Ethernet connection, a DSL connection, a telephone line connection, a coaxial cable system, a satellite system, a line-of-site wireless system, a cellular telephone system, an optical connection, etc.

The processor platform 1600 of the illustrated example also includes one or more mass storage devices 1628 to store software and/or data. Examples of such mass storage devices 1628 include magnetic storage devices, optical storage devices, floppy disk drives, HDDs, CDs, Blu-ray disk drives, RAID systems, solid state storage devices such as flash memory devices and/or SSDs, and DVD drives. In this example, the one or more mass storage devices 1628 implements the datastore 470 of FIG. 4, which includes the media 472, the identifiers 474, the timestamps 476, the watermarks 478, and the demographic data 480 of FIG. 4.

The machine executable instructions 1632, which may be implemented by the machine readable instructions of FIGS. 10 and/or 12, may be stored in the mass storage device 1628, in the volatile memory 1614, in the non-volatile memory 1616, and/or on a removable non-transitory computer readable storage medium such as a CD or DVD.

Figure 17:
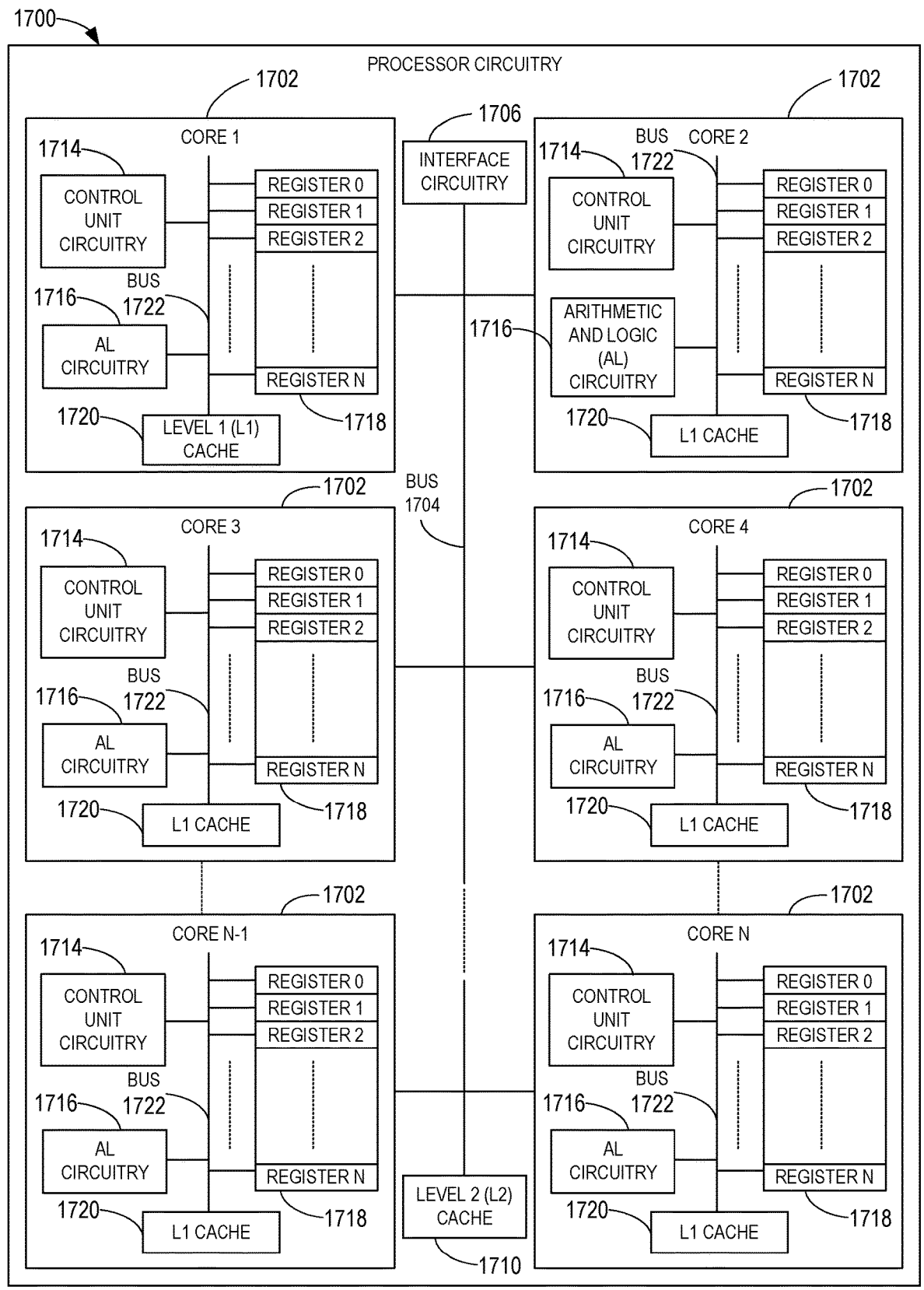
FIG. 17 is a block diagram of an example implementation of the processor circuitry of FIGS. 14, 15, and/or 16.

FIG. 17 is a block diagram of an example implementation of the processor circuitry 1412 of FIG. 4, the processor circuitry 1512 of FIG. 15, and/or the processor circuitry 1612 of FIG. 16. In this example, the processor circuitry 1412 of FIG. 4, the processor circuitry 1512 of FIG. 15, and/or the processor circuitry 1612 of FIG. 16 is implemented by a general purpose microprocessor 1700. The general purpose microprocessor circuitry 1700 execute some or all of the machine readable instructions of the flowcharts of FIGS. 10, 11, 12, and/or 13 to effectively instantiate the watermark encoder 106 of FIGS. 1 and/or 2, the first watermark decoder 124 of FIGS. 1 and/or 3, the second watermark decoder 127 of FIGS. 1 and/or 3, and/or the AME of FIGS. 1 and/or 4 as logic circuits to perform the operations corresponding to those machine readable instructions. For example, the microprocessor 1700 may implement multi-core hardware circuitry such as a CPU, a DSP, a GPU, an XPU, etc. Although it may include any number of example cores 1702 (e.g., 1 core), the microprocessor 1700 of this example is a multi-core semiconductor device including N cores. The cores 1702 of the microprocessor 1700 may operate independently or may cooperate to execute machine readable instructions. For example, machine code corresponding to a firmware program, an embedded software program, or a software program may be executed by one of the cores 1702 or may be executed by multiple ones of the cores 1702 at the same or different times. In some examples, the machine code corresponding to the firmware program, the embedded software program, or the software program is split into threads and executed in parallel by two or more of the cores 1702. The software program may correspond to a portion or all of the machine readable instructions and/or operations represented by the flowcharts of FIGS. 10, 11, 12, and/or 13.

The cores 1702 may communicate by a first example bus 1704. In some examples, the first bus 1704 may implement a communication bus to effectuate communication associated with one(s) of the cores 1702. For example, the first bus 1704 may implement at least one of an I2C bus, a SPI bus, a PCI bus, or a PCIe bus. Additionally or alternatively, the first bus 1704 may implement any other type of computing or electrical bus. The cores 1702 may obtain data, instructions, and/or signals from one or more external devices by example interface circuitry 1706. The cores 1702 may output data, instructions, and/or signals to the one or more external devices by the interface circuitry 1706. Although the cores 1702 of this example include example local memory 1720 (e.g., Level 1 (L1) cache that may be split into an L1 data cache and an L1 instruction cache), the microprocessor 1700 also includes example shared memory 1710 that may be shared by the cores (e.g., Level 2 (L2_cache)) for high-speed access to data and/or instructions. Data and/or instructions may be transferred (e.g., shared) by writing to and/or reading from the shared memory 1710. The local memory 1720 of each of the cores 1702 and the shared memory 1710 may be part of a hierarchy of storage devices including multiple levels of cache memory and the main memory (e.g., the main memory 1414, 1416 of FIG. 14, the main memory 1514, 1516 of FIG. 15, and/or the main memory 1614, 1616 of FIG. 16). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1702 may be referred to as a CPU, DSP, GPU, etc., or any other type of hardware circuitry. Each core 1702 includes control unit circuitry 1714, arithmetic and logic (AL) circuitry (sometimes referred to as an ALU) 1716, a plurality of registers 1718, the L1 cache 1720, and a second example bus 1722. Other structures may be present. For example, each core 1702 may include vector unit circuitry, single instruction multiple data (SIMD) unit circuitry, load/store unit (LSU) circuitry, branch/jump unit circuitry, floating-point unit (FPU) circuitry, etc. The control unit circuitry 1714 includes semiconductor-based circuits structured to control (e.g., coordinate) data movement within the corresponding core 1702. The AL circuitry 1716 includes semiconductor-based circuits structured to perform one or more mathematic and/or logic operations on the data within the corresponding core 1702. The AL circuitry 1716 of some examples performs integer based operations. In other examples, the AL circuitry 1716 also performs floating point operations. In yet other examples, the AL circuitry 1716 may include first AL circuitry that performs integer based operations and second AL circuitry that performs floating point operations. In some examples, the AL circuitry 1716 may be referred to as an Arithmetic Logic Unit (ALU). The registers 1718 are semiconductor-based structures to store data and/or instructions such as results of one or more of the operations performed by the AL circuitry 1716 of the corresponding core 1702. For example, the registers 1718 may include vector register(s), SIMD register(s), general purpose register(s), flag register(s), segment register(s), machine specific register(s), instruction pointer register(s), control register(s), debug register(s), memory management register(s), machine check register(s), etc. The registers 1718 may be arranged in a bank as shown in FIG. 17. Alternatively, the registers 1718 may be organized in any other arrangement, format, or structure including distributed throughout the core 1702 to shorten access time. The second bus 1722 may implement at least one of an I2C bus, a SPI bus, a PCI bus, or a PCIe bus Each core 1702 and/or, more generally, the microprocessor 1700 may include additional and/or alternate structures to those shown and described above. For example, one or more clock circuits, one or more power supplies, one or more power gates, one or more cache home agents (CHAs), one or more converged/common mesh stops (CMS s), one or more shifters (e.g., barrel shifter(s)) and/or other circuitry may be present. The microprocessor 1700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 18:
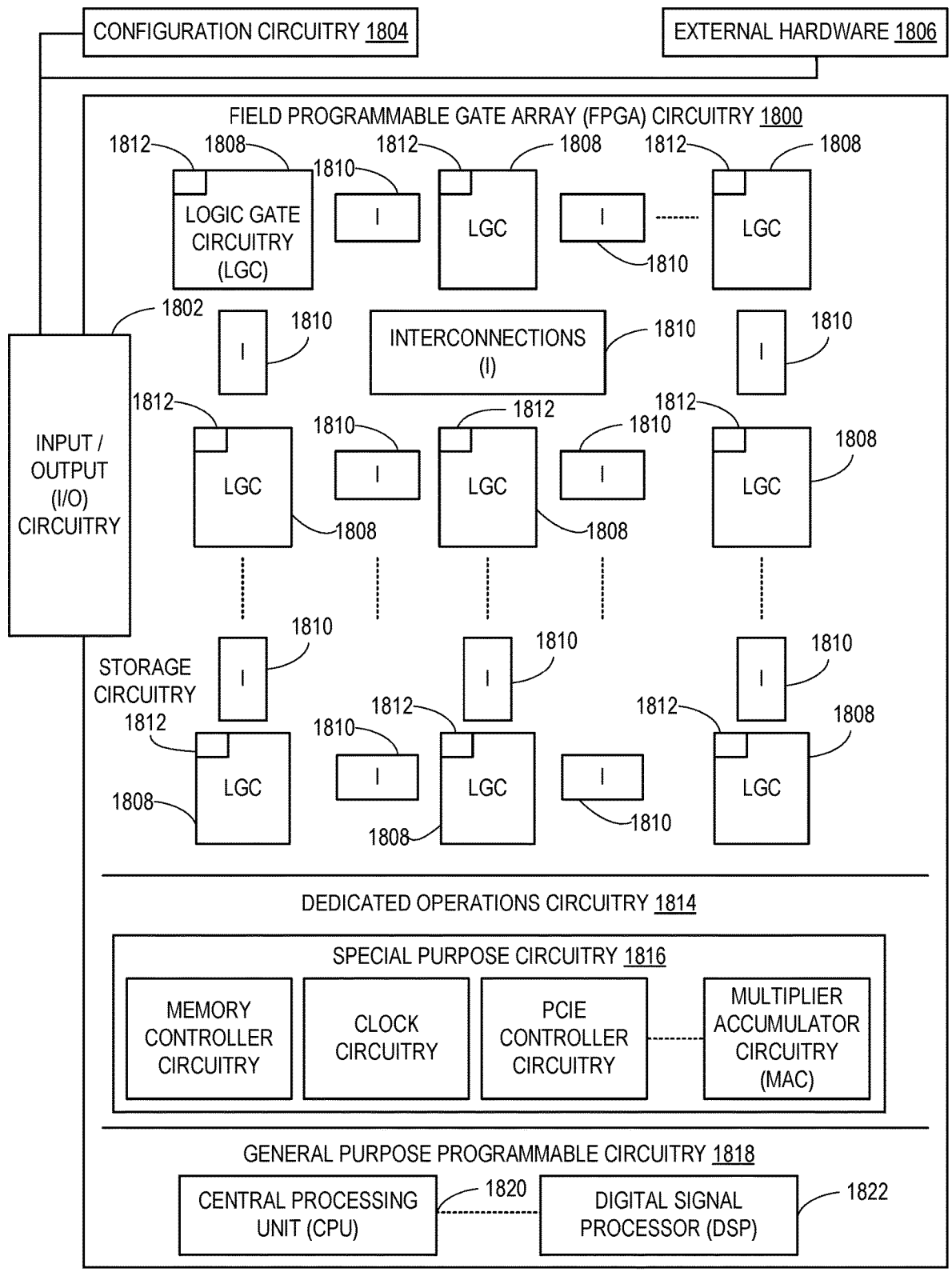
FIG. 18 is a block diagram of another example implementation of the processor circuitry of FIGS. 14, 15, and/or 16.

FIG. 18 is a block diagram of another example implementation of the processor circuitry 1412 of FIG. 14, the processor circuitry 1512 of FIG. 15, and/or the processor circuitry 1612 of FIG. 16. In this example, the processor circuitry 1412 of FIG. 14, the processor circuitry 1512 of FIG. 15, and/or the processor circuitry 1612 of FIG. 16 is implemented by FPGA circuitry 1800. The FPGA circuitry 1800 can be used, for example, to perform operations that could otherwise be performed by the example microprocessor 1700 of FIG. 17 executing corresponding machine readable instructions. However, once configured, the FPGA circuitry 1800 instantiates the machine readable instructions in hardware and, thus, can often execute the operations faster than they could be performed by a general purpose microprocessor executing the corresponding software.

More specifically, in contrast to the microprocessor 1700 of FIG. 17 described above (which is a general purpose device that may be programmed to execute some or all of the machine readable instructions represented by the flowcharts of FIGS. 10, 11, 12, and/or 13 but whose interconnections and logic circuitry are fixed once fabricated), the FPGA circuitry 1800 of the example of FIG. 18 includes interconnections and logic circuitry that may be configured and/or interconnected in different ways after fabrication to instantiate, for example, some or all of the machine readable instructions represented by the flowcharts of FIGS. 10, 11, 12, and/or 13. In particular, the FPGA 1800 may be thought of as an array of logic gates, interconnections, and switches. The switches can be programmed to change how the logic gates are interconnected by the interconnections, effectively forming one or more dedicated logic circuits (unless and until the FPGA circuitry 1800 is reprogrammed). The configured logic circuits enable the logic gates to cooperate in different ways to perform different operations on data received by input circuitry. Those operations may correspond to some or all of the software represented by the flowcharts of FIGS. 10, 11, 12, and/or 13. As such, the FPGA circuitry 1800 may be structured to effectively instantiate some or all of the machine readable instructions of the flowcharts of FIGS. 10, 11, 12, and/or 13 as dedicated logic circuits to perform the operations corresponding to those software instructions in a dedicated manner analogous to an ASIC. Therefore, the FPGA circuitry 1800 may perform the operations corresponding to the some or all of the machine readable instructions of FIGS. 10, 11, 12, and/or 13 faster than the general purpose microprocessor can execute the same.

In the example of FIG. 18, the FPGA circuitry 1800 is structured to be programmed (and/or reprogrammed one or more times) by an end user by a hardware description language (HDL) such as Verilog. The FPGA circuitry 1800 of FIG. 18, includes example input/output (I/O) circuitry 1802 to obtain and/or output data to/from example configuration circuitry 1804 and/or external hardware (e.g., external hardware circuitry) 1806. For example, the configuration circuitry 1804 may implement interface circuitry that may obtain machine readable instructions to configure the FPGA circuitry 1800, or portion(s) thereof. In some such examples, the configuration circuitry 1804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1806 may implement the microprocessor 1700 of FIG. 17. The FPGA circuitry 1800 also includes an array of example logic gate circuitry 1808, a plurality of example configurable interconnections 1810, and example storage circuitry 1812. The logic gate circuitry 1808 and interconnections 1810 are configurable to instantiate one or more operations that may correspond to at least some of the machine readable instructions of FIGS. 10, 11, 12, and/or 13 and/or other desired operations. The logic gate circuitry 1808 shown in FIG. 18 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1808 to enable configuration of the electrical structures and/or the logic gates to form circuits to perform desired operations. The logic gate circuitry 1808 may include other electrical structures such as look-up tables (LUTs), registers (e.g., flip-flops or latches), multiplexers, etc.

The interconnections 1810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1808 to program desired logic circuits.

The storage circuitry 1812 of the illustrated example is structured to store result(s) of the one or more of the operations performed by corresponding logic gates. The storage circuitry 1812 may be implemented by registers or the like. In the illustrated example, the storage circuitry 1812 is distributed amongst the logic gate circuitry 1808 to facilitate access and increase execution speed.

The example FPGA circuitry 1800 of FIG. 18 also includes example Dedicated Operations Circuitry 1814. In this example, the Dedicated Operations Circuitry 1814 includes special purpose circuitry 1816 that may be invoked to implement commonly used functions to avoid the need to program those functions in the field. Examples of such special purpose circuitry 1816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1800 may also include example general purpose programmable circuitry 1818 such as an example CPU 1820 and/or an example DSP 1822. Other general purpose programmable circuitry 1818 may additionally or alternatively be present such as a GPU, an XPU, etc., that can be programmed to perform other operations.

Although FIGS. 17 and 18 illustrate two example implementations of the processor circuitry 1412 of FIG. 14, the processor circuitry 1512 of FIG. 15, and/or the processor circuitry 1612 of FIG. 16, many other approaches are contemplated. For example, as mentioned above, modern FPGA circuitry may include an on-board CPU, such as one or more of the example CPU 1820 of FIG. 18. Therefore, the processor circuitry 1412 of FIG. 14, the processor circuitry 1512 of FIG. 15, and/or the processor circuitry 1612 of FIG. 16 may additionally be implemented by combining the example microprocessor 1700 of FIG. 17 and the example FPGA circuitry 1800 of FIG. 18. In some such hybrid examples, a first portion of the machine readable instructions represented by the flowcharts of FIGS. 10, 11, 12, and/or 13 may be executed by one or more of the cores 1702 of FIG. 17 and a second portion of the machine readable instructions represented by the flowcharts of FIGS. 10, 11, 12, and/or 13 may be executed by the FPGA circuitry 1800 of FIG. 18.

In some examples, the processor circuitry 1412 of FIG. 14, the processor circuitry 1512 of FIG. 15, and/or the processor circuitry 1612 of FIG. 16 may be in one or more packages. For example, the processor circuitry 1700 of FIG. 17 and/or the FPGA circuitry 1800 of FIG. 18 may be in one or more packages. In some examples, an XPU may be implemented by the processor circuitry 1412 of FIG. 14, the processor circuitry 1512 of FIG. 15, and/or the processor circuitry 1612 of FIG. 16, which may be in one or more packages. For example, the XPU may include a CPU in one package, a DSP in another package, a GPU in yet another package, and an FPGA in still yet another package.

Figure 19:
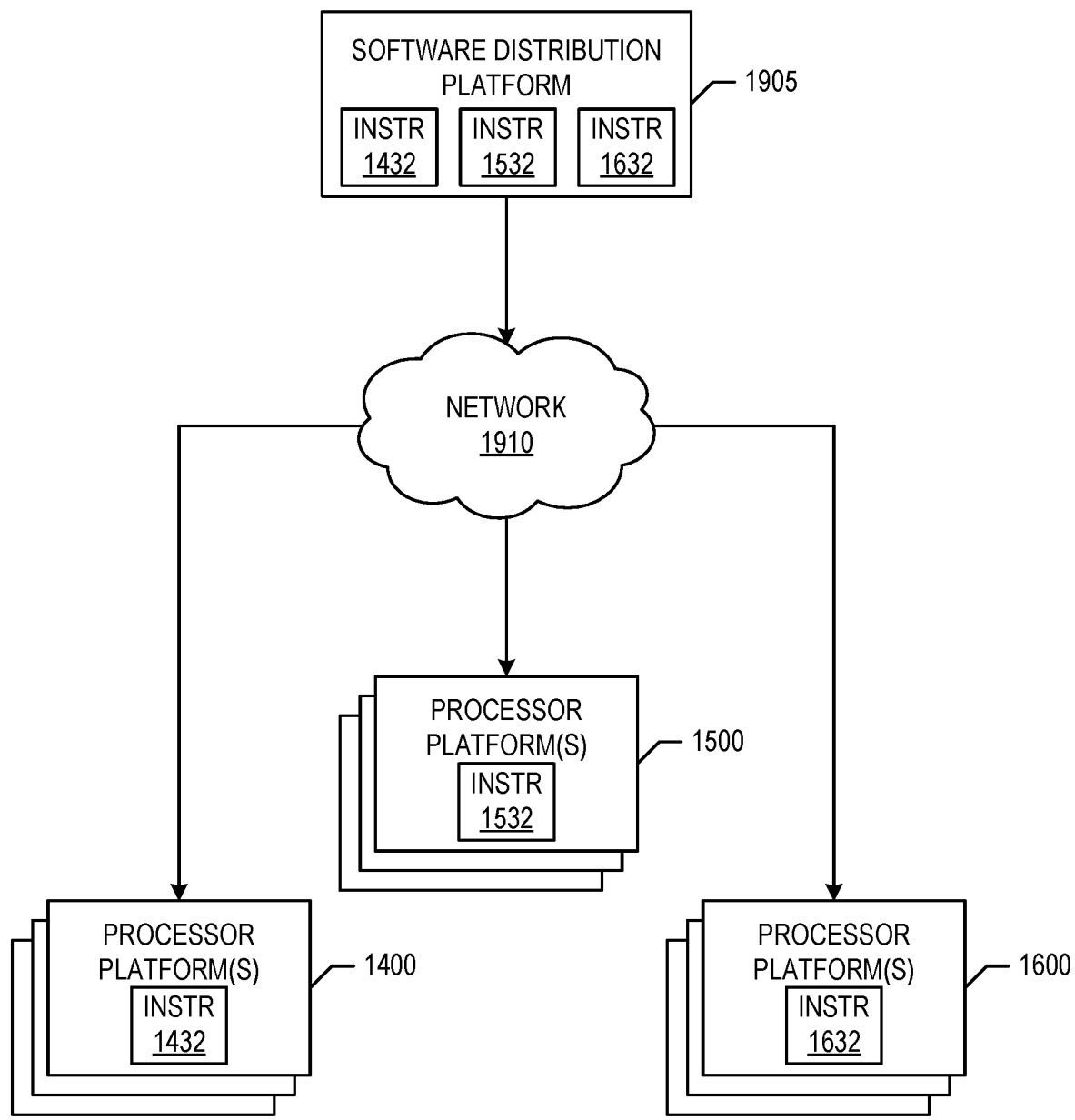
FIG. 19 is a block diagram of an example software distribution platform to distribute software to client devices associated with end users and/or consumers, retailers, and/or original equipment manufacturers (OEMs).

A block diagram illustrating an example software distribution platform 1605 to distribute software such as the example machine readable instructions 1432 of FIG. 14, the example machine readable instructions 1532 of FIG. 15, and the example machine readable instructions 1632 of FIG. 16 to hardware devices owned and/or operated by third parties is illustrated in FIG. 19. The example software distribution platform 1905 may be implemented by any computer server, data facility, cloud service, etc., capable of storing and transmitting software to other computing devices. The third parties may be customers of the entity owning and/or operating the software distribution platform 1905. For example, the entity that owns and/or operates the software distribution platform 1905 may be a developer, a seller, and/or a licensor of software such as the example machine readable instructions 1432 of FIG. 14, the example machine readable instructions 1532 of FIG. 15, and the example machine readable instructions 1632 of FIG. 16. The third parties may be consumers, users, retailers, OEMs, etc., who purchase and/or license the software for use and/or re-sale and/or sub-licensing. In the illustrated example, the software distribution platform 1905 includes one or more servers and one or more storage devices. The storage devices store the machine readable instructions 1432, 1532, 1632, which may correspond to the example machine readable instructions 1000, 1100, 1200, 1300 of FIGS. 10-13, as described above. The one or more servers of the example software distribution platform 1905 are in communication with a network 1910, which may correspond to any one or more of the Internet and/or any of the example networks 108, 110, 1426, 1526, 1626 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1432, 1532, 1632 from the software distribution platform 1905. For example, the software, which may correspond to the example machine readable instructions 1000, 1100, 1200, 1300 of FIGS. 10-13, may be downloaded to the example processor platform 1400, which is to execute the machine readable instructions 1432 to implement the watermark encoder 106 of FIGS. 1 and/or 2. In some examples, the software may be downloaded to the example processor platform 1500, which is to execute the machine readable instructions 1532 to implement the first watermark decoder 124 of FIGS. 1 and/or 3 and/or the second watermark decoder 127 of FIGS. 1 and/or 3. In some examples, the software may be downloaded to the example processor platform 1600, which is to execute the machine readable instructions to implement the AME 104 of FIGS. 1 and/or 4. In some example, one or more servers of the software distribution platform 1905 periodically offer, transmit, and/or force updates to the software (e.g., the example machine readable instructions 1432, 1532, 1632 of FIGS. 14-16) to ensure improvements, patches, updates, etc., are distributed and applied to the software at the end user devices.

From the foregoing, it will be appreciated that example systems, methods, apparatus, and articles of manufacture have been disclosed that improve watermark detection in acoustic environments. Disclosed systems, methods, apparatus, and articles of manufacture improve the efficiency of using a computing device by adding hardware, software, and/or firmware to detect sparse watermarks as disclosed herein. Disclosed systems, methods, apparatus, and articles of manufacture improve the efficiency of using a computing device by adding hardware, software, and/or firmware to detect timestamps in multilayer watermarks as disclosed herein. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to improve watermark detection in acoustic environments are disclosed herein. Further examples and combinations thereof include the following:

Example 1 includes an apparatus comprising at least one memory, instructions in the apparatus, and processor circuitry to execute and/or instantiate the instructions to encode a first symbol in a media file at a first symbol position on a first encoding layer of a multilayered watermark, and encode a second symbol in the media file at a second symbol position on a second encoding layer of the multilayered watermark, the first encoding layer and the second encoding layer including a plurality of symbol positions, one or more of the plurality of the symbol positions on at least one of the first encoding layer or the second encoding layer to be empty.

Example 2 includes the apparatus of example 1, wherein the processor circuitry is to execute and/or instantiate the instructions to identify the media file as scheduled to be accessed by a media device after a publishing of the media file by a media provider, and in response to identifying the media file as scheduled to be accessed by the media device within a first time period after the publishing of the media file, select the first symbol to be inserted at the first symbol position and the second symbol to be inserted at the second symbol position to identify an access of the media filed by the media device within the first time period.

Example 3 includes the apparatus of example 2, wherein the processor circuitry is to execute and/or instantiate the instructions to in response to identifying the media file as scheduled to be accessed by the media device within a second time period after the publishing of the media file select the first symbol to be inserted at a third symbol position on the first encoding layer and the second symbol to be inserted at a fourth symbol position on the second encoding layer, encode the first symbol in the media file at the third symbol position on the first encoding layer, and encode the second symbol in the media file at the fourth symbol position on the second encoding layer, one or more of the plurality of the symbol positions on at least one of the first encoding layer or the second encoding layer to be empty.

Example 4 includes the apparatus of example 3, wherein the first time period is within three days after the publishing of the media file and the second time period is within seven days after the publishing of the media file.

Example 5 includes the apparatus of example 2, wherein the publishing of the media file includes a television broadcast of the media file or availability of the media file on a streaming media platform.

Example 6 includes the apparatus of example 1, wherein the processor circuitry is to execute and/or instantiate the instructions to in response to an access of the media file by a media device, extract the multilayered watermark from audio of the media file, identify the first symbol at the first symbol position and the second symbol at the second symbol position, determine that the media file is accessed within a first time period or a second time period after a publishing of the media file by a media provider based on the first symbol at the first symbol position and the second symbol at the second symbol position, and provide an indication to a server that the media file is accessed within the first time period or the second time period.

Example 7 includes the apparatus of example 6, wherein the processor circuitry is to execute and/or instantiate the instructions to associate the access of the media file and demographics of a user associated with the meter based on the indication.

Example 8 includes at least one non-transitory computer readable storage medium comprising instructions that, when executed, cause processor circuitry to at least encode a first symbol in a media file at a first symbol position on a first encoding layer of a multilayered watermark, and encode a second symbol in the media file at a second symbol position on a second encoding layer of the multilayered watermark, the first encoding layer and the second encoding layer including a plurality of symbol positions, one or more of the plurality of the symbol positions on at least one of the first encoding layer or the second encoding layer to be empty.

Example 9 includes the at least one non-transitory computer readable storage medium of example 8, wherein the instructions, when executed, cause the processor circuitry to identify the media file as scheduled to be accessed by a media device after a publishing of the media file by a media provider, and in response to identifying the media file as scheduled to be accessed by the media device within a first time period after the publishing of the media file, select the first symbol to be inserted at the first symbol position and the second symbol to be inserted at the second symbol position to identify an access of the media filed by the media device within the first time period.

Example 10 includes the at least one non-transitory computer readable storage medium of example 9, wherein the instructions, when executed, cause the processor circuitry to in response to identifying the media file as scheduled to be accessed by the media device within a second time period after the publishing of the media file select the first symbol to be inserted at a third symbol position on the first encoding layer and the second symbol to be inserted at a fourth symbol position on the second encoding layer, encode the first symbol in the media file at the third symbol position on the first encoding layer, and encode the second symbol in the media file at the fourth symbol position on the second encoding layer, one or more of the plurality of the symbol positions on at least one of the first encoding layer or the second encoding layer to be empty.

Example 11 includes the at least one non-transitory computer readable storage medium of example 10, wherein the first time period is within three days after the publishing of the media file and the second time period is within seven days after the publishing of the media file.

Example 12 includes the at least one non-transitory computer readable storage medium of example 9, wherein the publishing of the media file includes a television broadcast of the media file or availability of the media file on a streaming media platform.

Example 13 includes the at least one non-transitory computer readable storage medium of example 8, wherein the instructions, when executed, cause the processor circuitry to in response to an access of the media file by a media device, extract the multilayered watermark from audio of the media file, identify the first symbol at the first symbol position and the second symbol at the second symbol position, determine that the media file is accessed within a first time period or a second time period after a publishing of the media file by a media provider based on the first symbol at the first symbol position and the second symbol at the second symbol position, and provide an indication to a server that the media file is accessed within the first time period or the second time period.

Example 14 includes the at least one non-transitory computer readable storage medium of example 13, wherein the instructions, when executed, cause the processor circuitry to associate the access of the media file and demographics of a user associated with the meter based on the indication.

Example 15 includes a method comprising encoding a first symbol in a media file at a first symbol position on a first encoding layer of a multilayered watermark, and encoding a second symbol in the media file at a second symbol position on a second encoding layer of the multilayered watermark, the first encoding layer and the second encoding layer including a plurality of symbol positions, one or more of the plurality of the symbol positions on at least one of the first encoding layer or the second encoding layer to be empty.

Example 16 includes the method of example 15, further including identifying the media file as scheduled to be accessed by a media device after a publishing of the media file by a media provider, and in response to identifying the media file as scheduled to be accessed by the media device within a first time period after the publishing of the media file, selecting the first symbol to be inserted at the first symbol position and the second symbol to be inserted at the second symbol position to identify an access of the media filed by the media device within the first time period.

Example 17 includes the method of example 16, further including in response to identifying the media file as scheduled to be accessed by the media device within a second time period after the publishing of the media file selecting the first symbol to be inserted at a third symbol position on the first encoding layer and the second symbol to be inserted at a fourth symbol position on the second encoding layer, encoding the first symbol in the media file at the third symbol position on the first encoding layer, and encoding the second symbol in the media file at the fourth symbol position on the second encoding layer, one or more of the plurality of the symbol positions on at least one of the first encoding layer or the second encoding layer to be empty.

Example 18 includes the method of example 17, wherein the first time period is within three days after the publishing of the media file and the second time period is within seven days after the publishing of the media file.

Example 19 includes the method of example 16, wherein the publishing of the media file includes a television broadcast of the media file or availability of the media file on a streaming media platform.

Example 20 includes the method of example 15, further including in response to an access of the media file by a media device, extracting, with a meter, the multilayered watermark from audio of the media file, identifying, with the meter, the first symbol at the first symbol position and the second symbol at the second symbol position, determining, with the meter, that the media file is accessed within a first time period or a second time period after a publishing of the media file by a media provider based on the first symbol at the first symbol position and the second symbol at the second symbol position, and providing an indication to a server that the media file is accessed within the first time period or the second time period.

Example 21 includes the method of example 20, further including associating the access of the media file and demographics of a user associated with the meter based on the indication.

Example 22 includes an apparatus comprising at least one memory, instructions in the apparatus, and processor circuitry to execute and/or instantiate the instructions to encode a first bit sequence in a media file on a first encoding layer of a multilayered watermark, the first bit sequence to include one or more first bits associated with a timestamp of the multilayered watermark, and encode a second bit sequence in the media file on a second encoding layer of the multilayered watermark, the second bit sequence to include (i) one or more second bits associated with the timestamp and (ii) one or more third bits.

Example 23 includes the apparatus of example 22, wherein the one or more third bits are parity bits.

Example 24 includes the apparatus of example 22, wherein the processor circuitry is to execute and/or instantiate the instructions to convert the timestamp in a first format to a second format, the first format based on a number of seconds at which the multilayered watermark is to be encoded in the media file, the second format based on a number of minutes at which the multilayered watermark is to be encoded in the media file, and convert the timestamp in the second format to a third bit sequence, the first bit sequence corresponding to one or more least significant bits of the third bit sequence, the second bit sequence corresponding to one or more most significant bits of the third bit sequence.

Example 25 includes the apparatus of example 22, wherein the processor circuitry is to execute and/or instantiate the instructions to determine a first value based on the timestamp and a range of timestamps, determine a second value based on the timestamp, the first value, and the range of timestamps, and convert the second value into the first bit sequence.

Example 26 includes the apparatus of example 25, wherein the processor circuitry is to execute and/or instantiate the instructions to determine a third value based on a sum of the first value and the second value, convert the third value into a third bit sequence, and determine the one or more third bits by shifting the third bit sequence by an offset value.

Example 27 includes the apparatus of example 26, wherein the media file is to be encoded with a plurality of multilayered watermarks with associated timestamps, successive ones of the timestamps to be incremented at a minute level, the plurality of the multilayered watermarks including the multilayer watermark, the timestamps including the timestamp, and the processor circuitry is to execute and/or instantiate the instructions to increment successive ones of the plurality of the timestamps at the minute level, and in response to the incrementing of the successive ones of the plurality of the timestamps, increment the first bit sequence and the second bit sequence of respective ones of the successive ones of the plurality of the timestamps.

Example 28 includes the apparatus of example 25, wherein the processor circuitry is to execute and/or instantiate the instructions to determine a third value based on a multiplication of the first value and a fourth value, determine a fifth value based on a sum of the third value and a parity value, the parity value to be converted into the one or more third bits, and convert the fifth value into the one or more second bits.

Example 29 includes at least one non-transitory computer readable storage medium comprising instructions that, when executed, cause processor circuitry to at least encode a first bit sequence in a media file on a first encoding layer of a multilayered watermark, the first bit sequence to include one or more first bits associated with a timestamp of the multilayered watermark, and encode a second bit sequence in the media file on a second encoding layer of the multilayered watermark, the second bit sequence to include (i) one or more second bits associated with the timestamp and (ii) one or more third bits.

Example 30 includes the at least one non-transitory computer readable storage medium of example 29, wherein the one or more third bits are parity bits.

Example 31 includes the at least one non-transitory computer readable storage medium of example 29, wherein the instructions, when executed, cause the processor circuitry to convert the timestamp in a first format to a second format, the first format based on a number of seconds at which the multilayered watermark is to be encoded in the media file, the second format based on a number of minutes at which the multilayered watermark is to be encoded in the media file, and convert the timestamp in the second format to a third bit sequence, the first bit sequence corresponding to one or more least significant bits of the third bit sequence, the second bit sequence corresponding to one or more most significant bits of the third bit sequence.

Example 32 includes the at least one non-transitory computer readable storage medium of example 29, wherein the instructions, when executed, cause the processor circuitry to determine a first value based on the timestamp and a range of timestamps, determine a second value based on the timestamp, the first value, and the range of timestamps, and convert the second value into the first bit sequence.

Example 33 includes the at least one non-transitory computer readable storage medium of example 32, wherein the instructions, when executed, cause the processor circuitry to determine a third value based on a sum of the first value and the second value, convert the third value into a third bit sequence, and determine the one or more third bits by shifting the third bit sequence by an offset value.

Example 34 includes the at least one non-transitory computer readable storage medium of example 33, wherein the media file is to be encoded with a plurality of multilayered watermarks with associated timestamps, successive ones of the timestamps to be incremented at a minute level, the plurality of the multilayered watermarks including the multilayer watermark, the timestamps including the timestamp, and the instructions, when executed, cause the processor circuitry to increment successive ones of the plurality of the timestamps at the minute level, and in response to the incrementing of the successive ones of the plurality of the timestamps, increment the first bit sequence and the second bit sequence of respective ones of the successive ones of the plurality of the timestamps.

Example 35 includes the at least one non-transitory computer readable storage medium of example 32, wherein the instructions, when executed, cause the processor circuitry to determine a third value based on a multiplication of the first value and a fourth value, determine a fifth value based on a sum of the third value and a parity value, the parity value to be converted into the one or more third bits, and convert the fifth value into the one or more second bits.

Example 36 includes a method comprising encoding a first bit sequence in a media file on a first encoding layer of a multilayered watermark, the first bit sequence to include one or more first bits associated with a timestamp of the multilayered watermark, and encoding a second bit sequence in the media file on a second encoding layer of the multilayered watermark, the second bit sequence to include (i) one or more second bits associated with the timestamp and (ii) one or more third bits.

Example 37 includes the method of example 36, wherein the one or more third bits are parity bits.

Example 38 includes the method of example 36, further including converting the timestamp in a first format to a second format, the first format based on a number of seconds at which the multilayered watermark is to be encoded in the media file, the second format based on a number of minutes at which the multilayered watermark is to be encoded in the media file, and converting the timestamp in the second format to a third bit sequence, the first bit sequence corresponding to one or more least significant bits of the third bit sequence, the second bit sequence corresponding to one or more most significant bits of the third bit sequence.

Example 39 includes the method of example 36, further including determining a first value based on the timestamp and a range of timestamps, determining a second value based on the timestamp, the first value, and the range of timestamps, and converting the second value into the first bit sequence.

Example 40 includes the method of example 39, further including determining a third value based on a sum of the first value and the second value, converting the third value into a third bit sequence, and determining the one or more third bits by shifting the third bit sequence by an offset value.

Example 41 includes the method of example 40, wherein the media file is to be encoded with a plurality of multilayered watermarks with associated timestamps, successive ones of the timestamps to be incremented at a minute level, the plurality of the multilayered watermarks including the multilayer watermark, the timestamps including the timestamp, and further including incrementing successive ones of the plurality of the timestamps at the minute level, and in response to the incrementing of the successive ones of the plurality of the timestamps, incrementing the first bit sequence and the second bit sequence of respective ones of the successive ones of the plurality of the timestamps.

Example 42 includes the method of example 39, further including determining a third value based on a multiplication of the first value and a fourth value, determining a fifth value based on a sum of the third value and a parity value, the parity value to be converted into the one or more third bits, and converting the fifth value into the one or more second bits.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A computing system for decoding a multilayer watermark, the computing system comprising:
    a processor; and
    a non-transitory computer-readable storage medium, having stored thereon program instructions that, upon execution by the processor, cause performance of a set of operations comprising:
        determining that a media file is accessed by a media device, wherein the media file is encoded;
        extracting the multilayer watermark from the media file based on determining that the media file was accessed by the media device, wherein the multilayer watermark comprises a first encoding layer and a second encoding layer, and wherein the first encoding layer and the second encoding layer comprise a plurality of symbol positions;
        identifying a first symbol and a second symbol in the media file, wherein the first symbol is inserted at a first symbol position on the first encoding layer and the second symbol is inserted at a second symbol position on the first encoding layer;
        determining, based on the identification of the first symbol at the first symbol position and the second symbol at the second symbol position, a media state; and
        outputting the media state.

2. The computing system of claim 1, wherein the media state corresponds to media associated with the media file being accessed within a time period after an initial publishing of the media.

3. The computing system of claim 1, wherein at least a third symbol position is disposed between the first symbol position and the second symbol position; and wherein the third symbol position is empty.

4. The computing system of claim 1, wherein determining that the media file is accessed by the media device occurs in response to detecting the multilayer watermark.

5. The computing system of claim 1, the set of operations further comprising:
    determining a time period associated with media access of the media file based on the first symbol at the first symbol position and the second symbol at the second symbol position; and
    outputting an indication of the time period.

6. The computing system of claim 5, wherein determining the media state of the media file is based on determining the time period associated with media access.

7. The computing system of claim 1, wherein the first encoding layer of the multilayer watermark comprises a first bit sequence; wherein the first bit sequence comprises one or more first bits associated with a timestamp of the multilayer watermark; and wherein the set of operations further comprises determining a time period associated with media access based on the timestamp.

8. The computing system of claim 7, wherein the second encoding layer of the multilayer watermark comprises a second bit sequence; wherein the second bit sequence in the media file on the second encoding layer of the multilayer watermark comprises one or more second bits associated with the timestamp and one or more third bits; and wherein the one or more third bits are one or more parity bits.

9. A method for decoding a multilayer watermark, the method comprising:
    determining that a media file is accessed by a media device, wherein the media file is encoded;
    extracting the multilayer watermark from the media file based on determining that the media file was accessed by the media device, wherein the multilayer watermark comprises a first encoding layer and a second encoding layer, and wherein the first encoding layer and the second encoding layer comprise a plurality of symbol positions;
    identifying a first symbol and a second symbol in the media file, wherein the first symbol is inserted at a first symbol position on the first encoding layer and the second symbol is inserted at a second symbol position on the first encoding layer; and
    determining, based on the identification of the first symbol at the first symbol position and the second symbol at the second symbol position, a [first] media state.

10. The method of claim 9, further comprising:
    outputting the media state, wherein the media state corresponds to media associated with the media file being accessed within a time period after an initial publishing of the media.

11. The method of claim 9, wherein determining whether that the media file is accessed by the media device occurs in response to detecting the multilayer watermark.

12. The method of claim 9, further comprising:
    determining a time period associated with media access of the media file based on the first symbol at the first symbol position and the second symbol at the second symbol position; and
    outputting an indication of the time period.

13. The method of claim 12, wherein determining the media state of the media file is based on determining the time period associated with media access.

14. The method of claim 9, further comprising:
    determining a time period associated with media access based on a timestamp,
        wherein the first encoding layer comprises a first bit sequence; and
        wherein the first bit sequence in the media file on the first encoding layer of the multilayer watermark comprises one or more first bits associated with a timestamp of the multilayer watermark.

15. The method of claim 14, wherein the second encoding layer comprises a second bit sequence; wherein the second bit sequence in the media file on the second encoding layer of the multilayer watermark comprises one or more second bits associated with the timestamp and one or more third bits; and wherein the one or more third bits are one or more parity bits.

16. A non-transitory computer-readable storage medium, having stored thereon program instructions that, upon execution by a processor, cause performance of a set of operations comprising:
- determining that a media file is accessed by a media device, wherein the media file is encoded;
- extracting a multilayer watermark from the media file based on determining that the media file was accessed by the media device, wherein the multilayer watermark comprises a first encoding layer and a second encoding layer, and wherein the first encoding layer and the second encoding layer comprise a plurality of symbol positions;
- identifying a first symbol and a second symbol in the media file, wherein the first symbol is inserted at a first symbol position on the first encoding layer and the second symbol is inserted at a second symbol position on the first encoding layer; and
- determining, based on the identification of the first symbol at the first symbol position and the second symbol at the second symbol position, a media state.

17. The non-transitory computer-readable storage medium of claim 16, the set of operations further comprising:
- outputting the media state.

18. The non-transitory computer-readable storage medium of claim 17,
- wherein the media state corresponds to media associated with the media file being accessed within a time period after an initial publishing of the media.

19. The non-transitory computer-readable storage medium of claim 16, the set of operations further comprising:
- determining a time period associated with media access of the media file based on the first symbol at the first symbol position and the second symbol at the second symbol position; and
- outputting an indication of the time period.

20. The non-transitory computer-readable storage medium of claim 19, wherein determining the media state of the media file is based on determining the time period associated with media access.

* * * * *